US008998617B2

(12) United States Patent
Kumar

(10) Patent No.: US 8,998,617 B2
(45) Date of Patent: Apr. 7, 2015

(54) SYSTEM, METHOD, AND COMPUTER SOFTWARE CODE FOR INSTRUCTING AN OPERATOR TO CONTROL A POWERED SYSTEM HAVING AN AUTONOMOUS CONTROLLER

(71) Applicant: General Electric Company, Schenectady, NY (US)

(72) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/778,428

(22) Filed: Feb. 27, 2013

(65) Prior Publication Data

US 2013/0171590 A1 Jul. 4, 2013

Related U.S. Application Data

(63) Continuation-in-part of application No. 12/128,249, filed on May 28, 2008, now Pat. No. 8,398,405, and a continuation-in-part of application No. 12/061,444, filed on Apr. 2, 2008, said application No. 12/128,249 is a continuation-in-part of application No. 12/061,462, filed on Apr. 2, 2008, now Pat. No. 8,249,763, which is a continuation-in-part of (Continued)

(51) Int. Cl.

| | |
|---|---|
| ***G09B 9/04*** | (2006.01) |
| ***G09B 19/16*** | (2006.01) |
| ***B61C 17/12*** | (2006.01) |
| ***B61L 27/00*** | (2006.01) |
| ***G09B 9/06*** | (2006.01) |
| ***B61L 3/00*** | (2006.01) |

(52) U.S. Cl.
CPC .............. *G09B 19/167* (2013.01); *B61C 17/12* (2013.01); *B61L 27/0055* (2013.01); *G09B 9/04* (2013.01); *G09B 9/06* (2013.01); *G09B 19/16* (2013.01); *B61L 3/006* (2013.01); *Y02T 30/10* (2013.01); *B61L 27/0027* (2013.01); *B61L 2205/04* (2013.01)

(58) Field of Classification Search
USPC ........... 434/29–71, 219; 700/286; 701/19–22, 701/400; 246/167 R, 182 R, 182 B, 182 C, 246/186, 187 C
See application file for complete search history.

(56) References Cited

U.S. PATENT DOCUMENTS

| | | | |
|---|---|---|---|
| 3,519,805 | A | 7/1970 | Thorne-Booth |
| 3,650,216 | A | 3/1972 | Harwick |
| 3,655,962 | A | 4/1972 | Koch |
| 3,865,042 | A | 2/1975 | Depaola |
| 4,005,838 | A | 2/1977 | Grundy |
| 4,042,810 | A | 8/1977 | Mosher |
| 4,181,943 | A | 1/1980 | Mercer, Sr. |

(Continued)

FOREIGN PATENT DOCUMENTS

| | | |
|---|---|---|
| EP | 1297982 | 4/2003 |
| WO | 9914090 A1 | 3/1999 |
| WO | 9914093 A1 | 3/1999 |

*Primary Examiner* — Timothy A Musselman
(74) *Attorney, Agent, or Firm* — GE Global Patent Operation; John A. Kramer

(57) ABSTRACT

A method for training an operator to control a powered system is disclosed including operating the powered system with an autonomous controller, and informing an operator of a change in operation of the powered system as the change in operation occurs. A system and a computer software code are also disclosed for training the operator to control the powered system.

8 Claims, 41 Drawing Sheets

Related U.S. Application Data application No. 11/765,443, filed on Jun. 19, 2007, now abandoned, and a continuation-in-part of application No. 11/669,364, filed on Jan. 31, 2007, and a continuation-in-part of application No. 11/385,354, filed on Mar. 20, 2006.

(60) Provisional application No. 61/048,344, filed on Apr. 28, 2008, provisional application No. 60/939,848, filed on May 23, 2007, provisional application No. 60/942,559, filed on Jun. 7, 2007, provisional application No. 60/894,039, filed on Mar. 9, 2007, provisional application No. 60/939,852, filed on May 24, 2007, provisional application No. 60/849,100, filed on Oct. 2, 2006, provisional application No. 60/850,885, filed on Oct. 10, 2006.

(56) References Cited

U.S. PATENT DOCUMENTS

| | | | | |
|---|---|---|---|---|
| 4,253,399 | A | 3/1981 | Spigarelli | |
| 4,279,395 | A | 7/1981 | Boggio et al. | |
| 4,344,364 | A | 8/1982 | Nickles et al. | |
| 4,401,035 | A | 8/1983 | Spigarelli et al. | |
| 4,425,097 | A | 1/1984 | Owens | |
| 4,561,057 | A | 12/1985 | Haley, Jr. | |
| 4,602,335 | A | 7/1986 | Perlmutter | |
| 4,711,418 | A | 12/1987 | Aver, Jr. et al. | |
| 4,735,385 | A | 4/1988 | Nickles et al. | |
| 4,794,548 | A | 12/1988 | Lynch | |
| 4,827,438 | A | 5/1989 | Nickles et al. | |
| 4,853,883 | A | 8/1989 | Nickles et al. | |
| 5,109,343 | A | 4/1992 | Budway | |
| 5,240,416 | A | 8/1993 | Bennington | |
| 5,398,894 | A | 3/1995 | Pascoe | |
| 5,437,422 | A | 8/1995 | Newman | |
| 5,440,489 | A | 8/1995 | Newman | |
| 5,618,179 | A | 4/1997 | Copperman et al. | |
| 5,676,059 | A | 10/1997 | Alt | |
| 5,744,707 | A | 4/1998 | Kull | |
| 5,758,299 | A | 5/1998 | Sandborg | |
| 5,785,392 | A | 7/1998 | Hart | |
| 6,112,142 | A | 8/2000 | Shockley et al. | |
| 6,125,311 | A | 9/2000 | Lo | |
| 6,144,901 | A | 11/2000 | Nickles et al. | |
| 6,219,595 | B1 | 4/2001 | Nickles et al. | |
| 6,263,266 | B1 * | 7/2001 | Hawthorne | 701/19 |
| 6,269,034 | B1 | 7/2001 | Shibuya | |
| 6,308,117 | B1 | 10/2001 | Ryland et al. | |
| 6,487,488 | B1 | 11/2002 | Peterson, Jr. et al. | |
| 6,505,103 | B1 | 1/2003 | Howell et al. | |
| 6,516,727 | B2 | 2/2003 | Kraft | |
| 6,587,764 | B2 | 7/2003 | Nickles et al. | |
| 6,591,758 | B2 | 7/2003 | Kumar | |
| 6,609,049 | B1 | 8/2003 | Kane et al. | |
| 6,612,245 | B2 | 9/2003 | Kumar et al. | |
| 6,612,246 | B2 | 9/2003 | Kumar | |
| 6,615,118 | B2 | 9/2003 | Kumar | |
| 6,622,068 | B2 | 9/2003 | Hawthorne et al. | |
| 6,691,957 | B2 | 2/2004 | Hess, Jr. et al. | |
| 6,694,231 | B1 | 2/2004 | Rezk | |
| 6,732,023 | B2 | 5/2004 | Sugita et al. | |
| 6,763,291 | B1 | 7/2004 | Houpt et al. | |
| 6,789,005 | B2 | 9/2004 | Hawthorne et al. | |
| 6,810,312 | B2 | 10/2004 | Jammu et al. | |
| 6,824,110 | B2 | 11/2004 | Kane et al. | |
| 6,845,953 | B2 | 1/2005 | Kane et al. | |
| 6,853,888 | B2 | 2/2005 | Kane et al. | |
| 6,856,865 | B2 | 2/2005 | Hawthorne et al. | |
| 6,863,246 | B2 | 3/2005 | Kane et al. | |
| 6,865,454 | B2 | 3/2005 | Kane et al. | |
| 6,893,262 | B2 | 5/2005 | Stockman | |
| 6,903,658 | B2 | 6/2005 | Kane et al. | |
| 6,915,191 | B2 | 7/2005 | Kane et al. | |
| 6,922,619 | B2 | 7/2005 | Baig et al. | |
| 6,957,131 | B2 | 10/2005 | Kane et al. | |
| 6,978,195 | B2 | 12/2005 | Kane et al. | |
| 6,996,461 | B2 | 2/2006 | Kane et al. | |
| 7,021,588 | B2 | 4/2006 | Hess, Jr. et al. | |
| 7,021,589 | B2 | 4/2006 | Hess, Jr. et al. | |
| 7,024,289 | B2 | 4/2006 | Kane et al. | |
| 7,036,774 | B2 | 5/2006 | Kane et al. | |
| 7,079,926 | B2 | 7/2006 | Kane et al. | |
| 7,092,800 | B2 | 8/2006 | Kane et al. | |
| 7,200,536 | B2 * | 4/2007 | Wynn | 703/7 |
| 7,811,089 | B2 * | 10/2010 | Bond | 434/67 |
| 2001/0029411 | A1 | 10/2001 | Hawthorne et al. | |
| 2002/0059075 | A1 | 5/2002 | Schick et al. | |
| 2002/0096081 | A1 | 7/2002 | Kraft | |
| 2003/0105561 | A1 | 6/2003 | Nickles et al. | |
| 2003/0213875 | A1 | 11/2003 | Hess et al. | |
| 2004/0133315 | A1 | 7/2004 | Kumar et al. | |
| 2004/0245410 | A1 | 12/2004 | Kisak et al. | |
| 2005/0065674 | A1 | 3/2005 | Houpt | |
| 2005/0120904 | A1 | 6/2005 | Kumar et al. | |
| 2005/0196737 | A1 | 9/2005 | Mann | |
| 2007/0219680 | A1 | 9/2007 | Kumer et al. | |

* cited by examiner

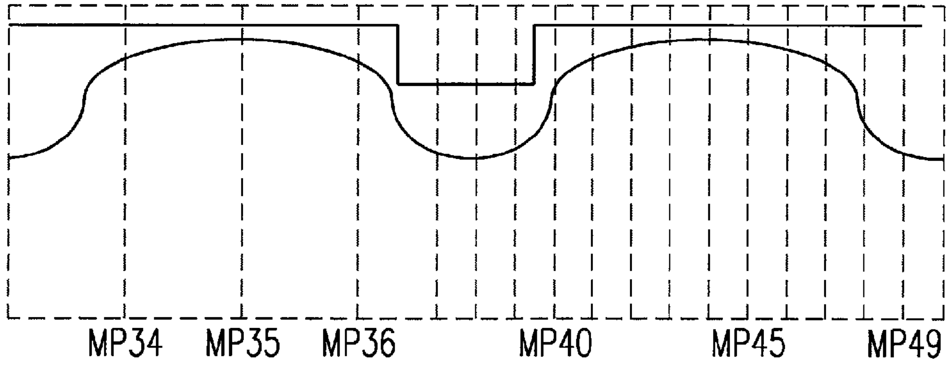
*FIG. 13*
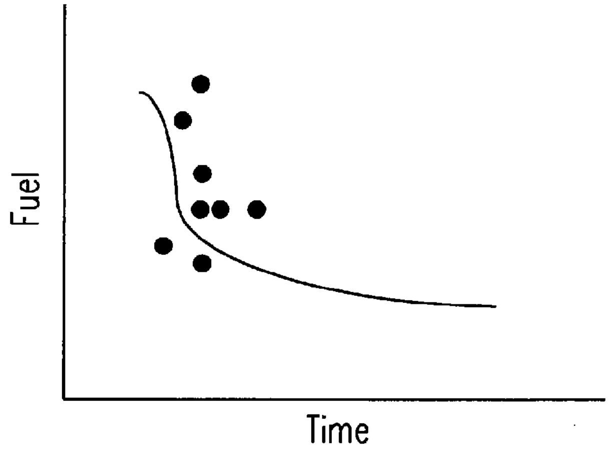
*FIG. 14*
*FIG. 18*
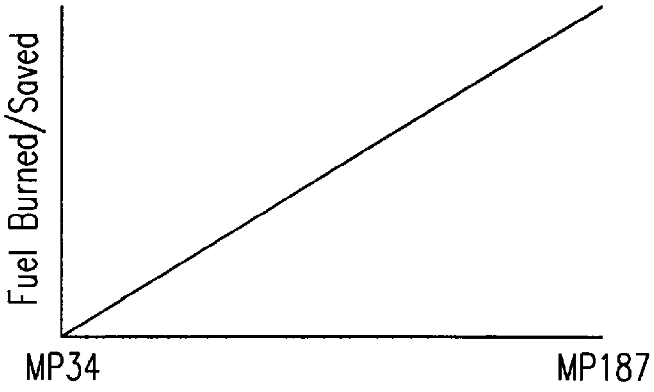

| Trip Optimizer - Simulation Demo | | | | | | |
|---|---|---|---|---|---|---|
| ER 90 | | | Mph/Min 2 | | Distance 0 | GE 2005 |
| BP 90 | Rear 88 | Flow 2 | Consist 2:3 36 K Lead:Idle Trail:Idle | | | Reverser Cntr |
| BC 72 | Main 140 | | Effort Klb 0 | | 180 | Throttle Idle |

Trip Optimizer - Slow Orders

| ID | Start MP | End MP | Speed Limit | Track | Region |
|---|---|---|---|---|---|
| 3576 | 655.2 | 651.6 | 30 | MAIN 1 | CHILLICOTHE |
| 3577 | 628.0 | 625.7 | 25 | MAIN 1 | CHILLICOTHE |
| 3577 | 619.8 | 619.7 | 15 | EAST CROSSOVER | CHILLICOTHE |
| 4011 | 562.1 | 562.1 | 30 | ALL MAINS | CHILLICOTHE |
| 8921 | 530.0 | 525.0 | 20 | MAIN 1 | CHILLICOTHE |
| 8922 | 444.4 | 430.3 | 25 | MAIN 1 | CHILLICOTHE |

Accept Slow Order For CHILLICOTHE, and Continue With Setup?

Yes     Cancel

350

352

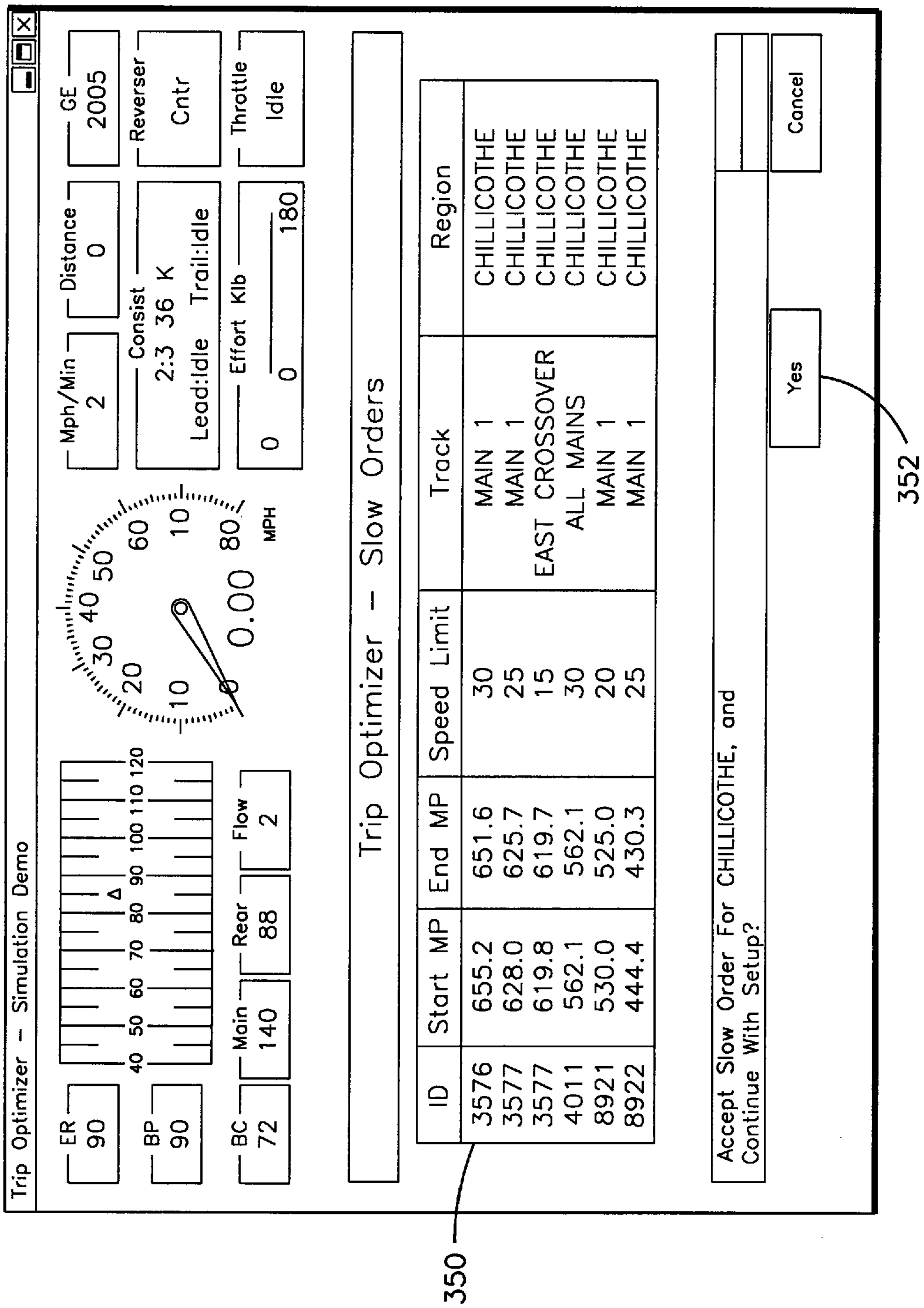

FIG. 28

SYSTEM, METHOD, AND COMPUTER SOFTWARE CODE FOR INSTRUCTING AN OPERATOR TO CONTROL A POWERED SYSTEM HAVING AN AUTONOMOUS CONTROLLER

CROSS-REFERENCE TO RELATED APPLICATIONS

This application claims priority to and is a continuation-in-part of U.S. patent application Ser. No. 12/128,249, filed 28 May 2008 (the '249 Application"), which is based on and claims priority to U.S. Provisional Application No. 61/048,344, filed 28 Apr. 2008 (the "'344 Application").

The '249 Application also claims priority to and is a continuation-in-part of U.S. application Ser. No. 12/061,444, filed 2 Apr. 2008 (the "'444 Application"), which claims priority to U.S. Provisional Application No. 60/939,848, filed 23 May 2007 (the "'848 Application"), and U.S. Provisional Application No. 60/942,559, filed 7 Jun. 2007 (the "'559 Application").

The '249 Application also claims priority to and is a continuation-in-part of U.S. application Ser. No. 12/061,462, filed 2 Apr. 2008 (the "'462 Application"), which claims priority to and is a continuation-in-part of U.S. application Ser. No. 11/765,443, filed 19 Jun. 2007 (the "'443 Application", now abandoned), which claims priority to U.S. Provisional Application No. 60/894,039, filed 9 Mar. 2007 (the "'039 Application"), and U.S. Provisional Application No. 60/939,852, filed 24 May 2007 (the "'852 Application").

The '443 Application claims priority to and is a continuation-in-part of U.S. application Ser. No. 11/669,364, filed 31 Jan. 2007 (the '364 Application"), which claims priority to U.S. Provisional Application No. 60/849,100, filed 2 Oct. 2006 (the '100 Application"), and U.S. Provisional Application No. 60/850,885, filed 10 Oct. 2006 (the "'885 Application").

The '364 Application claims priority to and is a continuation-in-part of U.S. application Ser. No. 11/385,354, filed 20 Mar. 2006 (the "'354 Application").

The entire disclosures of each of the above listed applications (e.g., the '249 Application, the '344 Application, the '444 Application, the '848 Application, the '559 Application, the '462 Application, the '443 Application, the '039 Application, the '852 Application, the '364 Application, the '100 Application, the '885 Application, and the '354 Application) are incorporated herein by reference in their entirety.

BACKGROUND

The inventive subject matter described herein relates to a powered system, such as a train, an off-highway vehicle, a marine vessel, a transport vehicle, an agriculture vehicle, and/or a stationary powered system and, more particularly to a system, method and computer software code for instructing both an experienced operator and an inexperienced operator with an automated control system that is used to operate the powered system.

Some powered systems such as, but not limited to, off-highway vehicles, marine diesel powered propulsion plants, stationary diesel powered systems, transport vehicles such as transport buses, agricultural vehicles, and rail vehicle systems or trains, are typically powered by one or more diesel power units, or diesel-fueled power generating units. With respect to rail vehicle systems, a diesel power unit is usually a part of at least one locomotive powered by at least one diesel internal combustion engine and the train further includes a plurality of rail cars, such as freight cars. Usually more than one locomotive is provided, wherein the locomotives are considered a locomotive consist. A locomotive consist is a group of locomotives that operate together in operating a train. Locomotives are complex systems with numerous subsystems, with each subsystem being interdependent on other subsystems.

An operator is usually aboard a locomotive to insure the proper operation of the locomotive, and when there is a locomotive consist, the operator is usually aboard a lead locomotive. In addition to ensuring proper operations of the locomotive, or locomotive consist, the operator also is responsible for determining operating speeds of the train and forces within the train that the locomotives are part of. To perform this function, the operator generally must have extensive experience with operating the locomotive and various trains over the specified terrain. This knowledge is needed to comply with prescribeable operating parameters, such as speeds, emissions, and the like that may vary with the train location along the track. Moreover, the operator is also responsible for ensuring that in-train forces remain within acceptable limits.

In marine applications, an operator is usually aboard a marine vessel to ensure the proper operation of the vessel, and when there is a vessel consist, the lead operator is usually aboard a lead vessel. As with the locomotive example cited above, a vessel consist is a group of vessels that operate together in operating a combined mission. In addition to ensuring proper operations of the vessel, or vessel consist, the lead operator also is responsible for determining operating speeds of the consist and forces within the consist that the vessels are part of. To perform this function, the operator generally must have extensive experience with operating the vessel and various consists over the specified waterway or mission. This knowledge is needed to comply with prescribeable operating speeds and other mission parameters that may vary with the vessel location along the mission. Moreover, the operator is also responsible for assuring mission forces and location remain within acceptable limits.

In the case of multiple diesel power powered systems, which by way of example and limitation, may reside on a single vessel, power plant or vehicle or power plant sets, an operator is usually in command of the overall system to ensure the proper operation of the system, and when there is a system consist, the operator is usually aboard a lead system. Defined generally, a system consist is a group of powered systems that operate together in meeting a mission. In addition to ensuring proper operations of the single system, or system consist, the operator also is responsible for determining operating parameters of the system set and forces within the set that the system are part of. To perform this function, the operator generally must have extensive experience with operating the system and various sets over the specified space and mission. This knowledge is needed to comply with prescribeable operating parameters and speeds that may vary with the system set location along the route. Moreover, the operator is also responsible for ensuring that in-set forces remain within acceptable limits.

Based on a particular train mission, when building a train, it is common practice to provide a range of locomotives in the train make-up to power the train, based in part on available locomotives with varied power and run trip mission history. This typically leads to a large variation of locomotive power available for an individual train. Additionally, for critical trains, such as Z-trains, backup power, typically backup locomotives, is typically provided to cover an event of equipment failure, and to ensure the train reaches its destination on time.

Furthermore, when building a train, locomotive emission outputs are usually determined by establishing a weighted average for total emission output based on the locomotives in the train while the train is in idle. These averages are expected to be below a certain emission output when the train is in idle. However, typically, there is no further determination made regarding the actual emission output while the train is in idle. Thus, though established calculation methods may suggest that the emission output is acceptable, in actuality the locomotive may be emitting more emissions than calculated.

When operating a train, train operators typically call for the same notch settings when operating the train, which in turn may lead to a large variation in fuel consumption and/or emission output, such as, but not limited to, $NO_x$, $CO_2$, etc., depending on a number of locomotives powering the train. Thus, the operator usually cannot operate the locomotives so that the fuel consumption is minimized and emission output is minimized for each trip since the size and loading of trains vary, and locomotives and their power availability may vary by model type.

However, with respect to a locomotive, even with knowledge to ensure safe operation, the operator cannot usually operate the locomotive so that the fuel consumption and emissions is minimized for each trip. For example, other factors that must be considered may include emission output, operator's environmental conditions like noise/vibration, a weighted combination of fuel consumption and emissions output, etc. This is difficult to do since, as an example, the size and loading of trains vary, locomotives and their fuel/emissions characteristics are different, and weather and traffic conditions vary.

A train owner usually owns a plurality of trains wherein the trains operate over a network of railroad tracks. Because of the integration of multiple trains running concurrently within the network of railroad tracks, wherein scheduling issues must also be considered with respect to train operations, train owners would benefit from a way to optimize fuel efficiency and emission output so as to save on overall fuel consumption while minimizing emission output of multiple trains while meeting mission trip time constraints.

When planning a mission that may be performed autonomously, which includes little to no input from the operator when the mission is being performed, human interface is properly preferred when planning the mission, at least at a minimum to verify the mission being planned. Likewise, while the mission optimization plan is being used in controlling a powered vehicle operator input may be required to monitor operations and/or take control of the powered vehicle.

As more powered vehicles start being controlled by an autonomous, and/or an automatic, controller, skills of experienced operators may degrade while developing skills for new operators may be greatly impeded. Though limited skills are acceptable while the autonomous, and/or automatic, controller is controlling the powered vehicles, times will arise where operators may have to take control of the powered vehicles. Therefore, a need still exists to ensure that experienced operators retain their skills and to train novice operators to ensure that they develop the requisite skills.

BRIEF DESCRIPTION

A method for training an operator to control a powered system is disclosed. The method includes operating the powered system with an autonomous controller, and informing an operator of a change in operation of the powered system as the change in operation occurs.

In an embodiment, a method for training an operator to control a powered system, the method including operating the powered system with an autonomous controller. The autonomous controller is disengaged so that an operator may control the powered system.

In an embodiment, a method for training an operator to control a powered system is disclosed. The method includes operating the powered system with an autonomous controller, and providing an input device for an operator to simulate operating the powered system as the autonomous controller operates the powered system.

In an embodiment, a method for training an operator to control a powered system is disclosed. The method includes providing a powered system in a stationary condition with a manual control device disengaged from controlling the powered system. A mission is communicated to an operator. Operation of the powered system is simulated responsive to the mission with the manual control device.

In an embodiment, a training system for instructing an operator to control a powered system is disclosed. The training system includes a controller configured to autonomously control a powered system. An information providing device is provided which is configured to provide information to an operator responsive to the controller operating the powered system.

A computer software code operating within one or more processors and storable on a tangible and non-transitory computer readable media for training an operator to control a powered system is further disclosed. The computer software code includes computer software module for operating the powered system with an autonomous controller, and a computer software module for informing an operator of a change in operation of the powered system as the change in operation occurs.

A method for training an operator to control operation of a train having at least one locomotive is further disclosed. The method includes operating the train having at least one locomotive with an autonomous controller during a mission. A throttle control and/or a brake control are provided for the operator to simulate operating the train as the autonomous controller actually operates the train. A determination is made that an input from the throttle control and/or the brake control has been made by the operator to simulate operating the train as the autonomous controller actually operates the train. A comparison is between the at least one input and the at least one action made by the autonomous controller as the autonomous controller actually operates the powered system.

In an embodiment, a method (e.g., for controlling a vehicle) includes at least one of obtaining or creating a trip plan having designated operational settings of the vehicle as a function of at least one of time or distance along a route for a trip of the vehicle, autonomously controlling actual operational settings of the vehicle as the vehicle actually travels along the route during the trip such that the vehicle travels according to the designated operational settings of the trip plan, and communicating at least one of the actual operational settings of the vehicle or changes to the actual operational settings of the vehicle to an operator as the vehicle is autonomously controlled during travel along the route to instruct the operator how to manually control the vehicle according to the trip plan.

In an embodiment, a method (e.g., for simulating control of a vehicle) includes presenting simulated travel of the vehicle along a route to an operator disposed onboard the vehicle while the vehicle is stationary. The simulated travel represents movements of the vehicle along the route. The method also includes monitoring manual actuation of one or more devices onboard the vehicle in order to track manual changes to simulated operational settings of the vehicle by the operator during the simulated travel of the vehicle and communicating one or more differences between the simulated operational settings that are manually provided by the operator and designated operational settings of a trip plan so that the operator can practice manual control of the vehicle along the route according to the trip plan. The trip plan includes designated operational settings of the vehicle expressed as a function of at least one of distance or time along the route for a trip.

In an embodiment, a system (e.g., a trip optimizer system) includes a vehicle controller configured to be disposed onboard a vehicle and to at least one of obtain or create a trip plan having designated operational settings of the vehicle as a function of at least one of time or distance along a route for a trip of the vehicle. The vehicle controller also is configured to at least one of (a) autonomously control actual operational settings of the vehicle as the vehicle actually travels along the route during the trip such that the vehicle travels according to the designated operational settings of the trip plan and to communicate at least one of the actual operational settings of the vehicle or changes to the actual operational settings of the vehicle to an operator as the vehicle to instruct the operator how to manually control the vehicle according to the trip plan, or (b) present simulated travel of the vehicle along the route while the vehicle is stationary, monitor manual actuation of one or more devices onboard the vehicle in order to track manual changes to simulated operational settings of the vehicle by the operator during the simulated travel of the vehicle, and communicate one or more differences between the simulated operational settings that are manually provided by the operator and designated operational settings of the trip plan so that the operator can practice manual control of the vehicle along the route according to the trip plan.

BRIEF DESCRIPTION OF THE DRAWINGS

A more particular description of the inventive subject matter briefly described above will be rendered by reference to specific embodiments thereof that are illustrated in the appended drawings. Understanding that these drawings depict only typical embodiments of the inventive subject matter and are not therefore to be considered to be limiting of its scope, embodiments of the invention will be described and explained with additional specificity and detail through the use of the accompanying drawings in which:

FIG. 13 depicts an illustration of a portion of the dynamic display;

FIG. 14 depicts another illustration for a portion of the dynamic display;

FIG. 18 depicts another illustration for a portion of the dynamic display screen;

FIG. 28 depicts a display of the information for verifying and accepting information used in creating a mission plan;

DETAILED DESCRIPTION

Figure 1:
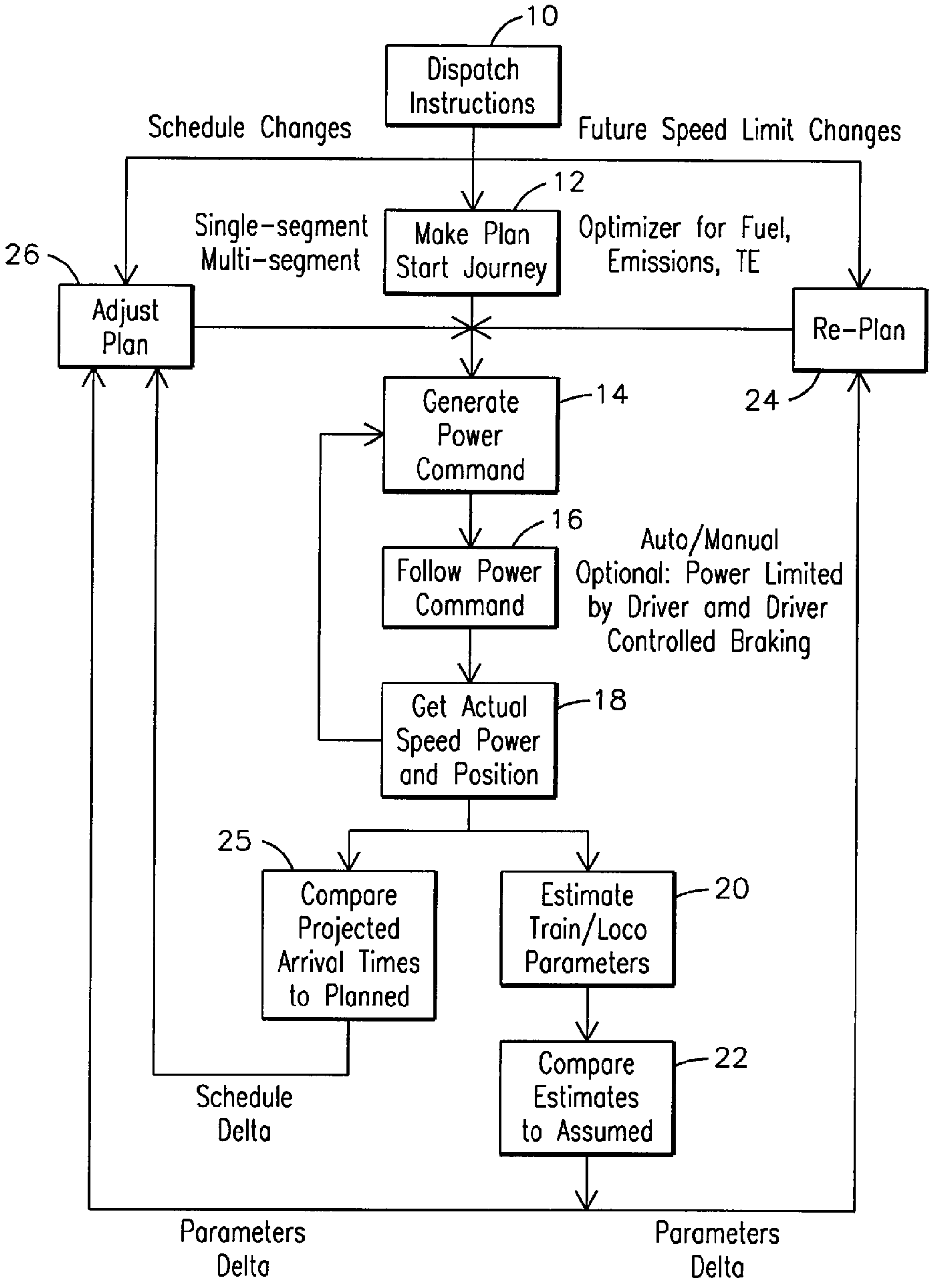
FIG. 1 depicts an illustration of a flowchart trip optimization.

Reference will now be made in detail to the embodiments consistent with the invention, examples of which are illustrated in the accompanying drawings. Wherever possible, the same reference numerals used throughout the drawings refer to the same or like parts.

Though embodiments of the inventive subject matter are described with respect to vehicles, such as rail vehicles or railway transportation systems, specifically trains and locomotives, embodiments of the inventive subject matter are also applicable for other uses, such as but not limited to off-highway vehicles, marine vessels, stationary units, agricultural vehicles, and transport buses, each which may use at least one diesel engine, or diesel internal combustion engine. Toward this end, when discussing a specified mission, this includes a task or requirement to be performed by the powered system. Although various embodiments herein are described in connection with trains, locomotives, locomotive consists, other rail vehicles, and the like, not all embodiments of the inventive subject matter are so limited. The embodiments may also be used in connection with operations of a variety of vehicles, including rail-based vehicles and non-rail-based vehicles.

Therefore, with respect to railway, marine, transport vehicles, agricultural vehicles, or off-highway vehicle applications this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating condition of the diesel-fueled power generating unit may include one or more of speed, load, fueling value, timing, etc. Furthermore, though diesel powered systems are disclosed, embodiments of the inventive subject matter may also be utilized with non-diesel powered systems, such as but not limited to natural gas powered systems, bio-diesel powered systems, etc.

Furthermore, as disclosed herein such non-diesel powered systems, as well as diesel powered systems, may include multiple engines, other power sources, and/or additional power sources, such as, but not limited to, battery sources, voltage sources (such as but not limited to capacitors), chemical sources, pressure based sources (such as but not limited to spring and/or hydraulic expansion), current sources (such as but not limited to inductors), inertial sources (such as but not limited to flywheel devices), gravitational-based power sources, and/or thermal-based power sources.

In one example involving marine vessels, a plurality of tugs may be operating together where all are moving the same larger vessel, where each tug is linked in time to accomplish the mission of moving the larger vessel. In another example a single marine vessel may have a plurality of engines. Off-Highway Vehicle (OHV) applications may involve a fleet of vehicles that have a same mission to move earth, from location A to location B, where each OHV is linked in time to accomplish the mission. With respect to a stationary power generating station, a plurality of stations may be grouped together for collectively generating power for a specific location and/or purpose. In another embodiment, a single station is provided, but with a plurality of generators making up the single station. In one example involving locomotive vehicles, a plurality of diesel powered systems may be operated together where all are moving the same larger load, where each system is linked in time to accomplish the mission of moving the larger load. In another embodiment a locomotive vehicle may have more than one diesel powered system.

Embodiments of the inventive subject matter solve problems in the art by providing a system, method, and computer implemented method, such as a computer software code, for training an operator to control a powered system. With respect to locomotives, embodiments of the inventive subject matter are also operable when the locomotive consist is in distributed power operations.

An apparatus, such as a data processing system, including a CPU, memory, I/O, program storage, a connecting bus, and other appropriate components, could be programmed or otherwise designed to facilitate the practice of the method of the inventive subject matter. Such a system would include appropriate program means for executing the method of the inventive subject matter.

Also, an article of manufacture, such as a pre-recorded disk or other similar computer program product, for use with a data processing system, could include a storage medium and program means recorded thereon for directing the data processing system to facilitate the practice of the method of the inventive subject matter. Such apparatus and articles of manufacture also fall within the spirit and scope of the inventive subject matter.

Broadly speaking, a technical effect is to educate an operator regarding how to control a powered system, including operation and control between automatic and manual control, and to control operational information used in a mission for the powered system. To facilitate an understanding of the embodiments of the inventive subject matter, it is described hereinafter with reference to specific implementations thereof. Embodiments of the inventive subject matter may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that performs particular tasks or implement particular abstract data types. For example, the software programs that underlie embodiments of the inventive subject matter can be coded in different programming languages, for use with different devices, or platforms. In the description that follows, examples of the inventive subject matter may be described in the context of a web portal that employs a web browser. It will be appreciated, however, that the principles that underlie embodiments of the inventive subject matter can be implemented with other types of computer software technologies as well.

Moreover, embodiments of the inventive subject matter may be practiced with other computer system configurations, including hand-held devices, multiprocessor systems (e.g., one or more processors), microprocessor-based or programmable consumer electronics, minicomputers, mainframe computers, and the like. Embodiments of the inventive subject matter may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in a consist, or off-board in wayside or central offices where wireless communication is used.

Throughout this document the term locomotive consist is used. As used herein, a locomotive consist may be described as having one or more locomotives in succession, connected together so as to provide motoring and/or braking capability. The locomotives are connected together where no train cars are in between the locomotives. The train can have more than one locomotive consist in its composition. Specifically, there can be a lead consist and one or more remote consists, such as midway in the line of cars and another remote consist at the end of the train. Each locomotive consist may have a first locomotive and trail locomotive(s). Though a first locomotive is usually viewed as the lead locomotive, those skilled in the art will readily recognize that the first locomotive in a multi locomotive consist may be physically located in a physically trailing position. Though a locomotive consist is usually viewed as involving successive locomotives, those skilled in the art will readily recognize that a consist group of locomotives may also be recognized as a consist even when at least a car separates the locomotives, such as when the locomotive consist is configured for distributed power operation, wherein throttle and braking commands are relayed from the lead locomotive to the remote trains by a radio link or physical cable. Towards this end, the term locomotive consist should be not be considered a limiting factor when discussing multiple locomotives within the same train.

As disclosed herein, the idea of a consist may also be applicable when referring to diesel powered systems such as, but not limited to, marine vessels, off-highway vehicles, transportation vehicles, agricultural vehicles, and/or stationary power plants, that operate together so as to provide motoring, power generation, and/or braking capability. Therefore, even though the term locomotive consist is used herein in regards to certain illustrative embodiments, this term may also apply to other powered systems. Similarly, sub-consists may exist. For example, the diesel powered system may have more than one diesel-fueled power generating unit. For example, a power plant may have more than one diesel electric power unit where optimization may be at the sub-consist level. Likewise, a locomotive may have more than one diesel power unit.

Referring now to the drawings, embodiments of the inventive subject matter will be described. Embodiments of the inventive subject matter can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the inventive subject matter are discussed below.

FIG. 1 depicts an exemplary illustration of a flowchart of an embodiment of the inventive subject matter. As illustrated, instructions are input specific to planning a trip either on board or from a remote location, such as a dispatch center 10. Such input information includes, but is not limited to, vehicle position, consist description (such as locomotive models), locomotive power description, performance of locomotive traction transmission, consumption of engine fuel as a function of output power, cooling characteristics, the intended trip route (e.g., effective track grade and curvature as function of milepost, or an "effective grade" component to reflect curvature following standard railroad practices), the train represented by car makeup and loading together with effective drag coefficients, trip desired parameters including, but not limited to, start time and location, end location, desired travel time, crew (user and/or operator) identification, crew shift expiration time, and route.

This data may be provided to the locomotive 42 in a number of ways, such as, but not limited to, an operator manually entering this data into the locomotive 42 via an onboard display, inserting a memory device such as a "hard card" and/or USB drive containing the data into a receptacle aboard the locomotive, and transmitting the information via wireless communication from a central or wayside location 41, such as a track signaling device and/or a wayside device, to the locomotive 42. Locomotive 42 and train 31 load characteristics (e.g., drag) may also change over the route (e.g., with altitude, ambient temperature and condition of the rails and rail-cars), and the plan may be updated to reflect such changes as needed by any of the methods discussed above and/or by real-time autonomous collection of locomotive/train conditions. This includes for example, changes in locomotive or train characteristics detected by monitoring equipment on or off board the locomotive(s) 42.

The track signal system determines the allowable speed of the train. There are many types of track signal systems and operating rules associated with each of the signals. For example, some signals have a single light (on/off), some signals have a single lens with multiple colors, and some signals have multiple lights and colors. These signals can indicate that the track is clear and the train may proceed at a maximum allowable speed. They can also indicate that a reduced speed or stop is required. This reduced speed may need to be achieved immediately, or at a certain location (e.g., prior to the next signal or crossing).

The signal status is communicated to the train and/or operator through various means. Some systems have circuits in the track and inductive pick-up coils on the locomotives. Other systems have wireless communications systems. Signal systems can also require the operator to visually inspect the signal and take the appropriate actions.

The track signaling system may interface with the on-board signal system and adjust the locomotive speed according to the inputs and the appropriate operating rules. For signal systems that require the operator to visually inspect the signal status, the operator screen will present the appropriate signal options for the operator to enter based on the train's location. The type of signal systems and operating rules, as a function of location, may be stored in an onboard database 63.

Based on the specification data input into the embodiment of the inventive subject matter, an optimal plan which minimizes fuel use and/or emissions produced subject to speed limit constraints along the route with desired start and end times is computed to produce a trip profile 12.

As used herein, the term "optimize" and the various forms thereof refer to improving one or more parameters of operation, such as fuel efficiency, emissions production, and the like. For example, optimizing fuel efficiency can mean that fuel efficiency is improved by reducing the amount of fuel consumed to perform a task (e.g., travel along a route between locations) relative to performing the same task in another manner, such as by using different operational settings (e.g., throttle and/or brake settings). As another example, optimizing emissions generation can mean that the amount of emissions produced by a vehicle is reduced during travel in a trip relative to performing traveling the same trip using different operational settings. Additionally, "maximizing" or "minimizing" (and various forms thereof) a parameter of operation can mean increasing or reducing the parameter, respectively, without increasing the parameter to the largest possible value or reducing the parameter to the lowest possible value. For example, maximizing fuel efficiency can include increasing fuel efficiency but not necessarily eliminating all consumption of fuel and minimizing emissions generation can include reducing the amount of emissions that are generated without eliminating production of all emissions.

The plan or profile (variously referred to as a plan, profile, trip plan, trip profile, mission plan, or mission profile) contains designated operational settings (e.g., optimal speed and power (notch) settings) that the system (e.g., the train) is to follow, expressed as a function of distance and/or time, and such train operating limits, including but not limited to, the maximum notch power and brake settings, and speed limits as a function of location, and the expected fuel used and emissions generated. In an embodiment, the value for the notch setting is selected to obtain throttle change decisions about once every 10 to 30 seconds. The throttle change decisions may occur at a longer or shorter duration, if needed and/or desired to follow an optimal speed profile. In a broader sense, the profiles provide power settings for the train, either at the train level, consist level, and/or individual train level. Power comprises braking power, motoring power, and airbrake power. In another preferred embodiment, instead of operating at the traditional discrete notch power settings, the embodiment of the inventive subject matter is able to select a continuous power setting determined as optimal for the profile selected. Thus, for example, if an optimal profile specifies a notch setting of 6.8, instead of operating at notch setting 7 (assuming discreet notch settings such as 6, 7, 8, and so on), the locomotive 42 can operate at 6.8. Allowing such intermediate power settings may bring additional efficiency benefits as described below.

The plan can be used to reduce one or more operating parameters or outputs of the powered system. For example, a vehicle traveling according to the trip plan may consume less fuel and/or generate fewer emissions during travel along a route to a destination location within a designated time period relative to the same vehicle traveling along the same route to the same destination within the same time period, but using different operational settings than the trip plan.

The procedure used to compute the optimal profile can be any number of methods for computing a power sequence that drives the train 31 to minimize fuel and/or emissions subject to locomotive operating and schedule constraints, as summarized below. In some cases the required optimal profile may be close enough to one previously determined, owing to the similarity of the train configuration, route and environmental conditions. In these cases it may be sufficient to look up the driving trajectory within a database 63 and attempt to follow it. When no previously computed plan is suitable, methods to compute a new one include, but are not limited to, direct calculation of the optimal profile using differential equation models which approximate the train physics of motion. The setup involves selection of a quantitative objective function, commonly a weighted sum (integral) of model variables that correspond to rate of fuel consumption and emissions generation plus a term to penalize excessive throttle variation.

An optimal control formulation is set up to minimize the quantitative objective function subject to constraints including but not limited to, speed limits and minimum and maximum power (throttle) settings and maximum cumulative and instantaneous emissions. Depending on planning objectives at any time, the problem may be implemented flexibly to minimize fuel subject to constraints on emissions and speed limits, or to minimize emissions, subject to constraints on fuel use and arrival time. It is also possible to implement, for example, a goal to minimize the total travel time without constraints on total emissions or fuel use where such relaxation of constraints would be permitted or required for the mission.

Throughout the document exemplary equations and objective functions are presented for minimizing locomotive fuel consumption. These equations and functions are for illustration only as other equations and objective functions can be employed to optimize fuel consumption or to optimize other locomotive/train operating parameters.

Mathematically, the problem to be solved may be stated more precisely. The basic physics are expressed by:

$$\frac{dx}{dt} = v;\ x(0) = 0.0;\ x(T_f) = D$$

$$\frac{dv}{dt} = T_e(u, v) - G_a(x) - R(v);\ v(0) = 0.0;\ v(T_f) = 0.0$$

where x is the position of the train, v its velocity and t is time (in miles, miles per hour, and minutes or hours, as appropriate) and u is the notch (throttle) command input. Further, D denotes the distance to be traveled, $T_f$ the desired arrival time at distance D along the track, $T_e$ is the tractive effort produced by the locomotive consist, $G_a$ is the gravitational drag which depends on the train length, train makeup, and terrain on which the train is located, and R is the net speed dependent drag of the locomotive consist and train combination. The initial and final speeds can also be specified, but without loss of generality are taken to be zero here (e.g., train stopped at beginning and end). Finally, the model is readily modified to include other important dynamics such the lag between a change in throttle, u, and the resulting tractive effort or braking. Using this model, an optimal control formulation is set up to minimize the quantitative objective function subject to constraints including but not limited to, speed limits and minimum and maximum power (throttle) settings. Depending on planning objectives at any time, the problem may be set up flexibly to minimize fuel subject to constraints on emissions and speed limits, or to minimize emissions, subject to constraints on fuel use and arrival time.

It is also possible to implement, for example, a goal to minimize the total travel time without constraints on total emissions or fuel use where such relaxation of constraints would be permitted or required for the mission. All these performance measures can be expressed as a linear combination of any of the following:

$$\min_{u(t)} \int_0^{T_f} F(u(t))\,dt \text{ – Minimize total fuel consumption}$$

$$\min_{u(t)} T_f \text{ – Minimize Travel Time}$$

$$\min_{u_i} \sum_{i=2}^{n_d} (u_i - u_{i-1})^2 \text{ – Minimize notch jockeying (piecewise constant input)}$$

$$\min_{u(t)} \int_0^{T_f} (du/dt)^2\,dt \text{ – Minimize notch jockeying (continuous input)}$$

Replace the fuel term F in (1) with a term corresponding to emissions production. For example for emissions $$\min_{u(t)} \int_0^{T_f} E(u(t))\,dt \text{ – Minimize total emissions production}$$

In this equation E is the quantity of emissions in gm/hphr for each of the notches (or power settings). In addition a minimization could be done based on a weighted total of fuel and emissions.

A commonly used and representative objective function is thus:

$$\min_{u(t)} \alpha_1 \int_0^{T_f} F(u(t))\,dt + \alpha_3 T_f + \alpha_2 \int_0^{T_f} (du/dt)^2\,dt \tag{OP}$$

The coefficients of the linear combination depend on the importance (weight) given to each of the terms. Note that in equation (OP), u(t) is the optimizing variable that is the continuous notch position. If discrete notch is required, e.g. for older locomotives, the solution to equation (OP) is discretized, which may result in lower fuel savings. Finding a minimum time solution ($\alpha_1$ set to zero and $\alpha_2$ set to zero or a relatively small value) is used to find a lower bound for the achievable travel time ($T_f = T_{fmin}$). In this case, both u(t) and $T_f$ are optimizing variables. In one embodiment, the equation (OP) is solved for various values of $T_f$ with $T_f > T_{fmin}$ with $\alpha_3$ set to zero. In this latter case, $T_f$ is treated as a constraint.

For those familiar with solutions to such optimal problems, it may be necessary to adjoin constraints, e.g. the speed limits along the path:

$$0 \le v \le SL(x) \tag{i.}$$

or when using minimum time as the objective, that an end point constraint must hold, e.g., total fuel consumed must be less than what is in the tank, e.g., via:

$$\text{ii. } 0 < \int_0^{T_f} F(u(t))\,dt \le W_F$$

where $W_F$ is the fuel remaining in the tank at $T_f$. Equation (OP) can be in other forms as well and that what is presented above is an exemplary equation for use in the embodiment of the inventive subject matter. For example, a variation of equation (OP) is required where multiple power systems, diesel and/or non-diesel, are used to provide multiple thrusters, such as but not limited to those that may be used when operating a marine vessel.

Reference to emissions in the context of the embodiment of the inventive subject matter is actually directed towards cumulative emissions produced in the form of oxides of nitrogen (NOx), carbon oxides ($CO_x$), unburned hydrocarbons (HC), and particulate matter (PM), etc. However, other emissions may include, but not be limited to a maximum value of electromagnetic emission, such as a limit on radio frequency (RF) power output, measured in watts, for respective frequencies emitted by the locomotive. Yet another form of emission is the noise produced by the locomotive, typically measured in decibels (dB). An emission requirement may be variable based on a time of day, a time of year, and/or atmospheric conditions such as weather or pollutant level in the atmosphere. Emission regulations may vary geographically across a railroad system. For example, an operating area such as a city or state may have specified emission objectives, and an adjacent area may have different emission objectives, for example a lower amount of allowed emissions or a higher fee charged for a given level of emissions.

Accordingly, an emission profile for a certain geographic area may be tailored to include maximum emission values for each of the regulated emissions included in the profile to meet a predetermined emission objective required for that area. Typically, for a locomotive, these emission parameters are determined by, but not limited to, the power (Notch) setting, ambient conditions, engine control method, etc. By design, every locomotive must be compliant with EPA emission standards, and thus in an embodiment of the inventive subject matter that optimizes emissions this may refer to mission-total emissions, for which there is no current EPA specification. Operation of the locomotive according to the optimized trip plan is at all times compliant with EPA emission standards. Because diesel engines are used in other applications, other regulations may also be applicable. For example, $CO_2$ emissions are considered in certain international treaties.

If a key objective during a trip mission is to reduce emissions, the optimal control formulation, equation (OP), would be amended to consider this trip objective. A key flexibility in the optimization setup is that any or all of the trip objectives can vary by geographic region or mission. For example, for a high priority train, minimum time may be the only objective on one route because it is high priority traffic. In another example emission output could vary from state to state along the planned train route.

To solve the resulting optimization problem, in an embodiment the inventive subject matter transcribes a dynamic optimal control problem in the time domain to an equivalent static mathematical programming problem with N decision variables, where the number 'N' depends on the frequency at which throttle and braking adjustments are made and the duration of the trip. For typical problems, this N can be in the thousands. For example, in an embodiment, suppose a train is traveling a 172-mile (276.8 kilometers) stretch of track in the southwest United States. Utilizing the embodiment of the inventive subject matter, an exemplary 7.6% saving in fuel used may be realized when comparing a trip determined and followed using the embodiment of the inventive subject matter versus an actual driver throttle/speed history where the trip was determined by an operator. The improved savings is realized because the optimization realized by using the embodiment of the inventive subject matter produces a driving strategy with both less drag loss and little or no braking loss compared to the trip plan of the operator.

Figure 2:
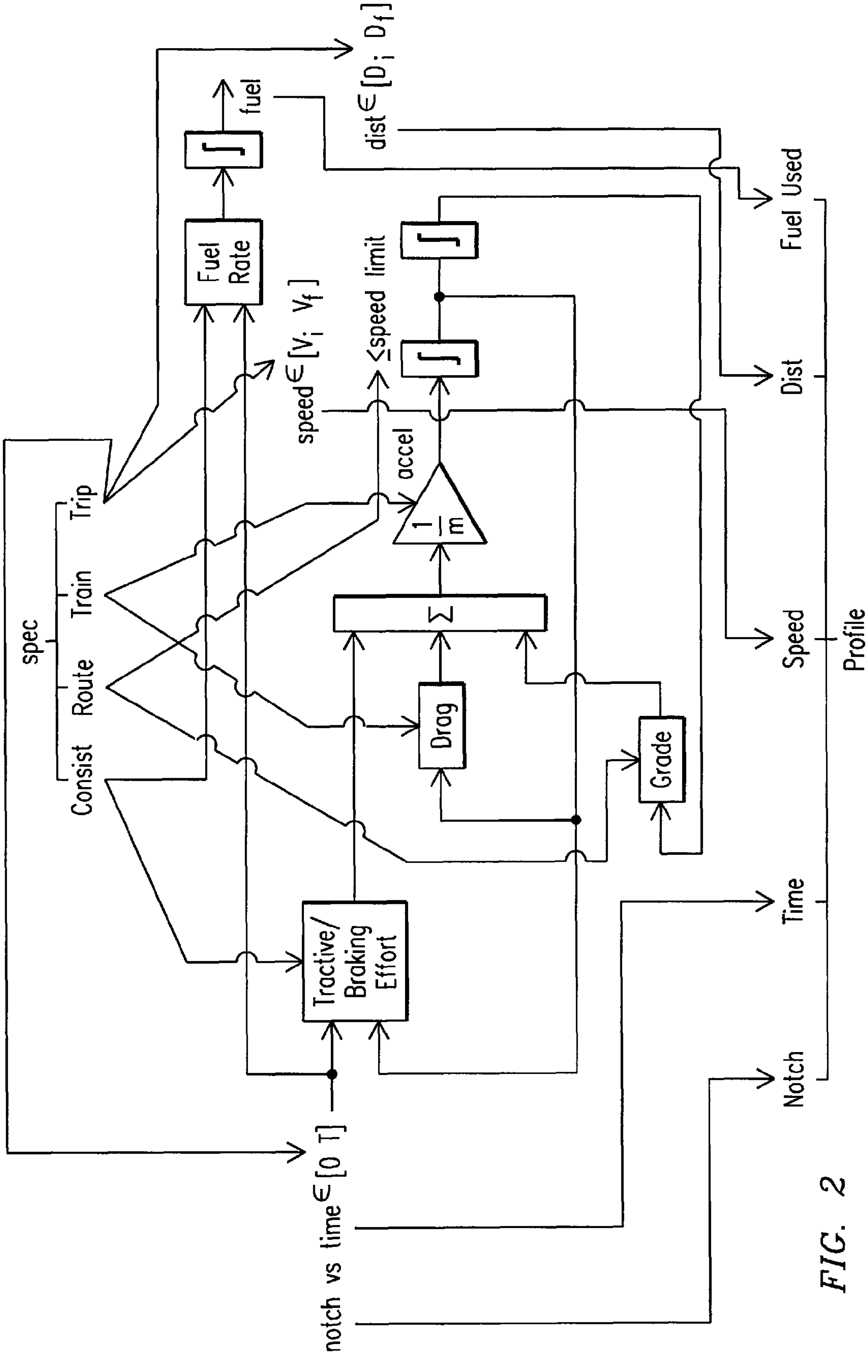
FIG. 2 depicts a simplified mathematical model of the train that may be employed in connection with the inventive subject matter.

To make the optimization described above computationally tractable, a simplified mathematical model of the train may be employed, such as illustrated in FIG. 2 and the equations discussed above. As illustrated, certain set specifications, such as but not limited to information about the consist, route information, train information, and/or trip information, are considered to determine a profile, preferably an optimized profile. Such factors included in the profile include, but are not limited to, speed, distance remaining in the mission, and/or fuel used. As disclosed herein, other factors that may be included in the profile are notch setting and time. One possible refinement to the optimal profile is produced by driving a more detailed model with the optimal power sequence generated, to test if other thermal, electrical, and mechanical constraints are violated. This leads to a modified profile with speed versus distance that is closest to a run that can be achieved without harming locomotive or train equipment, i.e., satisfying additional implied constraints such as thermal and electrical limits on the locomotive and inter-car forces in the train. The equations discussed herein can be utilized with FIG. 2.

Referring back to FIG. 1, once the trip is started 12, power commands are generated 14 to put the plan in motion. Depending on the operational set-up of the embodiment of the inventive subject matter, one command is for the locomotive to follow the optimized power command 16 so as to achieve the optimal speed. The embodiment of the inventive subject matter obtains actual speed and power information from the locomotive consist of the train 18. Owing to the inevitable approximations in the models used for the optimization, a closed-loop calculation of corrections to optimized power is obtained to track the desired optimal speed. Such corrections of train operating limits can be made automatically or by the operator, who always has ultimate control of the train.

In some cases, the model used in the optimization may differ significantly from the actual train. This can occur for many reasons, including but not limited to, extra cargo pickups or setouts, locomotives that fail in route, and errors in the initial database 63 or data entry by the operator. For these reasons a monitoring system is in place that uses real-time train data to estimate locomotive and/or train parameters in real time 20. The estimated parameters are then compared to the assumed parameters used when the trip was initially created 22. Based on any differences in the assumed and estimated values, the trip may be re-planned 24, should large enough savings accrue from a new plan.

Other reasons a trip may be re-planned include directives from a remote location, such as dispatch, and/or the operator requesting a change in objectives to be consistent with more global movement planning objectives. Additional global movement planning objectives may include, but are not limited to, other train schedules, allowing exhaust to dissipate from a tunnel, maintenance operations, etc. Another reason may be due to an onboard failure of a component. Strategies for re-planning may be grouped into incremental and major adjustments depending on the severity of the disruption, as discussed in more detail below. In general, a "new" plan must be derived from a solution to the optimization problem equation (OP) described above, but frequently faster approximate solutions can be found, as described herein.

Figure 4:
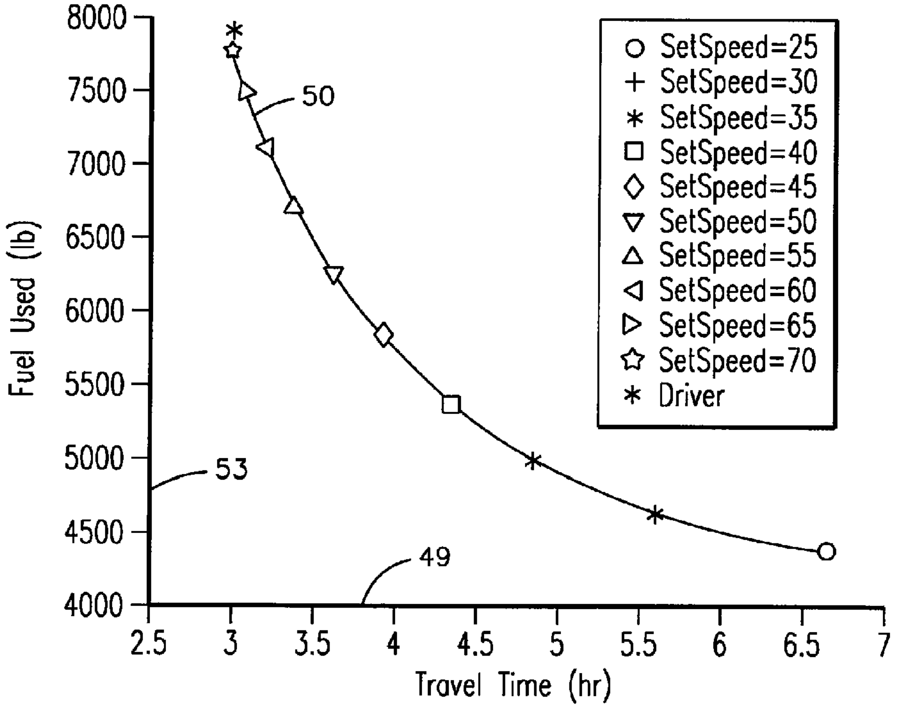
FIG. 4 depicts an embodiment of a fuel-use/travel time curve.

In operation, the locomotive 42 will continuously monitor system efficiency and continuously update the trip plan based on the actual efficiency measured, whenever such an update would improve trip performance. Re-planning computations may be carried out entirely within the locomotive(s) or fully or partially moved to a remote location, such as dispatch or wayside processing facilities where wireless technology is used to communicate the plans to the locomotive 42. The embodiment of the inventive subject matter may also generate efficiency trends that can be used to develop locomotive fleet data regarding efficiency transfer functions. The fleet-wide data may be used when determining the initial trip plan, and may be used for network-wide optimization tradeoff when considering locations of a plurality of trains. For example, the travel-time fuel use tradeoff curve as illustrated in FIG. 4 reflects a capability of a train on a particular route at a current time, updated from ensemble averages collected for many similar trains on the same route. Thus, a central dispatch facility collecting curves like FIG. 4 from many locomotives could use that information to better coordinate overall train movements to achieve a system-wide advantage in fuel use or throughput. As disclosed above, various fuel types, such as but not limited to diesel fuel, heavy marine fuels, palm oil, bio-diesel, etc., may be used.

Furthermore, as disclosed above, various energy storage devices may be used. For example, the amount of power withdrawn from a particular source, such as a diesel engine and batteries, could be optimized so that the maximum fuel efficiency/emission, which may be an objective function, is obtained. As further illustration, suppose the total power demand is 2000 horse power (HP), where the batteries can supply 1500 HP and the engine can supply 4400 HP, the optimum point could be when batteries are supplying 1200 HP and engine is supplying 200 HP.

Similarly, the amount of power may also be based on the amount of energy stored and the need for the energy in the future. For example, if there is a long high demand coming for power, the battery could be discharged at a slower rate. For example if 1000 horsepower hour (HPhr) is stored in the battery and the demand is 4400 HP for the next 2 hours, it may be optimum to discharge the battery at 800 HP for the next 1.25 hours and take 3600 HP from the engine for that duration.

Many events in daily operations can lead to a need to generate or modify a currently executing plan, where it desired to keep the same trip objectives, for example when a train is not on schedule for planned meet or pass with another train and it needs to make up time. Using the actual speed, power and location of the locomotive, a comparison is made between a planned arrival time and the currently estimated (predicted) arrival time 25. Based on a difference in the times, as well as the difference in parameters (detected or changed by dispatch or the operator), the plan is adjusted 26. This adjustment may be made automatically according to a railroad company's desire for how such departures from plan should be handled, or alternatives may be manually proposed for the on-board operator and dispatcher to jointly decide the best way to get back on plan. Whenever a plan is updated but where the original objectives (such as but not limited to arrival time) remain the same, additional changes may be factored in concurrently, e.g., new future speed limit changes, which could affect the feasibility of ever recovering the original plan. In such instances, if the original trip plan cannot be maintained, or in other words the train is unable to meet the original trip plan objectives, as discussed herein other trip plan(s) may be presented to the operator and/or remote facility, or dispatch.

A re-plan may also be made when it is desired to change the original objectives. Such re-planning can be done at either fixed preplanned times, manually at the discretion of the operator or dispatcher, or autonomously when predefined limits, such as train operating limits, are exceeded. For example, if the current plan execution is running late by more than a specified threshold, such as thirty minutes, the embodiment of the inventive subject matter can re-plan the trip to accommodate the delay at the expense of increased fuel use, as described above, or to alert the operator and dispatcher how much of the time can be made up at all (i.e., what minimum time to go or the maximum fuel that can be saved within a time constraint). Other triggers for re-plan can also be envisioned based on fuel consumed or the health of the power consist, including but not limited time of arrival, loss of horsepower due to equipment failure and/or equipment temporary malfunction (such as operating too hot or too cold), and/or detection of gross setup errors, such as in the assumed train load. That is, if the change reflects impairment in the locomotive performance for the current trip, these may be factored into the models and/or equations used in the optimization.

Changes in plan objectives can also arise from a need to coordinate events where the plan for one train compromises the ability of another train to meet objectives and arbitration at a different level, e.g. the dispatch office is required. For example, the coordination of meets and passes may be further optimized through train-to-train communications. Thus, as an example, if a train knows that it is behind schedule in reaching a location for a meet and/or pass, communications from the other train can notify the late train (and/or dispatch). The operator can then enter information pertaining to being late into the embodiment of the inventive subject matter, wherein the embodiment will recalculate the train's trip plan. The embodiment of the inventive subject matter can also be used at a high level, or network level, to allow a dispatch to determine which train should slow down or speed up should a scheduled meet and/or pass time constraint may not be met. As discussed herein, this is accomplished by trains transmitting data to the dispatch to prioritize how each train should change its planning objective. A choice could be based on either schedule or fuel saving benefits, depending on the situation.

Figure 5:
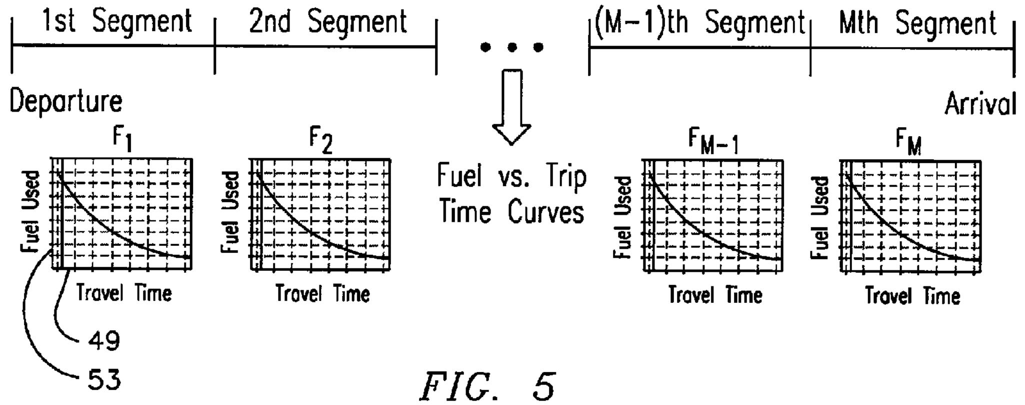
FIG. 5 depicts an embodiment of segmentation decomposition for trip planning.

For any of the manually or automatically initiated re-plans, embodiments of the inventive subject matter may present more than one trip plan to the operator. In an embodiment the inventive subject matter will present different profiles to the operator, allowing the operator to select the arrival time and understand the corresponding fuel and/or emission impact. Such information can also be provided to the dispatch for similar consideration, either as a simple list of alternatives or as a plurality of tradeoff curves such as illustrated in FIG. 5.

The embodiment of the inventive subject matter has the ability to learn and adapt to key changes in the train and power consist which can be incorporated either in the current plan and/or in future plans. For example, one of the triggers discussed above is loss of horsepower. When building up horsepower over time, either after a loss of horsepower or when beginning a trip, transition logic is utilized to determine when desired horsepower is achieved. This information can be saved in the locomotive database 61 for use in optimizing either future trips or the current trip should loss of horsepower occur again.

Likewise, in a similar fashion where multiple thrusters are available, each may need to be independently controlled. For example, a marine vessel may have many force producing elements, or thrusters, such as but not limited to propellers. Each propeller may need to be independently controlled to produce the optimum output. Therefore, utilizing transition logic, the trip optimizer may determine which propeller to operate based on what has been learned previously and by adapting to key changes in the marine vessel's operation.

Figure 3:
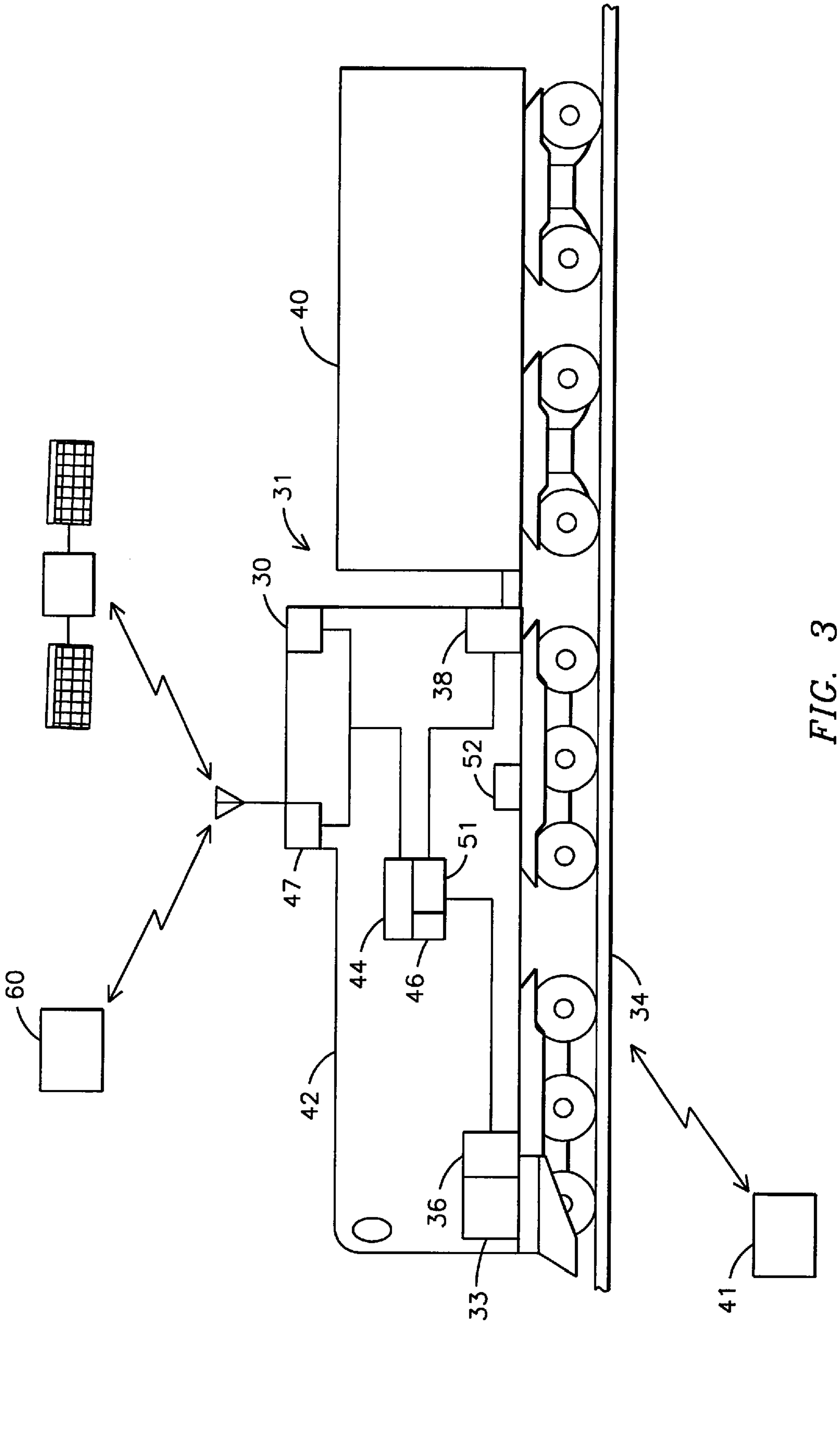
FIG. 3 depicts an embodiment of elements for trip optimization.

FIG. 3 depicts various elements that may be part of a trip optimizer system, according to an embodiment of the invention. A locator element 30 to determine a location of the train 31 is provided. The locator element 30 can be a GPS sensor, or a system of sensors, that determines a location of the train 31. Examples of such other systems may include, but are not limited to, wayside devices, such as radio frequency automatic equipment identification (RF AEI) tags, dispatch, and/or video determination. Another system may include the tachometer(s) aboard a locomotive and distance calculations from a reference point. As discussed previously, a wireless communication system 47 may also be provided to allow for communications between trains and/or with a remote location, such as dispatch. Information about travel locations may also be transferred from other trains.

A track characterization element 33 to provide information about a track, principally grade and elevation and curvature information, is also provided. The track characterization element 33 may include an on-board track integrity database 36. Sensors 38 are used to measure a tractive effort 40 being hauled by the locomotive consist 42, throttle setting of the locomotive consist 42, locomotive consist 42 configuration information, speed of the locomotive consist 42, individual locomotive configuration, individual locomotive capability, etc. In an embodiment the locomotive consist 42 configuration information may be loaded without the use of a sensor 38, but is input in another manner as discussed above. Furthermore, the health of the locomotives in the consist may also be considered. For example, if one locomotive in the consist is unable to operate above power notch level 5, this information is used when optimizing the trip plan.

Information from the locator element may also be used to determine an appropriate arrival time of the train 31. For example, if there is a train 31 moving along a track 34 towards a destination and no train is following behind it, and the train has no fixed arrival deadline to adhere to, the locator element, including but not limited to RF AEI tags, dispatch, and/or video determination, may be used to gage the exact location of the train 31. Furthermore, inputs from these signaling systems may be used to adjust the train speed. Using the on-board track database, discussed below, and the locator element, such as GPS, the embodiment of the inventive subject matter can adjust the operator interface to reflect the signaling system state at the given locomotive location. In a situation where signal states would indicate restrictive speeds ahead, the planner may elect to slow the train to conserve fuel consumption.

Information from the locator element 30 may also be used to change planning objectives as a function of distance to destination. For example, owing to inevitable uncertainties about congestion along the route, "faster" time objectives on the early part of a route may be employed as a hedge against delays that statistically occur later. If it happens on a particular trip that delays do not occur, the objectives on a latter part of the journey can be modified to exploit the built-in slack time that was banked earlier, and thereby recover some fuel efficiency. A similar strategy could be invoked with respect to emissions restrictive objectives, e.g., approaching an urban area.

As an example of the hedging strategy, if a trip is planned from New York to Chicago, the system may have an option to operate the train slower at either the beginning of the trip or at the middle of the trip or at the end of the trip. The embodiment of the inventive subject matter would optimize the trip plan to allow for slower operation at the end of the trip since unknown constraints, such as but not limited to weather conditions, track maintenance, etc., may develop and become known during the trip. As another consideration, if traditionally congested areas are known, the plan is developed with an option to have more flexibility around these traditionally congested regions. Therefore, the embodiment of the inventive subject matter may also consider weighting/penalty as a function of time/distance into the future and/or based on known/past experience. Such planning and re-planning can take into consideration weather conditions, track conditions, other trains on the track, etc., may be taken into consideration at any time during the trip wherein the trip plan is adjust accordingly.

FIG. 3 further discloses other elements that may be part of the embodiment of the inventive subject matter. A processor 44 is provided that is operable to receive information from the locator element 30, track characterizing element 33, and sensors 38. An algorithm 46 operates within the processor 44. The algorithm 46 is used to compute an optimized trip plan based on parameters involving the locomotive 42, train 31, track 34, and objectives of the mission as described above. In an embodiment, the trip plan is established based on models for train behavior as the train 31 moves along the track 34 as a solution of non-linear differential equations derived from physics with simplifying assumptions that are provided in the algorithm. The algorithm 46 has access to the information from the locator element 30, track characterizing element 33, and/or sensors 38 to create a trip plan minimizing fuel consumption of a locomotive consist 42, minimizing emissions of a locomotive consist 42, establishing a desired trip time, and/or ensuring proper crew operating time aboard the locomotive consist 42. In an embodiment, a driver or operator, and/or controller element, 51 is also provided. As discussed herein the controller element 51 is used for controlling the train as it follows the trip plan. In an embodiment discussed further herein, the controller element 51 makes train operating decisions autonomously. In another embodiment the operator may be involved with directing the train to follow the trip plan. The controller element 51 (or controller) may include one or more processors.

A feature of the embodiment of the inventive subject matter is the ability to initially create and quickly modify "on the fly" any plan that is being executed. This includes creating the initial plan when a long distance is involved, owing to the complexity of the plan optimization algorithm. When a total length of a trip profile exceeds a given distance, an algorithm 46 may be used to segment the mission, wherein the mission may be divided by waypoints. Though only a single algorithm 46 is discussed, more than one algorithm may be used (or that the same algorithm may be executed a plurality of times), wherein the algorithms may be connected together. The waypoint may include natural locations where the train 31 stops, such as, but not limited to, sidings where a meet with opposing traffic (or pass with a train behind the current train) is scheduled to occur on a single-track rail, or at yard sidings or industry where cars are to be picked up and set out, and locations of planned work. At such waypoints, the train 31 may be required to be at the location at a scheduled time and be stopped or moving with speed in a specified range. The time duration from arrival to departure at waypoints is called "dwell time."

In an embodiment, the inventive subject matter is able to break down a longer trip into smaller segments in a special systematic way. Each segment can be somewhat arbitrary in length, but is typically picked at a natural location such as a stop or significant speed restriction, or at key mileposts that define junctions with other routes. Given a partition, or segment, selected in this way, a driving profile is created for each segment of track as a function of travel time taken as an independent variable, such as shown in FIG. 4. The fuel used/travel-time tradeoff associated with each segment can be computed prior to the train 31 reaching that segment of track. A total trip plan can be created from the driving profiles created for each segment. The embodiment of the invention distributes travel time amongst all the segments of the trip in an optimal way so that the total trip time required is satisfied and total fuel consumed over all the segments is as small as possible. An exemplary 3-segment trip is disclosed in FIG. 6 and discussed below. Though segments are discussed, the trip plan may comprise a single segment representing the complete trip.

FIG. 4 depicts an embodiment of a fuel-use/travel time curve 50. As mentioned previously, such a curve 50 is created when calculating an optimal trip profile for various travel times for each segment. That is, for a given travel time 49, fuel used 53 is the result of a detailed driving profile computed as described above. Once travel times for each segment are allocated, a power/speed plan is determined for each segment from the previously computed solutions. If there are any waypoint constraints on speed between the segments, such as, but not limited to, a change in a speed limit, they are matched up during creation of the optimal trip profile. If speed restrictions change in only a single segment, the fuel use/travel-time curve 50 has to be recomputed for only the segment changed. This reduces time for having to re-calculate more parts, or segments, of the trip. If the locomotive consist or train changes significantly along the route, e.g., from loss of a locomotive or pickup or set-out of cars, then driving profiles for all subsequent segments must be recomputed, thereby creating new instances of the curve 50. These new curves 50 would then be used along with new schedule objectives to plan the remaining trip.

Once a trip plan is created as discussed above, a trajectory of speed and power versus distance is used to reach a destination with minimum fuel use and/or emissions at the required trip time. There are several ways in which to execute the trip plan. As provided below in more detail, in an embodiment, when in an operator "coaching" mode, information is displayed to the operator for the operator to follow to achieve the required power and speed determined according to the optimal trip plan. In this mode, the operating information includes suggested operating conditions that the operator should use. In another embodiment, acceleration and maintaining a constant speed are autonomously performed. However, when the train 31 must be slowed, the operator is responsible for applying a braking system 52. In another embodiment of the inventive subject matter, commands for powering and braking are provided as required to follow the desired speed-distance path.

Feedback control strategies are used to provide corrections to the power control sequence in the profile to correct for events such as, but not limited to, train load variations caused by fluctuating head winds and/or tail winds. Another such error may be caused by an error in train parameters, such as, but not limited to, train mass and/or drag, when compared to assumptions in the optimized trip plan. A third type of error may occur with information contained in the track database 36. Another possible error may involve un-modeled performance differences due to the locomotive engine, traction motor thermal deration and/or other factors. Feedback control strategies compare the actual speed as a function of position to the speed in the desired optimal profile. Based on this difference, a correction to the optimal power profile is added to drive the actual velocity toward the optimal profile. To ensure stable regulation, a compensation algorithm may be provided which filters the feedback speeds into power corrections so that closed-performance stability is ensured. Compensation may include standard dynamic compensation to meet performance objectives.

Embodiments of the inventive subject matter allow the simplest and therefore fastest means to accommodate changes in trip objectives, which is the rule, rather than the exception in railroad operations. In an embodiment, to determine the fuel-optimal trip from point A to point B where there are stops along the way, and for updating the trip for the remainder of the trip once the trip has begun, a sub-optimal decomposition method is usable for finding an optimal trip profile. Using modeling methods, the computation method can find the trip plan with specified travel time and initial and final speeds, so as to satisfy all the speed limits and locomotive capability constraints when there are stops. Though the following discussion is directed towards optimizing fuel use, it can also be applied to optimize other factors, such as, but not limited to, emissions, schedule, crew comfort, and load impact. The method may be used at the outset in developing a trip plan, and more importantly to adapting to changes in objectives after initiating a trip.

Figure 6:
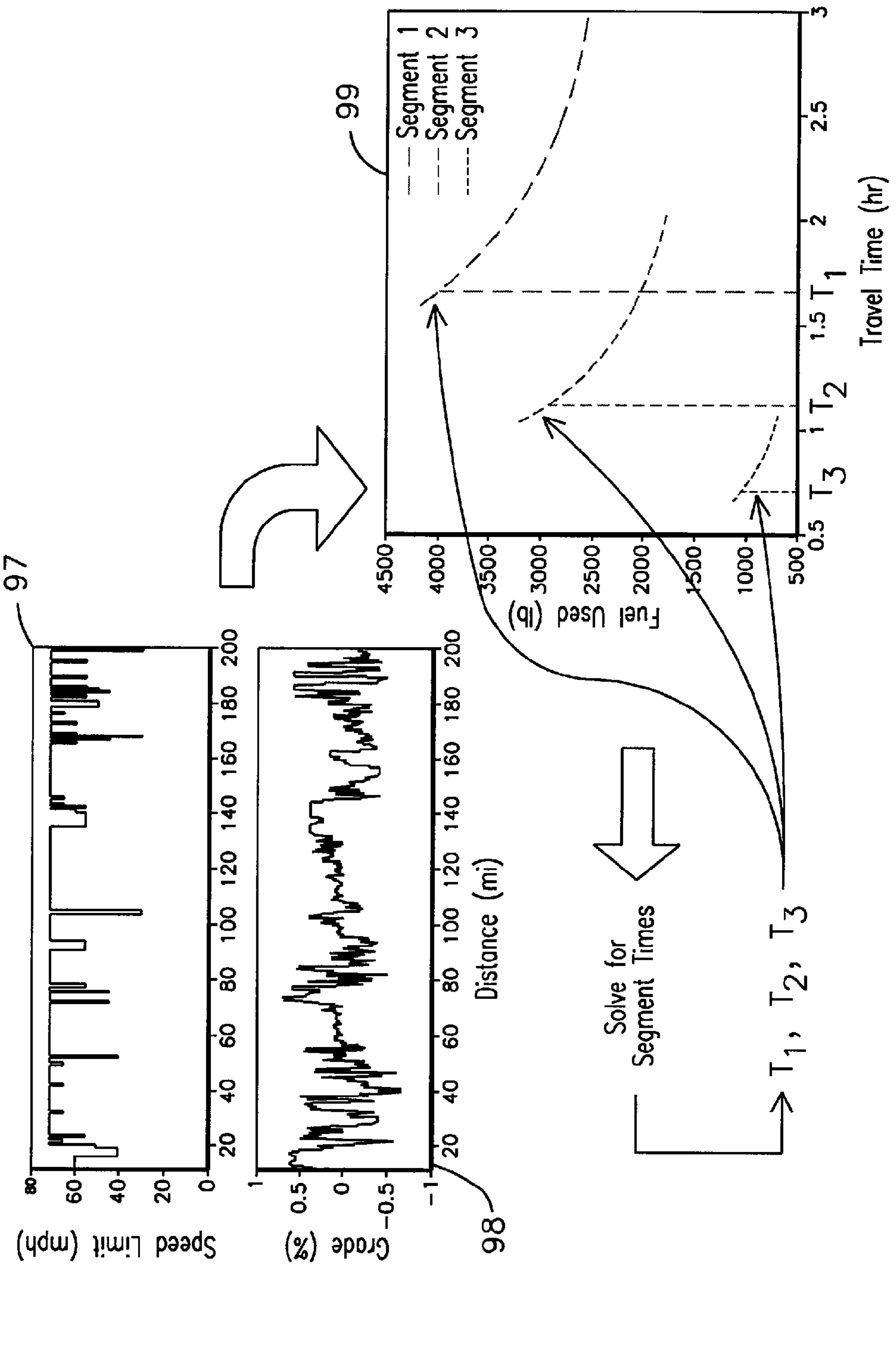
FIG. 6 depicts an embodiment of a segmentation decomposition for trip planning.

As discussed herein, embodiments of the inventive subject matter may employ a setup as illustrated in the exemplary flowchart depicted in FIG. 5, and as an exemplary segment example depicted in detail in FIG. 6. As illustrated, the trip may be broken into two or more segments, T1, T2, and T3. (As noted above, it is possible to consider the trip as a single segment.) As discussed herein, the segment boundaries may not result in equal segments. Instead, the segments may use natural or mission specific boundaries. Optimal trip plans are pre-computed for each segment. If fuel use versus trip time is the trip object to be met, fuel versus trip time curves are built for each segment. As discussed herein, the curves may be based on other factors, wherein the factors are objectives to be met with a trip plan. When trip time is the parameter being determined, trip time for each segment is computed while satisfying the overall trip time constraints. FIG. 6 illustrates speed limits 97 for an exemplary segment, 200-mile (321.9 kilometers) trip. Further illustrated are grade changes 98 over the 200-mile (321.9 kilometers) trip. A combined chart 99 illustrating curves for each segment of the trip of fuel used over the travel time is also shown.

Using the optimal control setup described previously, the present computation method can find the trip plan with specified travel time and initial and final speeds, so as to satisfy all the speed limits and locomotive capability constraints when there are stops. Though the following detailed discussion is directed towards optimizing fuel use, it can also be applied to optimize other factors as discussed herein, such as, but not limited to, emissions. A key flexibility is to accommodate desired dwell time at stops and to consider constraints on earliest arrival and departure at a location as may be required, for example, in single-track operations where the time to be in or get by a siding is critical.

Embodiments of the inventive subject matter find a fuel-optimal trip from distance $D_0$ to $D_M$, traveled in time T, with M−1 intermediate stops at $D_1, \ldots, D_{M-1}$, and with the arrival and departure times at these stops constrained by:

$$t_{min}(i) \le t_{arr}(D_i) \le t_{max}(i) - \Delta t_i$$

$$t_{arr}(D_i) + \Delta t_i \le t_{dep}(D_i) \le t_{max}(i) \quad i=1, \ldots, M-1$$

where $t_{arr}(D_i)$, $t_{dep}(D_i)$, and $\Delta t_i$ are the arrival, departure, and minimum stop time at the $i^{th}$ stop, respectively. Assuming that fuel-optimality implies minimizing stop time, therefore $t_{dep}(D_i)=t_{arr}(D_i)+\Delta t_i$ which eliminates the second inequality above. Suppose for each i=1, . . . , M, the fuel-optimal trip from $D_{i-1}$ to $D_i$ for travel time t, $T_{min}(i) \le t \le T_{max}(i)$, is known. Let $F_i(t)$ be the fuel-use corresponding to this trip. If the travel time from $D_{j-1}$ to $D_j$ is denoted $T_j$, then the arrival time at $D_i$ is given by:

$$\text{i. } t_{arr}(D_i) = \sum_{j=1}^{i} (T_j + \Delta t_{j-1})$$

where $\Delta t_0$ is defined to be zero. The fuel-optimal trip from $D_0$ to $D_M$ for travel time T is then obtained by finding $T_i$, i=1, . . . , M, which minimize:

$$\text{ii. } \sum_{i=1}^{M} F_i(T_i) \quad T_{min}(i) \le T_i \le T_{max}(i)$$

subject to:

$$\text{iii. } t_{min}(i) \le \sum_{j=1}^{i} (T_j + \Delta t_{j-1}) \le t_{max}(i) - \Delta t_i$$

$$i = 1, \ldots, M-1$$

$$\text{iv. } \sum_{j=1}^{M} (T_j + \Delta t_{j-1}) = T$$

Once a trip is underway, the issue is re-determining the fuel-optimal solution for the remainder of a trip (originally from $D_0$ to $D_M$ in time T) as the trip is traveled, but where disturbances preclude following the fuel-optimal solution. Let the current distance and speed be x and v, respectively, where $D_{i-1} \le x \le D_i$. Also, let the current time since the beginning of the trip be $t_{act}$. Then the fuel-optimal solution for the remainder of the trip from x to $D_M$, which retains the original arrival time at $D_M$, is obtained by finding $\tilde{T}_i$, $T_j$, j=i+1, . . . M, which minimize:

$$\text{i. } \tilde{F}_i(\tilde{T}_i, x, v) + \sum_{j=i+1}^{M} F_j(T_j)$$

subject to:

$$\text{ii. } t_{min}(i) \le t_{act} + \tilde{T}_i \le t_{max}(i) - \Delta t_i$$

$$\text{iii. } t_{min}(k) \le t_{act} + \tilde{T}_i + \sum_{j=i+1}^{k} (T_j + \Delta t_{j-1}) \le t_{max}(k) - \Delta t_k$$

$$k = i+1, \ldots, M-1$$

$$\text{iv. } t_{act} + \tilde{T}_i + \sum_{j=i+1}^{M} (T_j + \Delta t_{j-1}) = T$$

Here, $\tilde{F}_i(t, x, v)$ is the fuel-used of the optimal trip from x to $D_i$, traveled in time t, with initial speed at x of v.

As discussed above, an exemplary way to enable more efficient re-planning is to construct the optimal solution for a stop-to-stop trip from partitioned segments. For the trip from $D_{i-1}$ to $D_i$, with travel time $T_i$, choose a set of intermediate points $D_{ij}$, j=1, . . . , $N_{i-1}$. Let $D_{i0}=D_{i-1}$ and $D_{iN_i}=D_i$. Then express the fuel-use for the optimal trip from $D_{i-1}$ to $D_i$ as:

$$\text{i. } F_i(t) = \sum_{j=1}^{N_i} f_{ij}(t_{ij} - t_{i,j-1}, v_{i,j-1}, v_{ij})$$

where $f_{ij}(t, v_{i,j-1}, v_{ij})$ is the fuel-use for the optimal trip from $D_{i,j-1}$ to $D_{ij}$, traveled in time t, with initial and final speeds $v_{i,j-1}$ of and $v_{ij}$. Furthermore, $t_{ij}$ is the time in the optimal trip corresponding to distance $D_{ij}$. By definition, $t_{iN_i}-t_{i0}=T_i$. Since the train is stopped at $D_{i0}$, and $D_{iN_i}$, $v_{i0}=v_{iN_i}=0$.

The above expression enables the function $F_i(t)$ to be alternatively determined by first determining the functions $f_{ij}(\bullet)$, $1 \le j \le N_i$, then finding $\tau_{ij}, 1 \le j \le N_i$ and $v_{ij}, 1 \le j \le N_i$, which minimize:

$$\text{i. } F_i(t) = \sum_{j=1}^{N_i} f_{ij}(\tau_{ij}, v_{i,j-1}, v_{ij})$$

subject to:

$$\text{ii. } \sum_{j=1}^{N_i} \tau_{ij} = T_i$$

$$\text{iii. } v_{min}(i, j) \le v_{ij} \le v_{max}(i, j)$$

$$j = 1, \ldots, N_i - 1$$

$$\text{iv. } v_{i0} = v_{iN_i} = 0$$

By choosing $D_{ij}$ (e.g., at speed restrictions or meeting points), $v_{max}(i, j)-v_{min}(i, j)$ can be minimized, thus minimizing the domain over which $f_{ij}(\,)$ needs to be known.

Based on the partitioning above, a simpler suboptimal re-planning approach than that described above is to restrict re-planning to times when the train is at distance points $D_{ij}$, $1 \le i \le M$, $1 \le j \le N_i$. At point $D_{ij}$, the new optimal trip from $D_{ij}$ to $D_M$ can be determined by finding $\tau_{ik}$, $j \le k \le N_i$, $v_{ik}$, $j<k<N_i$, and $\tau_{mn}$, $i<m \le M$, $1 \le n \le N_m$, $v_{mn}$, $i<m \le M$, $1 \le n < N_m$, which minimize:

$$\text{i. } \sum_{k=j+1}^{N_i} f_{ik}(\tau_{ik}, v_{i,k-1}, v_{ik}) + \sum_{m=i+1}^{M} \sum_{n=1}^{N_m} f_{mn}(\tau_{mn}, v_{m,n-1}, v_{mn})$$

subject to:

$$\text{ii. } t_{min}(i) \le t_{act} + \sum_{k=j+1}^{N_i} \tau_{ik} \le t_{max}(i) - \Delta t_i$$

$$\text{iii. } t_{min}(n) \le t_{act} + \sum_{k=j+1}^{N_i} \tau_{ik} + \sum_{m=i+1}^{n} (T_m + \Delta t_{m-1}) \le t_{max}(n) - \Delta t_n$$

$$n = i+1, \ldots, M-1$$

$$\text{iv. } t_{act} + \sum_{k=j+1}^{N_i} \tau_{ik} + \sum_{m=i+1}^{M} (T_m + \Delta t_{m-1}) = T$$

where:

$$\text{v. } T_m = \sum_{n=1}^{N_m} \tau_{mn}$$

A further simplification is obtained by waiting on the re-computation of $T_m$, $i<m \le M$, until distance point $D_i$ is reached. In this way, at points $D_{ij}$ between $D_{i-1}$ and $D_i$, the minimization above needs only be performed over $\tau_{ik}$, $j<k \le N_i$, $v_{ik}$, $j<k<N_i$. $T_i$ is increased as needed to accommodate any longer actual travel time from $D_{i-1}$ to $D_{ij}$ than planned. This increase is later compensated, if possible, by the re-computation of $T_m$, $i<m \le M$, at distance point $D_i$.

With respect to the closed-loop configuration disclosed above, the total input energy required to move a train 31 from point A to point B consists of the sum of four components, specifically, difference in kinetic energy between points A and B; difference in potential energy between points A and B; energy loss due to friction and other drag losses; and energy dissipated by the application of brakes. Assuming the start and end speeds to be equal (e.g., stationary), the first component is zero. Furthermore, the second component is independent of driving strategy. Thus, it suffices to minimize the sum of the last two components.

Following a constant speed profile minimizes drag loss. Following a constant speed profile also minimizes total energy input when braking is not needed to maintain constant speed. However, if braking is required to maintain constant speed, applying braking just to maintain constant speed will most likely increase total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, the new optimal notch/speed plan can be followed using the closed loop control described herein. However, in some situations there may not be enough time to carry out the segment decomposed planning described above, and particularly when there are critical speed restrictions that must be respected, an alternative is needed. Embodiments of the inventive subject matter accomplish this with an algorithm referred to as "smart cruise control." The smart cruise control algorithm is an efficient way to generate, on the fly, an energy-efficient (hence fuel-efficient) sub-optimal prescription for driving the train 31 over a known terrain. This algorithm assumes knowledge of the position of the train 31 along the track 34 at all times, as well as knowledge of the grade and curvature of the track versus position. The method relies on a point-mass model for the motion of the train 31, whose parameters may be adaptively estimated from online measurements of train motion as described earlier.

The smart cruise control algorithm has three principal components, specifically, a modified speed limit profile that serves as an energy-efficient (and/or emissions efficient or any other objective function) guide around speed limit reductions; an ideal throttle or dynamic brake setting profile that attempts to balance between minimizing speed variation and braking; and a mechanism for combining the latter two components to produce a notch command, employing a speed feedback loop to compensate for mismatches of modeled parameters when compared to reality parameters. Smart cruise control can accommodate strategies in embodiments of the inventive subject matter that do no active braking (e.g., the driver is signaled and assumed to provide the requisite braking) or a variant that does active braking.

With respect to the cruise control algorithm that does not control dynamic braking, the three exemplary components are a modified speed limit profile that serves as an energy-efficient guide around speed limit reductions, a notification signal directed to notify the operator when braking should be applied, an ideal throttle profile that attempts to balance between minimizing speed variations and notifying the operator to apply braking, a mechanism employing a feedback loop to compensate for mismatches of model parameters to reality parameters.

Also included in embodiments of the inventive subject matter is an approach to identify key parameter values of the train 31. For example, with respect to estimating train mass, a Kalman filter and a recursive least-squares approach may be utilized to detect errors that may develop over time.

Figure 7:
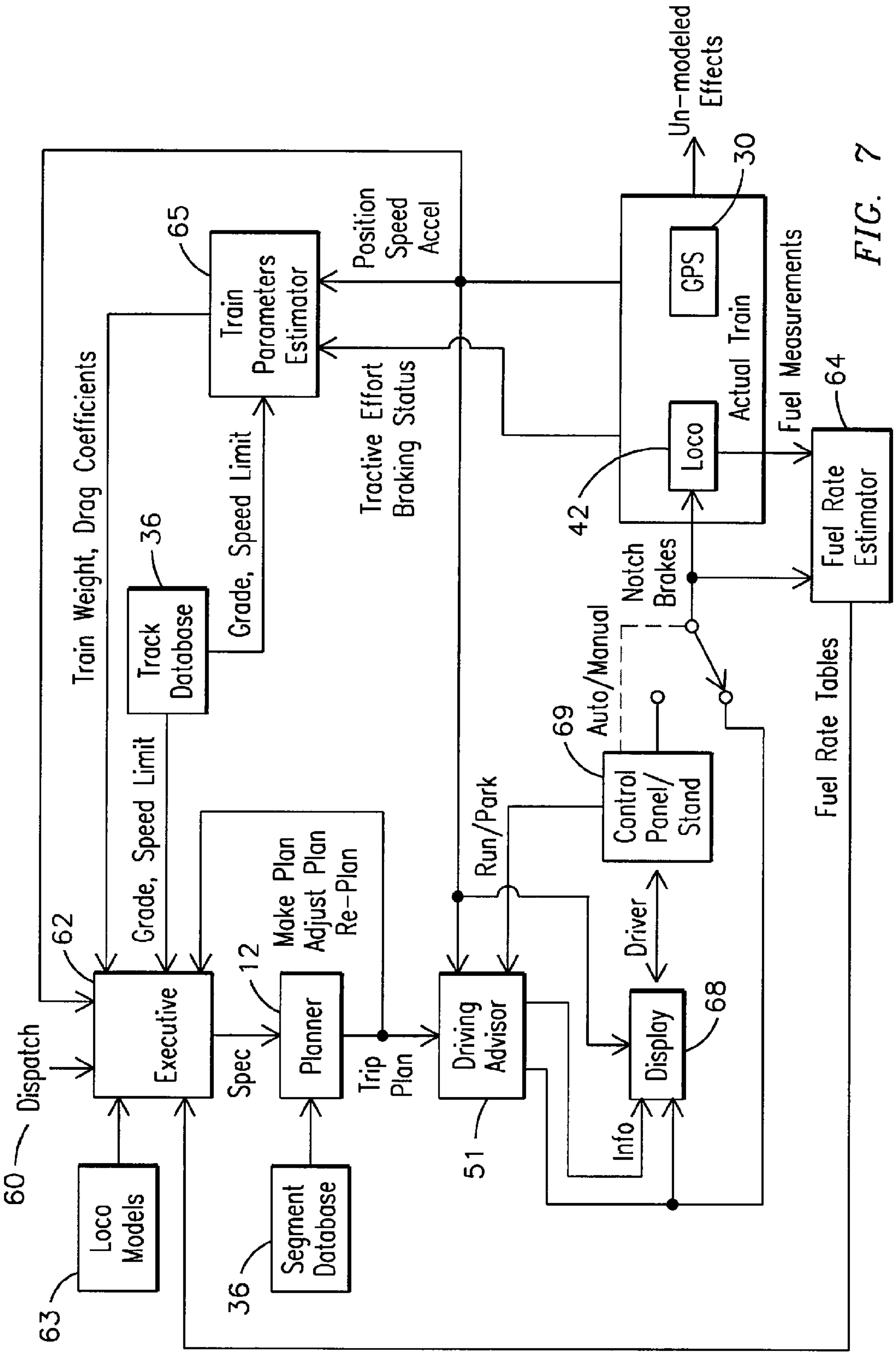
FIG. 7 depicts an example flowchart of trip optimization.

FIG. 7 depicts an exemplary flowchart of the inventive subject matter. As discussed previously, a remote facility, such as a dispatch 60, can provide information. As illustrated, such information is provided to an executive control element 62. Also supplied to the executive control element 62 is information from a locomotive modeling database 63, information from a track database 36 such as, but not limited to, track grade information and speed limit information, estimated train parameters such as, but not limited to, train weight and drag coefficients, and fuel rate tables from a fuel rate estimator 64. The executive control element 62 supplies information to the planner 12, which is disclosed in more detail in FIG. 1. Once a trip plan has been calculated, the plan is supplied to a driving advisor, driver, or controller element 51. The trip plan is also supplied to the executive control element 62 so that it can compare the trip when other new data is provided.

As discussed above, the driving advisor 51 can automatically set a notch power, either a pre-established notch setting or an optimum continuous notch power. In addition to supplying a speed command to the locomotive 42, a display 68 is provided so that the operator can view what the planner has recommended. The operator also has access to a control panel 69. Through the control panel 69 the operator can decide whether to apply the notch power recommended. Towards this end, the operator may limit a targeted or recommended power. That is, at any time the operator always has final authority over what power setting the locomotive consist will operate at. This includes deciding whether to apply braking if the trip plan recommends slowing the train 31. For example, if operating in dark territory, or where information from wayside equipment cannot electronically transmit information to a train and instead the operator views visual signals from the wayside equipment, the operator inputs commands based on information contained in the track database and visual signals from the wayside equipment. Based on how the train 31 is functioning, information regarding fuel measurement is supplied to the fuel rate estimator 64. Since direct measurement of fuel flows is not typically available in a locomotive consist, all information on fuel consumed so far within a trip and projections into the future following optimal plans is carried out using calibrated physics models such as those used in developing the optimal plans. For example, such predictions may include, but are not limited to, the use of measured gross horse-power and known fuel characteristics and emissions characteristics to derive the cumulative fuel used and emissions generated.

The train 31 also has a locator device 30 such as a GPS sensor, as discussed above. Information is supplied to the train parameters estimator 65. Such information may include, but is not limited to, GPS sensor data, tractive/braking effort data, braking status data, speed, and any changes in speed data. With information regarding grade and speed limit information, train weight and drag coefficients information is supplied to the executive control element 62.

Embodiments of the inventive subject matter may also allow for the use of continuously variable power throughout the optimization planning and closed loop control implementation. In a conventional locomotive, power is typically quantized to eight discrete levels. Modern locomotives can realize continuous variation in horsepower which may be incorporated into the previously described optimization methods. With continuous power, the locomotive 42 can further optimize operating conditions, e.g., by minimizing auxiliary loads and power transmission losses, and fine tuning engine horsepower regions of optimum efficiency, or to points of increased emissions margins. Example include, but are not limited to, minimizing cooling system losses, adjusting alternator voltages, adjusting engine speeds, and reducing number of powered axles. Further, the locomotive 42 may use the on-board track database 36 and the forecasted performance requirements to minimize auxiliary loads and power transmission losses to provide optimum efficiency for the target fuel consumption/emissions. Examples include, but are not limited to, reducing a number of powered axles on flat terrain and pre-cooling the locomotive engine prior to entering a tunnel.

Embodiments of the inventive subject matter may also use the on-board track database 36 and the forecasted performance to adjust the locomotive performance, such as to insure that the train has sufficient speed as it approaches a hill and/or tunnel. For example, this could be expressed as a speed constraint at a particular location that becomes part of the optimal plan generation created solving the equation (OP). Additionally, embodiments of the inventive subject matter may incorporate train-handling rules, such as, but not limited to, tractive effort ramp rates and maximum braking effort ramp rates. These may be incorporated directly into the formulation for optimum trip profile or alternatively incorporated into the closed loop regulator used to control power application to achieve the target speed.

In one embodiment, the inventive subject matter is only installed on a lead locomotive of the train consist. Even though embodiments of the inventive subject matter are not dependant on data or interactions with other locomotives, it may be integrated with a consist manager, as disclosed in U.S.

Pat. No. 6,691,957 and U.S. Pat. No. 7,021,588 (owned by the Assignee and both incorporated by reference), functionality and/or a consist optimizer functionality to improve efficiency. Interaction with multiple trains is not precluded, as illustrated by the example of dispatch arbitrating two "independently optimized" trains described herein.

Trains with distributed power systems can be operated in different modes. One mode is where all locomotives in the train operate at the same notch command. So if the lead locomotive is commanding motoring—N8, all units in the train will be commanded to generate motoring—N8 power. Another mode of operation is "independent" control. In this mode, locomotives or sets of locomotives distributed throughout the train can be operated at different motoring or braking powers. For example, as a train crests a mountaintop, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives. Traditionally, operating the distributed power system in "independent" mode required the operator to manually command each remote locomotive or set of locomotives via a display in the lead locomotive. Using the physics based planning model, train set-up information, on-board track database, on-board operating rules, location determination system, real-time closed loop power/brake control, and sensor feedback, the system is able to automatically operate the distributed power system in "independent" mode.

When operating in distributed power, the operator in a lead locomotive can control operating functions of remote locomotives in the remote consists via a control system, such as a distributed power control element. Thus when operating in distributed power, the operator can command each locomotive consist to operate at a different notch power level (or one consist could be in motoring and another could be in braking), wherein each individual locomotive in the locomotive consist operates at the same notch power. In an embodiment, with an embodiment of the inventive subject matter installed on the train, preferably in communication with the distributed power control element, when a notch power level for a remote locomotive consist is desired as recommended by the optimized trip plan, the embodiment of the inventive subject matter will communicate this power setting to the remote locomotive consists for implementation. As discussed below, the same is true regarding braking.

Embodiments of the inventive subject matter may be used with consists in which the locomotives are not contiguous, e.g., with 1 or more locomotives up front and others in the middle and/or at the rear for train. Such configurations are called distributed power, wherein the standard connection between the locomotives is replaced by radio link or auxiliary cable to link the locomotives externally. When operating in distributed power, the operator in a lead locomotive can control operating functions of remote locomotives in the consist via a control system, such as a distributed power control element. In particular, when operating in distributed power, the operator can command each locomotive consist to operate at a different notch power level (or one consist could be in motoring and other could be in braking), wherein each individual in the locomotive consist operates at the same notch power.

In an embodiment, with an embodiment of the inventive subject matter installed on the train, preferably in communication with the distributed power control element, when a notch power level for a remote locomotive consist is desired as recommended by the optimized trip plan, the embodiment of the inventive subject matter will communicate this power setting to the remote locomotive consists for implementation. As discussed below, the same is true regarding braking. When operating with distributed power, the optimization problem previously described can be enhanced to allow additional degrees of freedom, in that each of the remote units can be independently controlled from the lead unit. The value of this is that additional objectives or constraints relating to in-train forces may be incorporated into the performance function, assuming the model to reflect the in-train forces is also included. Thus, embodiments of the inventive subject matter may include the use of multiple throttle controls to better manage in-train forces as well as fuel consumption and emissions.

In a train utilizing a consist manager, the lead locomotive in a locomotive consist may operate at a different notch power setting than other locomotives in that consist. The other locomotives in the consist operate at the same notch power setting. Embodiments of the inventive subject matter may be utilized in conjunction with the consist manager to command notch power settings for the locomotives in the consist. Thus, based on embodiments of the inventive subject matter, since the consist manager divides a locomotive consist into two groups, namely, lead locomotive and trail units, the lead locomotive will be commanded to operate at a certain notch power and the trail locomotives are commanded to operate at another certain notch power. In an embodiment the distributed power control element may be the system and/or apparatus where this operation is housed.

Likewise, when a consist optimizer is used with a locomotive consist, embodiments of the inventive subject matter can be used in conjunction with the consist optimizer to determine notch power for each locomotive in the locomotive consist. For example, suppose that a trip plan recommends a notch power setting of 4 for the locomotive consist. Based on the location of the train, the consist optimizer will take this information and then determine the notch power setting for each locomotive in the consist. In this implementation, the efficiency of setting notch power settings over intra-train communication channels is improved. Furthermore, as discussed above, implementation of this configuration may be performed utilizing the distributed control system.

Furthermore, as discussed previously, embodiments of the inventive subject matter may be used for continuous corrections and re-planning with respect to when the train consist uses braking based on upcoming items of interest, such as but not limited to, railroad crossings, grade changes, approaching sidings, approaching depot yards, and approaching fuel stations, where each locomotive in the consist may require a different braking option. For example, if the train is coming over a hill, the lead locomotive may have to enter a braking condition, whereas the remote locomotives, having not reached the peak of the hill may have to remain in a motoring state.

Figure 8:
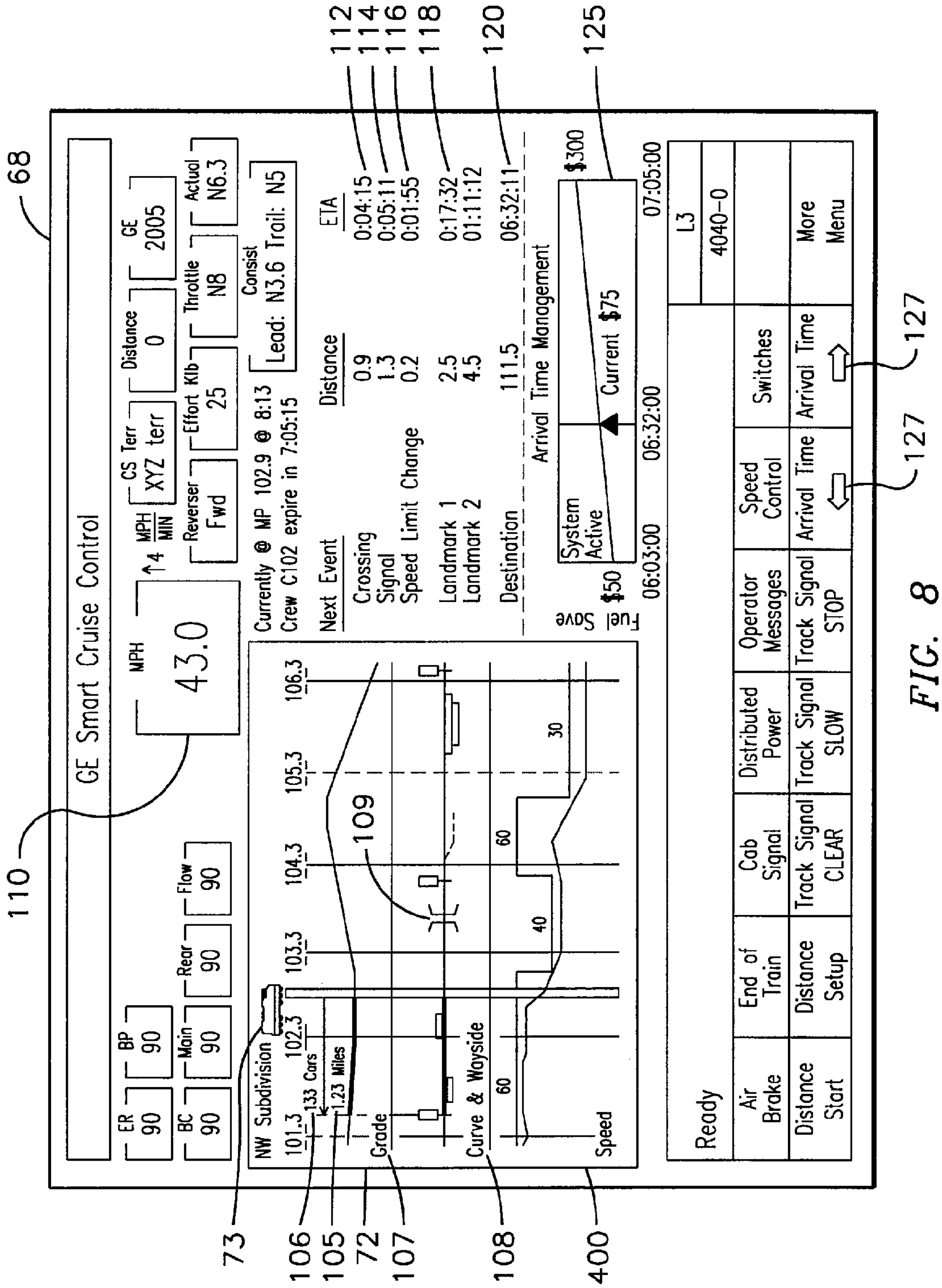
FIG. 8 depicts an illustration of a dynamic display for use by an operator.
Figure 9:
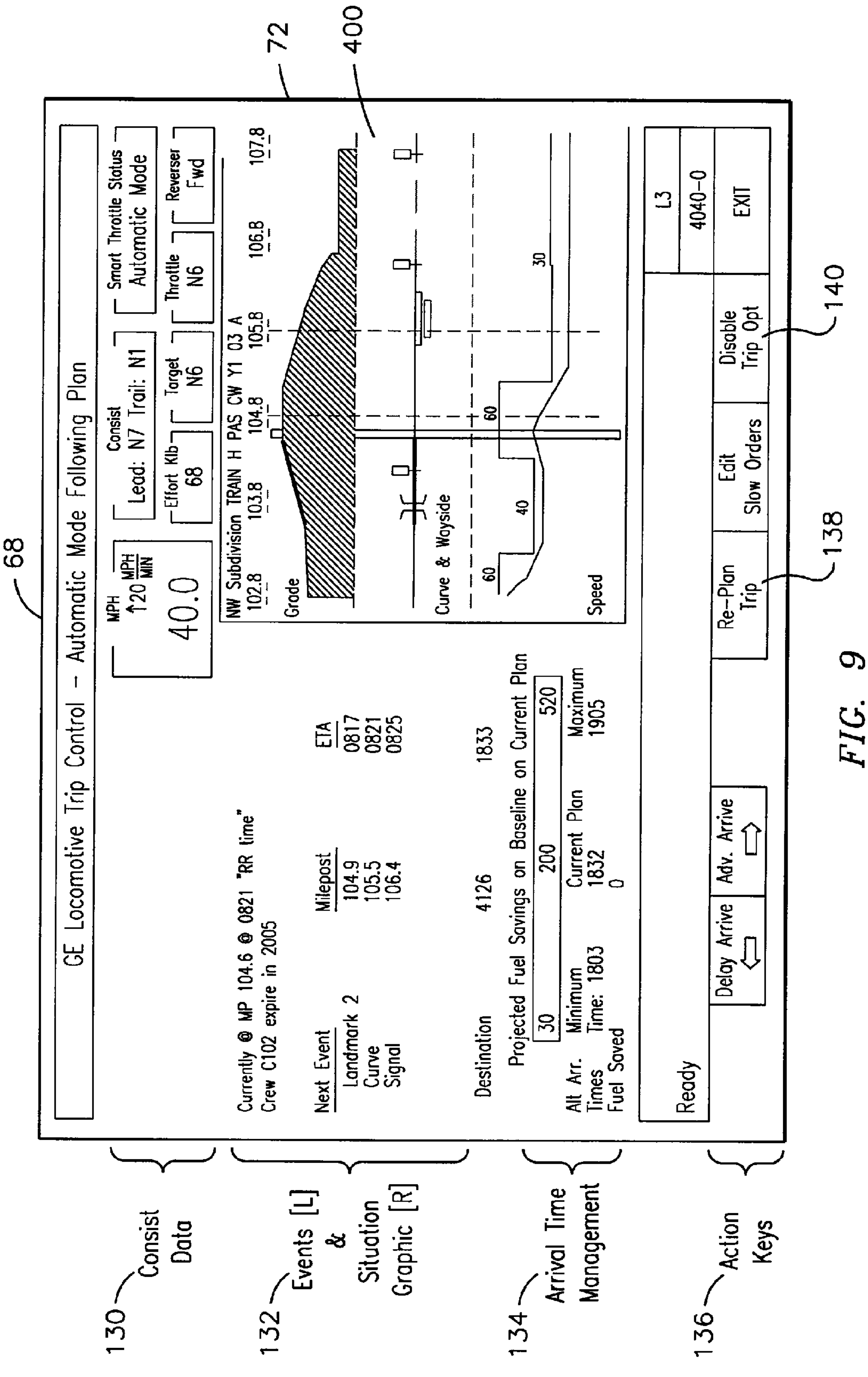
FIG. 9 depicts another illustration of a dynamic display for use by the operator.
Figure 10:
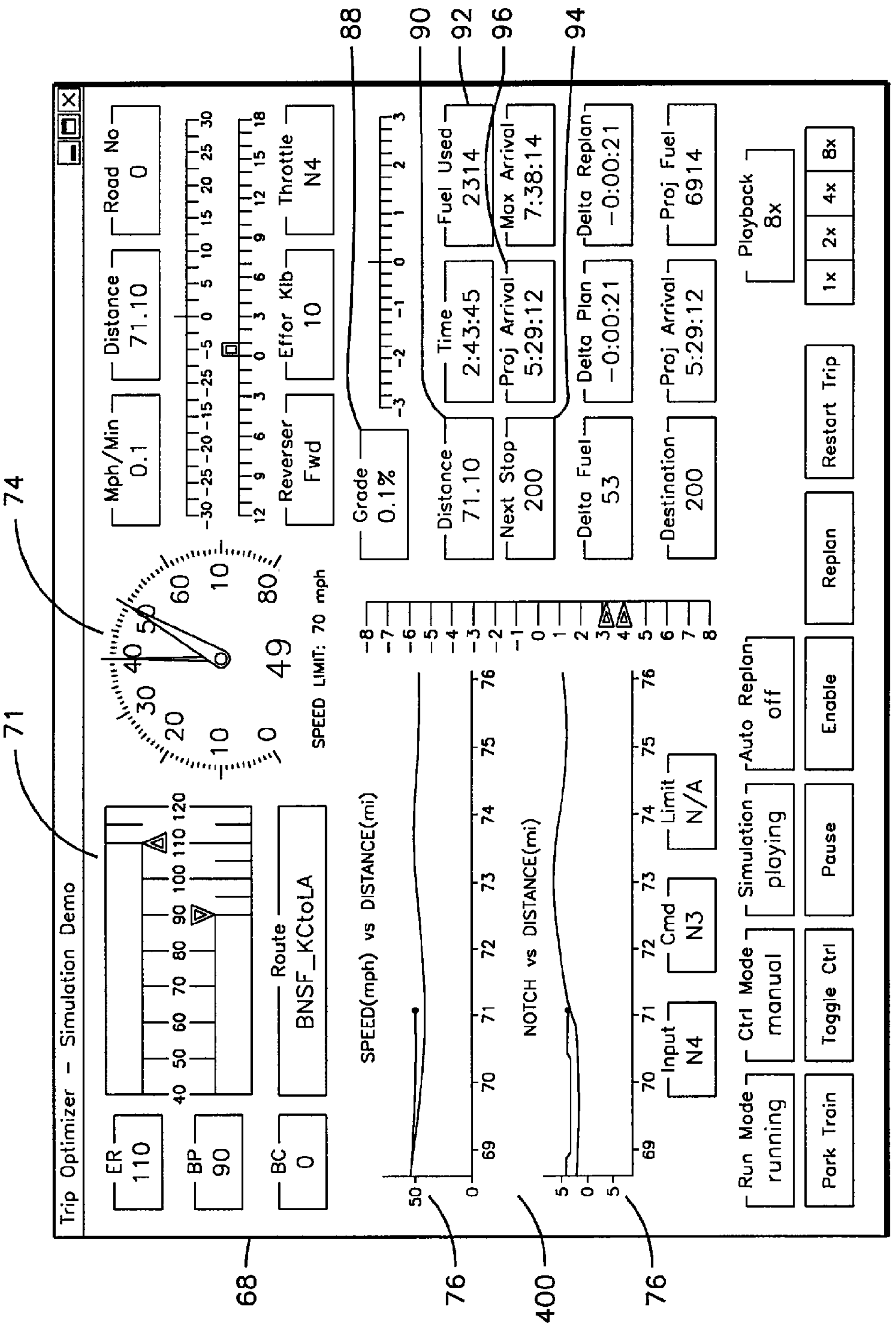
FIG. 10 depicts another illustration of a dynamic display for use by the operator.

FIGS. 8, 9, and 10 depict exemplary illustrations of dynamic displays for use by the operator. As shown in FIG. 8, a trip profile 72 is provided in the form of a rolling map 400. Within the profile a location 73 of the locomotive is provided. Such information as train length 105 and the number of cars 106 in the train is also provided. Display elements are also provided regarding track grade 107, curve and wayside elements 108, including bridge location 109, and train speed 110. The display 68 allows the operator to view such information and also see where the train is along the route. Information pertaining to distance and/or estimated time of arrival to such locations as crossings 112, signals 114, speed changes 116, landmarks 118, and destinations 120 is provided. An arrival time management tool 125 is also provided to allow the user to determine the fuel savings that is being realized during the trip. The operator has the ability to vary arrival times 127 and witness how this affects the fuel savings. As discussed herein, fuel saving is an example of only one objective that can be reviewed with a management tool. Towards this end, depending on the parameter being viewed, other parameters discussed herein can be viewed and evaluated with a management tool that is visible to the operator. The operator is also provided information about how long the crew has been operating the train. In embodiments time and distance information may either be illustrated as the time and/or distance until a particular event and/or location, or it may provide a total time.

As illustrated in FIG. 9, an exemplary display provides information about consist data 130, an events and situation graphic 132, an arrival time management tool 134, and action keys 136. Similar information as discussed above is provided in this display as well. This display 68 also provides action keys 138 to allow the operator to re-plan as well as to disengage 140 embodiments of the inventive subject matter.

FIG. 10 depicts another embodiment of the display. Data typical of a modern locomotive including air-brake status 71, analog speedometer with digital insert, or indicator, 74, and information about tractive effort in pounds force (or fraction amps for DC locomotives) is visible. An indicator 74 is provided to show the current optimal speed in the plan being executed, as well as an accelerometer graphic to supplement the readout in mph/minute. Important new data for optimal plan execution is in the center of the screen, including a rolling strip graphic 76 with optimal speed and notch setting versus distance compared to the current history of these variables. In this embodiment, the location of the train is derived using the locator element. As illustrated, the location is provided by identifying how far the train is away from its final destination, an absolute position, an initial destination, an intermediate point, and/or an operator input.

The strip chart provides a look-ahead to changes in speed required to follow the optimal plan, which is useful in manual control, and monitors plan versus actual during automatic control. As discussed herein, such as when in the coaching mode, the operator can follow either the notch or speed suggested by embodiments of the inventive subject matter. The vertical bar gives a graphic of desired and actual notch, which are also displayed digitally below the strip chart. When continuous notch power is utilized, as discussed above, the display will simply round to the closest discrete equivalent. The display may be an analog display so that an analog equivalent or a percentage or actual horse power/tractive effort is displayed.

Critical information on trip status is displayed on the screen, and shows the current grade the train is encountering 88, either by the lead locomotive, a location elsewhere along the train, or an average over the train length. A distance traveled so far in the plan 90, cumulative fuel used 92, where the next stop is planned 94 (or a distance away therefrom), current and projected arrival time 96, and expected time to be at next stop are also disclosed. The display 68 also shows the maximum possible time to destination possible with the computed plans available. If a later arrival was required, a re-plan would be carried out. Delta plan data shows status for fuel and schedule ahead or behind the current optimal plan. Negative numbers mean less fuel or early compared to plan, positive numbers mean more fuel or late compared to plan, and typically trade-off in opposite directions (slowing down to save fuel makes the train late and conversely).

At all times, these displays 68 give the operator a snapshot of where he stands with respect to the currently instituted driving plan. This display is for illustrative purpose only as there are many other ways of displaying/conveying this information to the operator and/or dispatch. Towards this end, the information disclosed herein could be intermixed to provide a display different than the ones disclosed.

Figure 11:
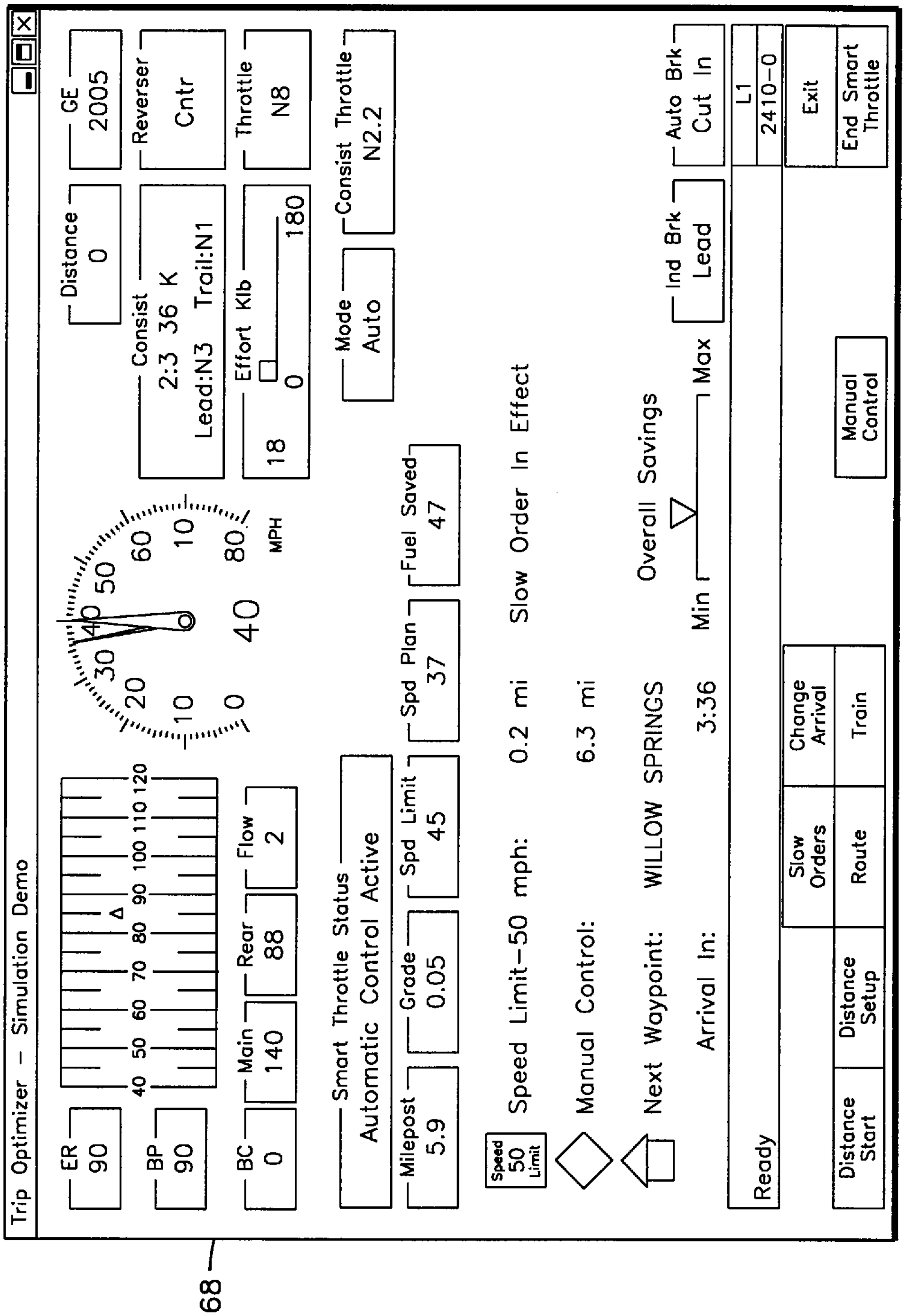
FIG. 11 depicts another illustration of a dynamic display for use by the operator.

FIG. 11 depicts another exemplary illustration of a dynamic display for use by the operator. In this display, the current location, grade, speed limit, plan speed and fuel saved are displayed as current numerical values rather than in graphical form. In this display, the use of an event list is used to inform the operator of upcoming events or landmarks rather than a rolling map or chart.

In an additional embodiment of the inventive subject matter, a method may be utilized to enter train manifest and general track bulletin information on the locomotive. Such information may be entered manually using the existing operating displays 68 or a new input device. Also, train manifest and general track bulletin information may be entered through a maintenance access point, using portable media or via portable test unit program. Additionally, such information may be entered through a wireless transfer through a railroad communications network, as another example. The amount of train manifest and general track bulletin information can be configured based upon the type of data entry method. For example, the per car load information may not be included if data entry is performed manually, but could be included if data entry is via wireless data transfer.

Regarding the information display for an embodiment of the trip optimizer, certain features and functions may be utilized by the operator. For example, a rolling map 400, as is illustrated in FIGS. 8-10, 12, 16, 17, 19, in which each data element is distinguishable from others, be may be utilized. Such a rolling map 400 may provide such information as a speed limit, whether it be a civil, temporary, turnout, signal imposed, work zones, terrain information and/or track warrant. The types of speed limits can be presented to be distinguishable from one another. Additionally, such a rolling map may provide trip plan speed information or actual speed, trip plan notch or actual notch, trip plan horsepower by the consist or the locomotive, trip plan tractive/brake effort or actual tractive/brake effort, and trip plan fuel consumption planned versus actual by any of the train, locomotive or locomotive consist. The information display may additionally display a list of events, such as is further illustrated in FIG. 11, instead of the rolling map, where such events may include a current milepost, list of events by an upcoming milepost, a list of events for alternate routes, or shaded events that are not on a current route, for example. Additionally, the information display may provide a scrolling function or scaling function to see the entire display data. A query function may also be provided to display any section of the track or the plan data.

The information display, in addition to those features mentioned above, may also provide a map with a variable setting of the x-axis, including expanded and compressed views on the screen, such as is illustrated in FIG. 13. For example, the first 3 miles (4.828 kilometers) 402 may be viewed in the normal view, while the next 10 miles (16.09 kilometers) 404 may be viewed in the compressed view at the end of the rolling map 400. This expanded and compressed view could be a function of speed (for example at low speeds short distances are visible in detail and high speeds longer distances are visible), as a function of the type of train, as a function of the terrain variations, as a function of activity (example grade crossings, signal lights etc). Additionally, as is illustrated in FIG. 14, the information display may show historical data for the trip by horsepower/ton, and show current fuel savings versus historical fuel savings.

Figure 15A:
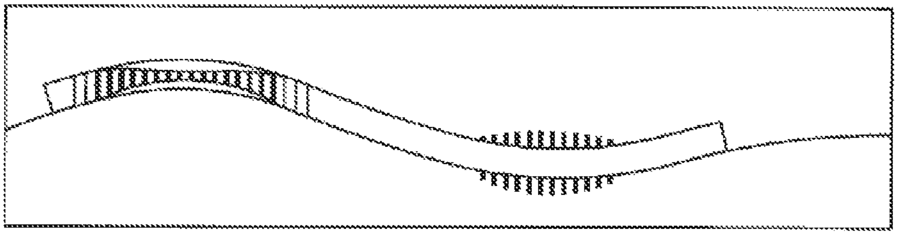
FIG. 15A depicts an illustration of a train state displayed on the dynamic display.
Figure 15B:
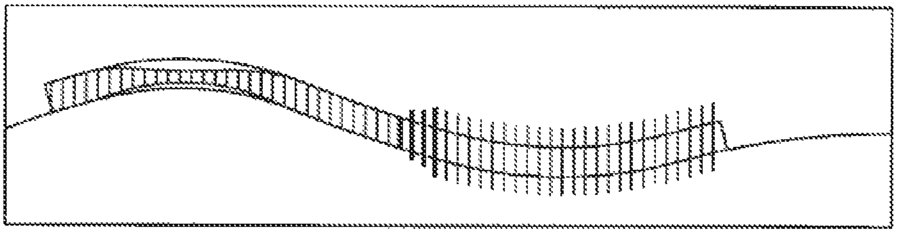
FIG. 15B depicts another illustration of a train state displayed on the dynamic display.
Figure 15C:
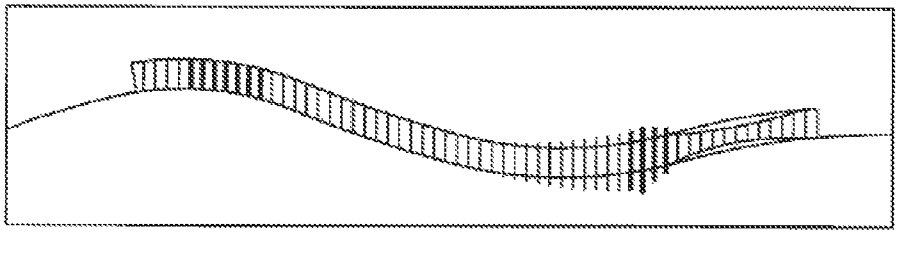
FIG. 15C depicts another illustration of a train state displayed on the dynamic display screen.
Figure 16:
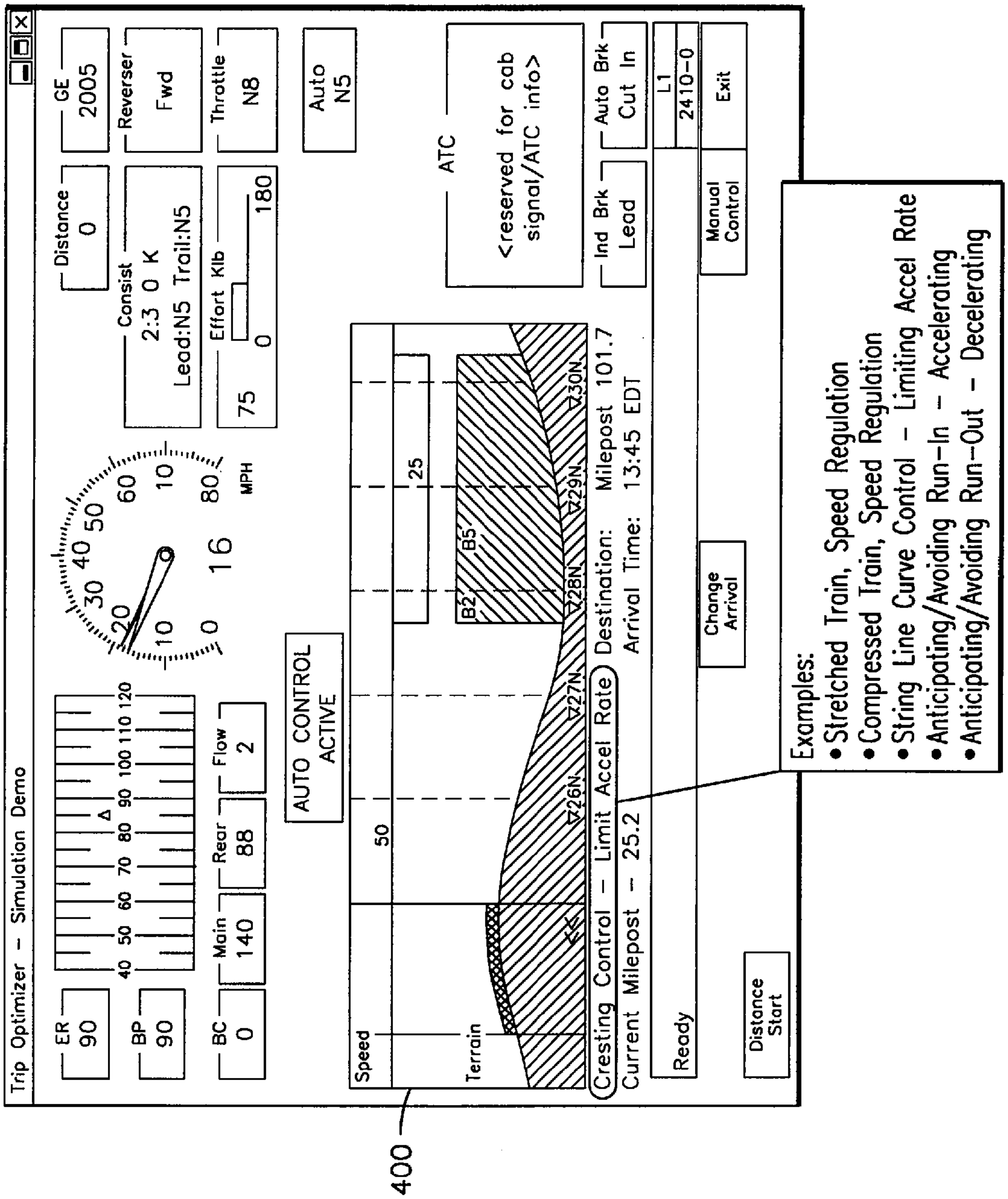
FIG. 16 depicts an illustration of the dynamic display being used as a training device.
Figure 17:
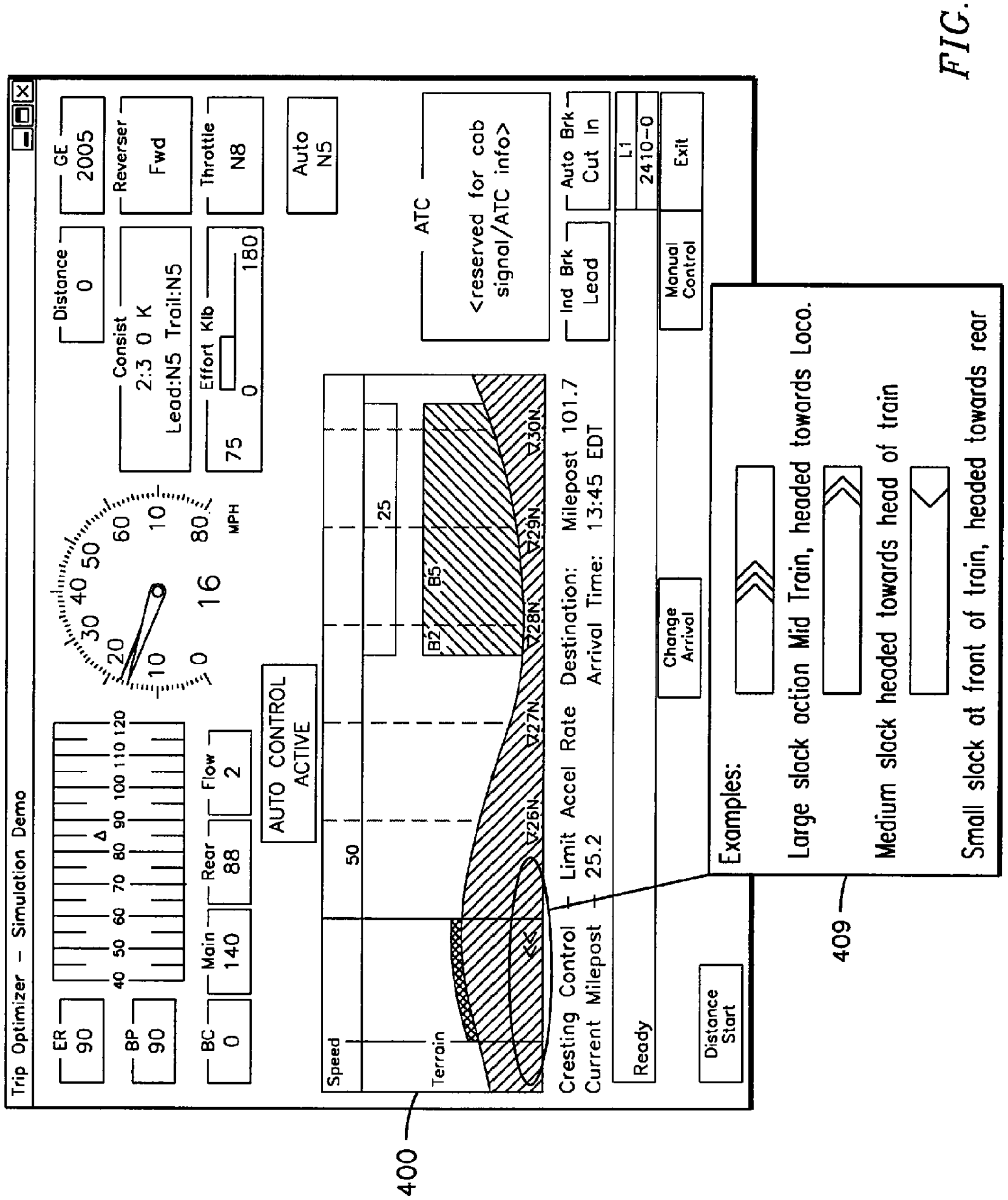
FIG. 17 depicts another illustration of the in-train forces being display on the dynamic display screen.

Additionally, as is further illustrated in FIGS. 15-17, the embodiment of the inventive subject matter may include a display of impending actions which form a unique set of data and features available on the display to the operator as a function of the trip optimizer. Such items may include, but are not limited to a unique display of tractive effort (TE)/buffer (Buff) forces in the train and the limit, a display of the point in the train where peak forces exist, a display of the "reasons" for the actions of the system. This information may be displayed at all times, and not just when the powered system is operating in an automatic and/or autonomous mode. The display may be modified as a function of the limit in effect, such as train forces, acceleration, etc.

For example, FIG. 15 discloses an exemplary visual train state graphic representing magnitude of a stretched or bunched train state. A train 42 is illustrated where part of the train 42 is in a valley 406 and another part is on a crest 408. FIG. 15A is a graphical representation that the stretch of the train over the crest is acceptable and that the bunch in the valley is also acceptable. FIG. 15B illustrates that due to braking too hard when leaving the valley, run-in, more specifically a situation when the cars on the train may run into each other, is building up in the train. FIG. 15C illustrates a situation where the train has been accelerated too quickly as it leaves the valley, creating a run-out, or pull between the cars, moving back through the train. The forces may be illustrated a plurality of ways including with an addition of color when the forces are increasing or by larger symbols where forces are increasing.

The graphics illustrated in FIGS. 15A-C may be included in the display, rolling map 400 disclosed in FIG. 16. The exemplary displays disclosed herein may also be used to train operators. For example, when operating in an automatic or autonomous mode, trip optimization information, including handling maneuvers, is displayed to the operator to assist the operator in learning. For a small portion of the mission, typically selected by the railroad owner, the trip optimizer will release control of the powered system to the operator for manual control. Data logs capturing information pertaining to the operator's performance. While in manual mode, train state information and associated handling information is still provided via the display to the operator.

FIG. 17 discloses a display illustrating an embodiment of an approach for displaying in-train forces to an operator. FIGS. 15A-C disclosed one exemplary approach to illustrate in-train forces. In another embodiment symbols 409 are provided where a number of the symbols 409 further illustrate the extent of in-train forces. Based on the direction of the symbols the direction may illustrate the direction of the forces.

In the embodiment of the invention, a display of information regarding arrival time management may be shown. The arrival time may be shown on the operational display and can be selectively shown by the customer. The arrival time data may be shown on the rolling map, such as but not limited to in a fixed time and/or range format. Additionally, it may be shown as a list of waypoints/stations with arrival times where arrival time may be wall-clock time or travel time. A configurable/selectable representation of the time, such as a travel time or wall-clock time or coordinated time universal (UTC) may be used. The arrival times and current arrival time may be limited by changing each waypoint. The arrival times may be selectively changed by the waypoints. Additionally, work/stop events with dwell times may be displayed, in addition to meet and pass events with particular times.

Additionally, the embodiment of the inventive subject matter may feature a display of information regarding fuel management, such as displaying travel time versus fuel trade off, including intermediate points. Additionally, the embodiment may display fuel savings versus the amount of fuel burned for the trip, such as is illustrated in FIG. 18.

The embodiment of the inventive subject matter additionally includes displaying information regarding the train manifest or trip information. An operating display will provide the ability for entry of data, modification of the data, confirmation of the data, alpha keypad on the screen, a configurable data set based on method of data entry, and inputting a route with a start and end location and intermediate point (i.e., waypoints). The waypoints may be based on a comprehensive list or intelligent pick list, based on the direction of the train, train ID, etc, a milepost, alpha searching, or scrolling a map with selection keys. Additionally, the operating display takes into account unique elements for locomotive consist modification, including power level/type, motoring status, dynamic brake status, isolated, the health of power (i.e., load pot), the number of axles available for power and braking, dead in tow, and air brake status.

Figure 19A:
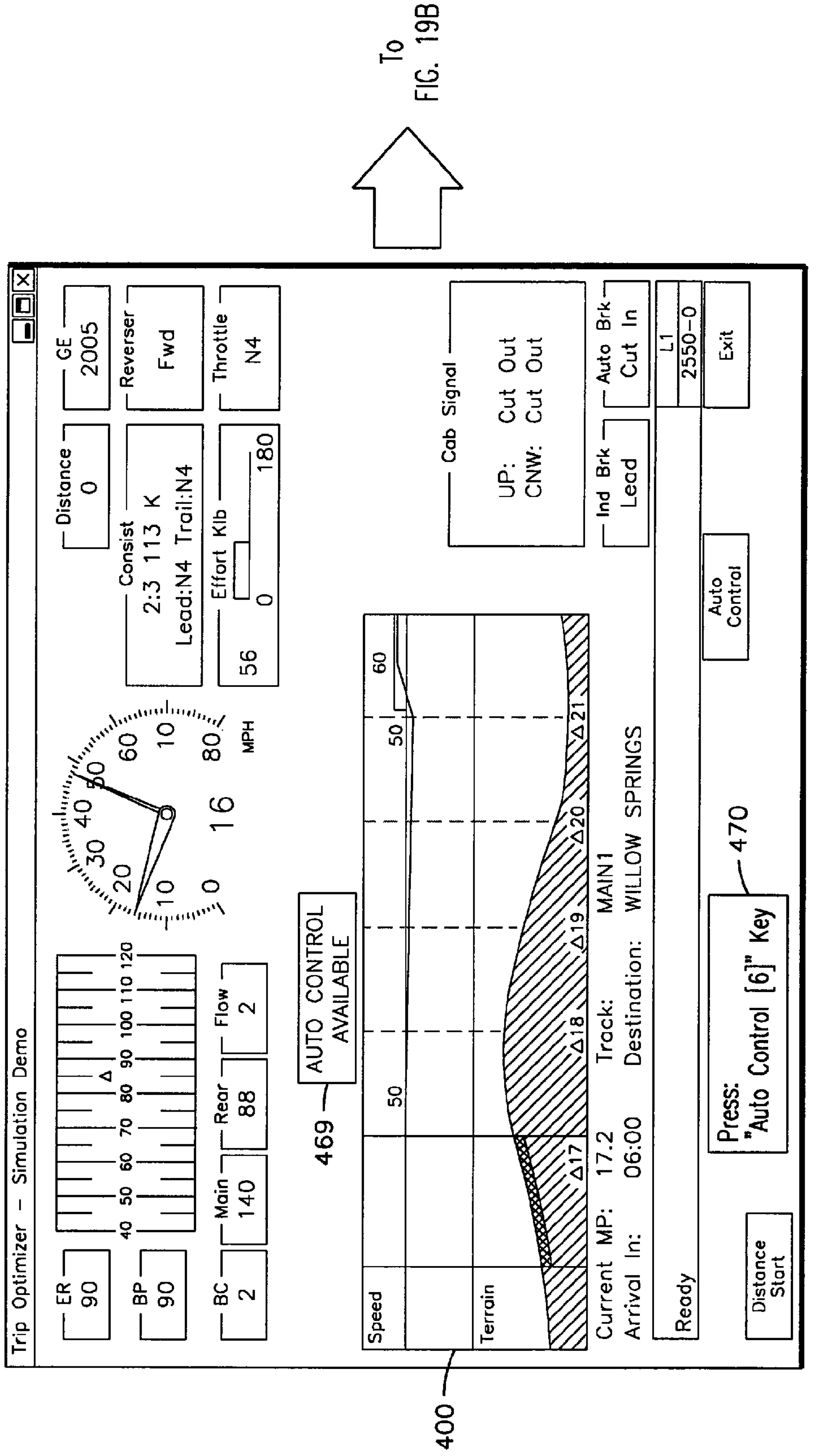
FIG. 19A depicts an illustration of a dynamic display screen notifying the operator when to engage the automatic controller.
Figure 19B:
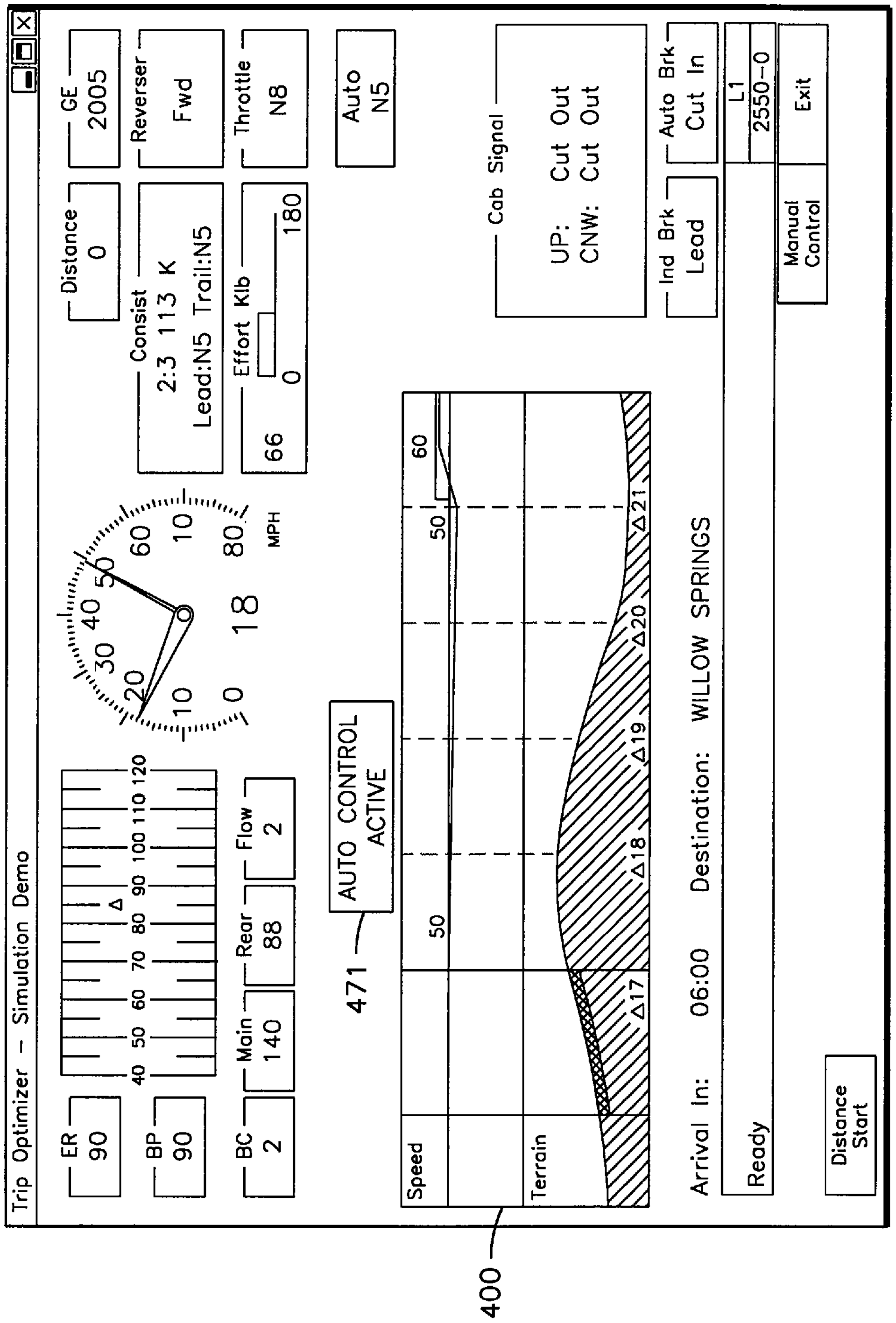
FIG. 19B depicts an illustration of a dynamic display screen notifying the operator when automatic controller is engaged.

The embodiment of the inventive subject matter also provides for changing control from manual control to automatic control (during motoring). FIG. 19A depicts an exemplary illustration of a dynamic display screen notifying the operator when to engage the automatic controller. A notice 469 is provided signifying that automatic control is available. In one embodiment, the operator initiates some action to let the system know that he/she desires the system to take control. Such action may include applying a key 470 to the screen or a hardware switch, or some other input device. Following this action, the system determines that the operator desires automatic control, and the operator may move the throttle to several positions selectively determined. For example, such positions may include idle/notch 1/notch 8 or any notch, and by positioning the throttle in one of these positions, the operator permits full control of power to the system. A notice is displayed to the operator regarding which notch settings are available. In another embodiment, if the throttle is able to be moved to any notch, the controller may choose to limit a maximum power that can be applied or operated at any power setting regardless of throttle handle position. As another example of selecting automatic control, the operator may select an engine speed and the system will use the analog trainlines or other trainline communications, such as but not limited to DB modem, to make power up to the available horsepower for that engine speed selected by the throttle notch or to full power regardless of the notch position. A relay, switch or electronic circuits can be used to break the master controller cam inputs into the system to allow full control over the throttle on the lead and trail consists. The control can use digital outputs to control and drive the desired trainlines. FIG. 19B depicts an exemplary illustration of the dynamic display screen after automatic control is entered. As illustrated, a notice 471 states that automatic control is active.

Figure 20:
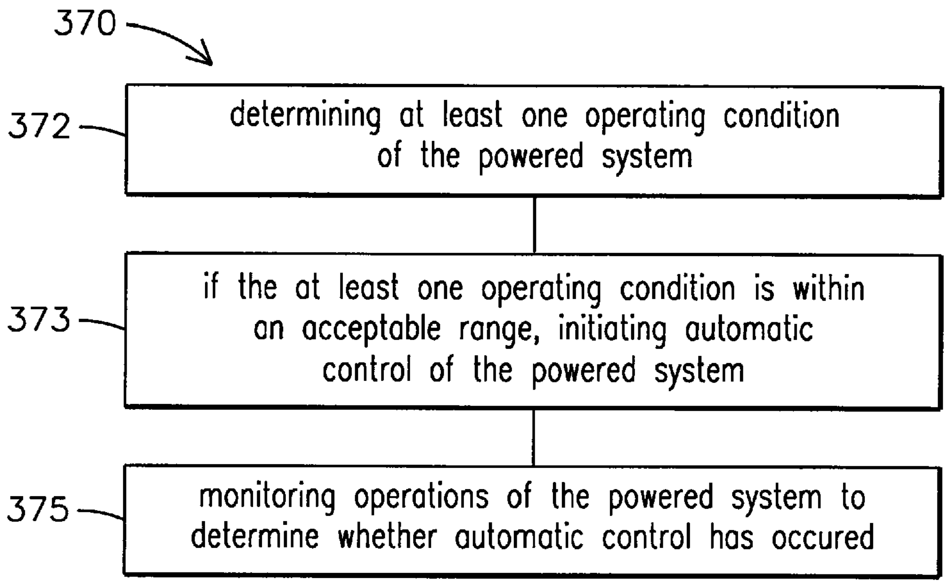
FIG. 20 depicts a flowchart illustrating an embodiment for engaging automatic control of the powered system.

FIG. 20 depicts a flowchart 370 illustrating an embodiment for engaging automatic control of the powered system. The flowchart 370 discloses determining an operating condition of the powered system, at 372. If the operating condition is within an acceptable range, automatic control of the powered system is initiated, at 373. For example, automatic control may be prohibited at an accelerated speed. Once the powered system has reduced its speed, it may only then be operable under automatic control. Operations of the powered system are monitored to determine whether automatic control has occurred, at 375. The operating conditions may include a current operating condition of the powered system, a parameter of the operating system, an environmental condition, and a change of any of these conditions. The change in any of these conditions may randomly occur, be designed to occur, and/or may be instituted by the operator and/or the remote monitoring facility. Therefore, the term "operating condition" is not a limiting term since as disclosed it is intended to encompass any condition at any level experienced by the powered system.

In an additional embodiment of the invention, changing control from manual control to automatic control (motoring and braking only) is possible, as is also illustrated in FIGS. 19A and 19B. The operator may initiate some action to allow the system to recognize that he/she desires to take control. Such action may include providing a key on the screen or using a hardware switch, or some other input device. Following this action, the system knows that the operator desires automatic control, and the operator may then move the throttle to one of several positions. For example, the operator may move the throttle to idle (for automatic motoring and braking), to notch 8 (for motoring), and DB8 for dynamic braking. Additionally, the operator may move the throttle to any notch to limit to power and the dynamic braking by the dynamic brake handle. In another additional embodiment of the inventive subject matter, the operator may move the throttle to any predetermined settings to authorize motoring and braking operation, or the operator may provide this information through any user input device, such as but not limited to a switch or key press. A relay, switch or electronic circuits can be used to break the master controller cam inputs into the system to allow full control over the throttle and braking on the lead and train consists. The master controller can use digital outputs to control and drive the desired trainlines.

Figure 21A:
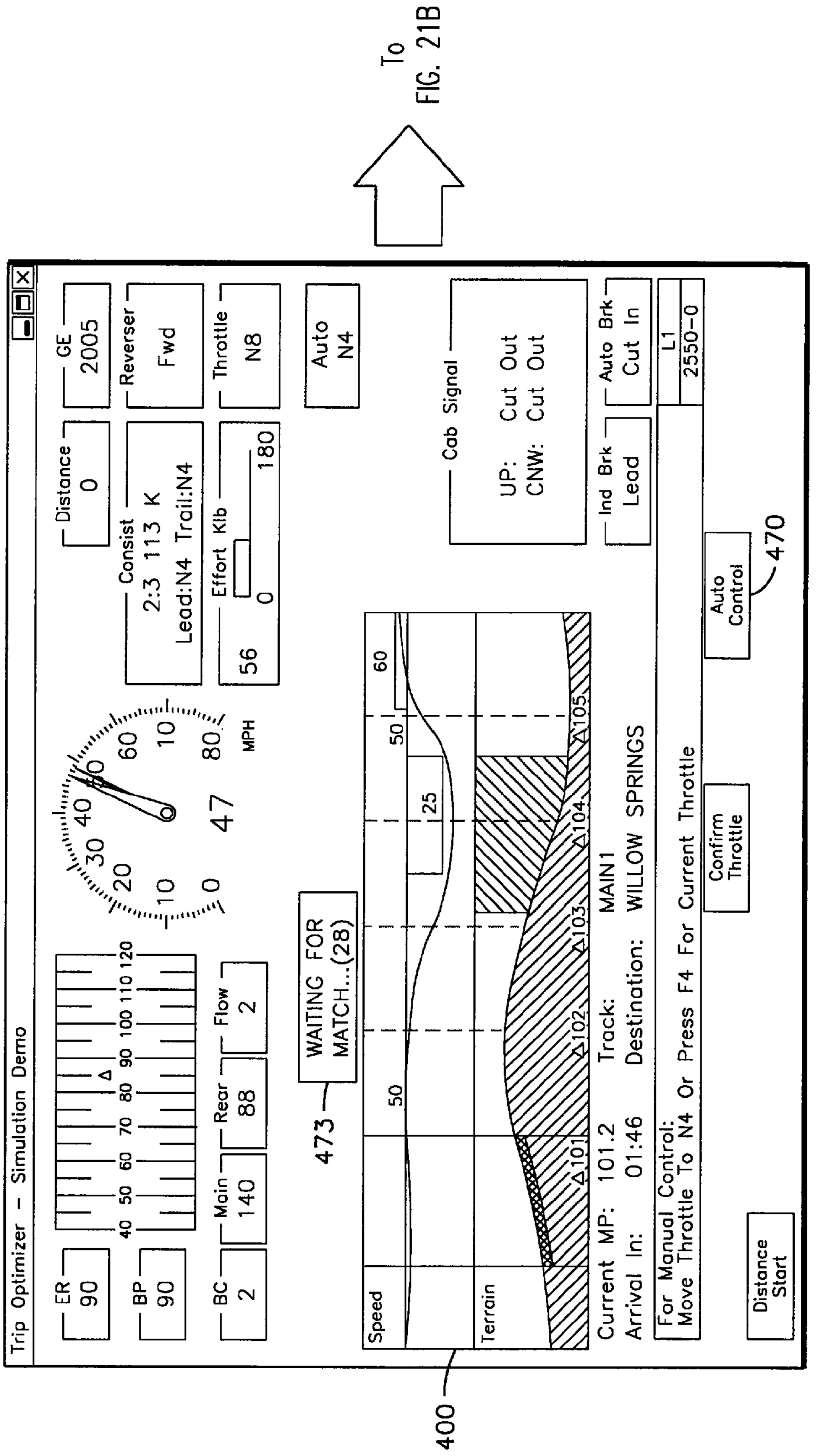
FIG. 21A depicts an illustration of a dynamic display screen notifying the operator of manual control transition.
Figure 21B:
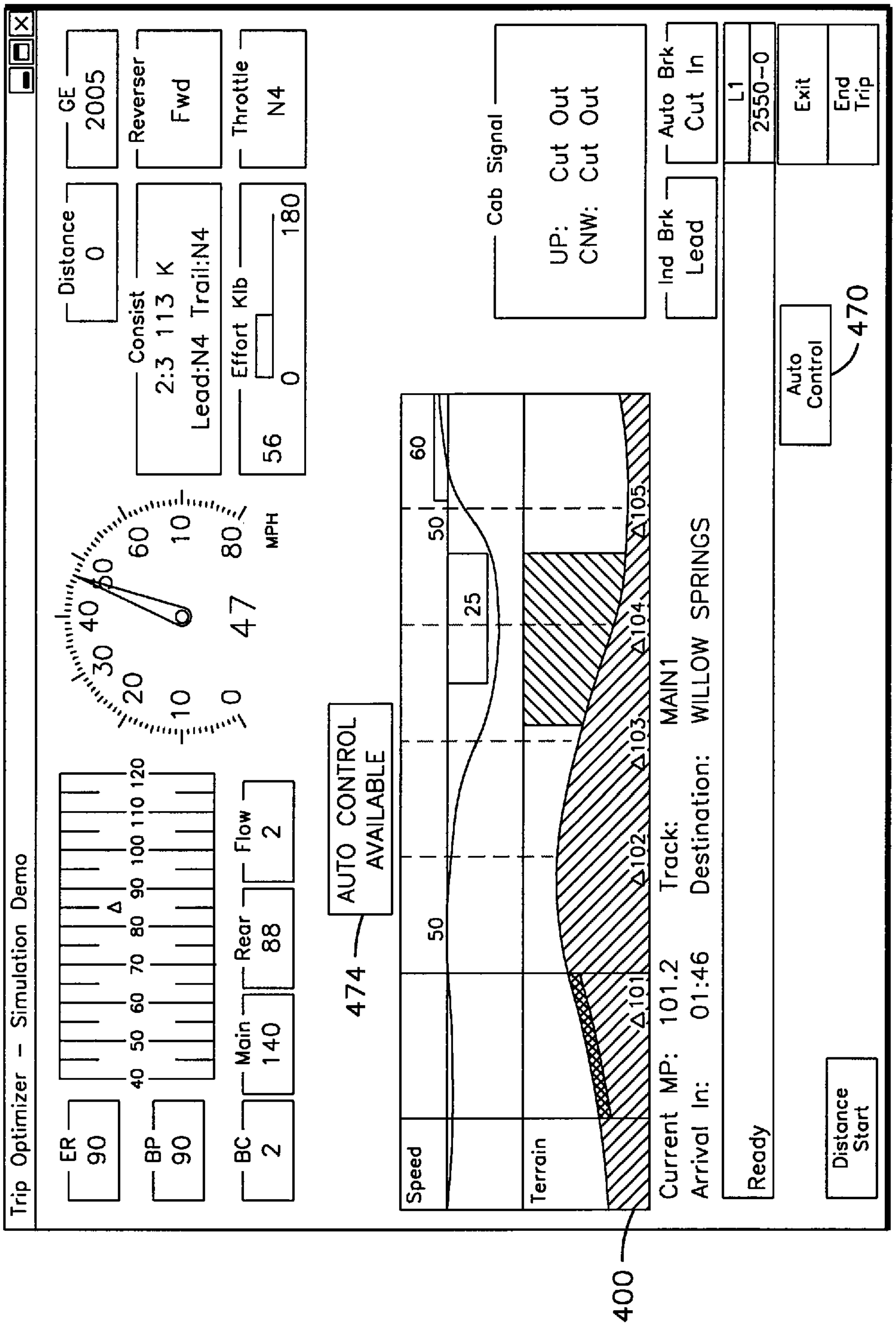
FIG. 21B depicts an illustration of a dynamic display screen notifying the operator that automatic control is available.

FIG. 21A depicts an exemplary illustration of a dynamic display screen notifying the operator of a manual transition, and FIG. 21B depicts an exemplary illustration of a dynamic display screen notifying the operator that automatic control is available. Prior to entering automatic control, a determination is made regarding whether the powered system is in a condition to enter automatic control. For example, a determination is first made regarding whether a speed and throttle setting are at acceptable levels. Though speed and throttle settings are disclosed, other parameters and/or constraints may also be factored in as additions or in place of speed and throttle settings. With respect to speed and throttle settings, such examples may include a speed less than approximately 12 miles per hour (approximately 19.31 kilometers per hour) and a throttle setting less than or equal to notch 1. Prior to reaching an acceptable match and/or level, a notice 473 is provided that a match or acceptable level has not been achieved. As illustrated in FIG. 21B, if they are at acceptable levels, a notice 474 identifies to the operator that automatic control is available.

A switch, either mechanical, electrical, or a key on the screen, such as the key 470 is used to activate switching to automatic control operation. The throttle handle is then set for a specific setting, such as notch 8, for at least a given period of time, such as within 25 seconds. The user then remains vigilant to train operations to insure that automatic control is active and is functioning properly.

The system can also determine and monitor certain parameters, and when the parameters are in the desired state (or values to take over automatic control are satisfied), the system may go into automatic control without operator initiation. An element of notification to the operator may be included.

When disengaging the automatic control, the throttle handle is removed from the preset setting level, such as notch 8. The throttle is moved to at less than and/or equal to the consist throttle. The consist is now operatable in manual control again. In another embodiment, a signal is provided to notify the operator that a change is being made to manual control. For example, a button on the display may flash in another color, such as yellow. Any of the other warning disclosed herein may also be used though. When within a given time period, such as thirty seconds, of going to manual operations, a warning count-down starts. At the end of the count-down, the operator can move the throttle to less than consist throttle setting and then continue to operate in manual control.

In addition, an embodiment of the inventive subject matter may include changing control from automatic control to manual control. The operator may initiate the method by pressing a key or throttle movement, for example. The system may also initiate an automatic to manual control transition by fault conditions, particular system activation/deactivation criteria (min/max speed, wheel slip, etc.), dispatch/railroad initiated, territory (area not designated for automatic control), or poor train makeup.

In addition, an embodiment of the inventive subject matter may provide the operator with an indication to remove the system from an automatic control, due to configuration or operating rules, for example, to control the train. Several approaches may be utilized in this embodiment, including but not limited to visual cues on the operating screen, audible warnings, a list of actions with time count downs, a rolling map with colored areas that show manual control regions on the map, and combination of visual and audible warnings.

Figure 22A:
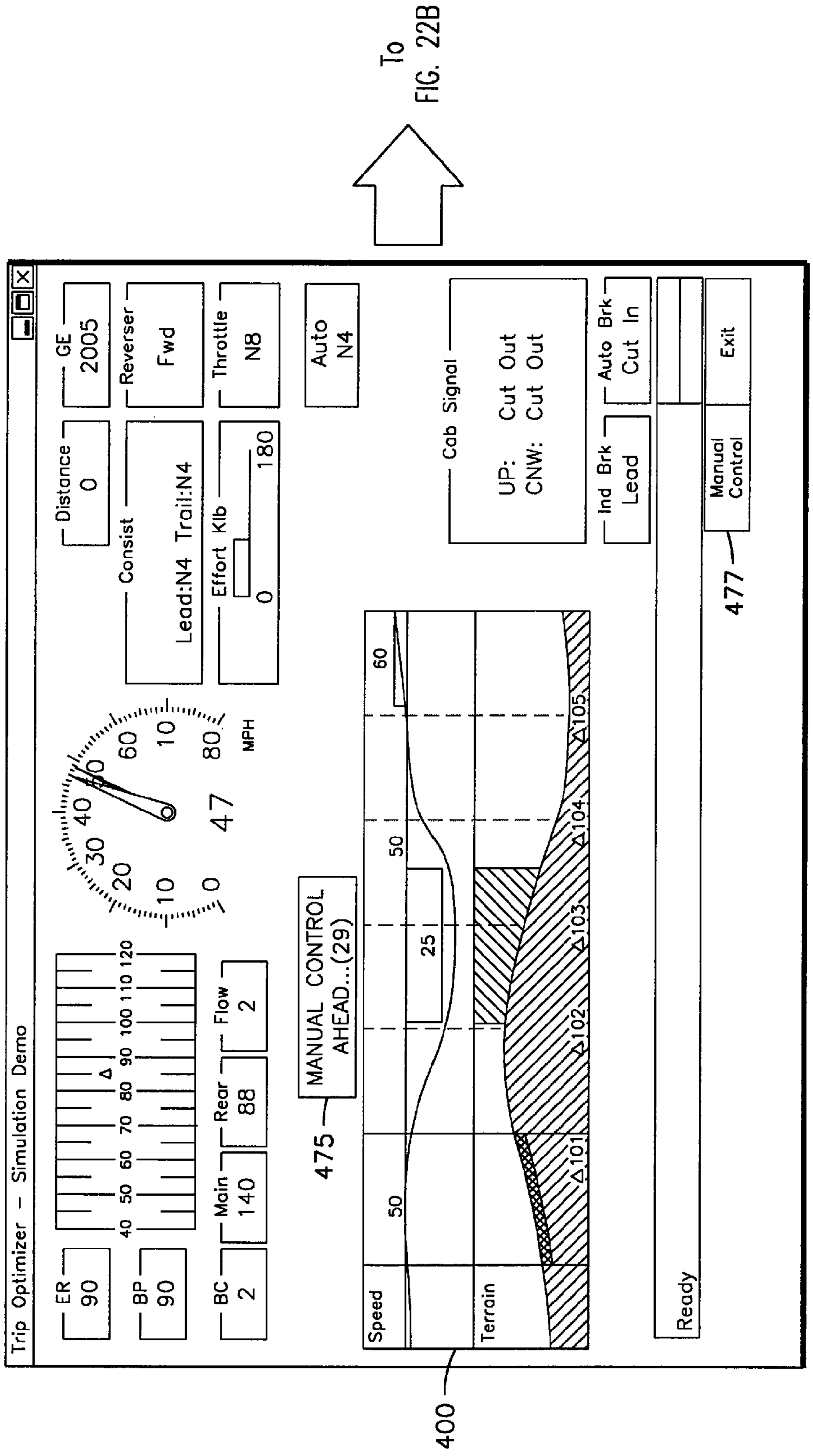
FIG. 22A depicts an illustration of a dynamic display screen notifying the operator in advance that manual control is required.
Figure 22B:
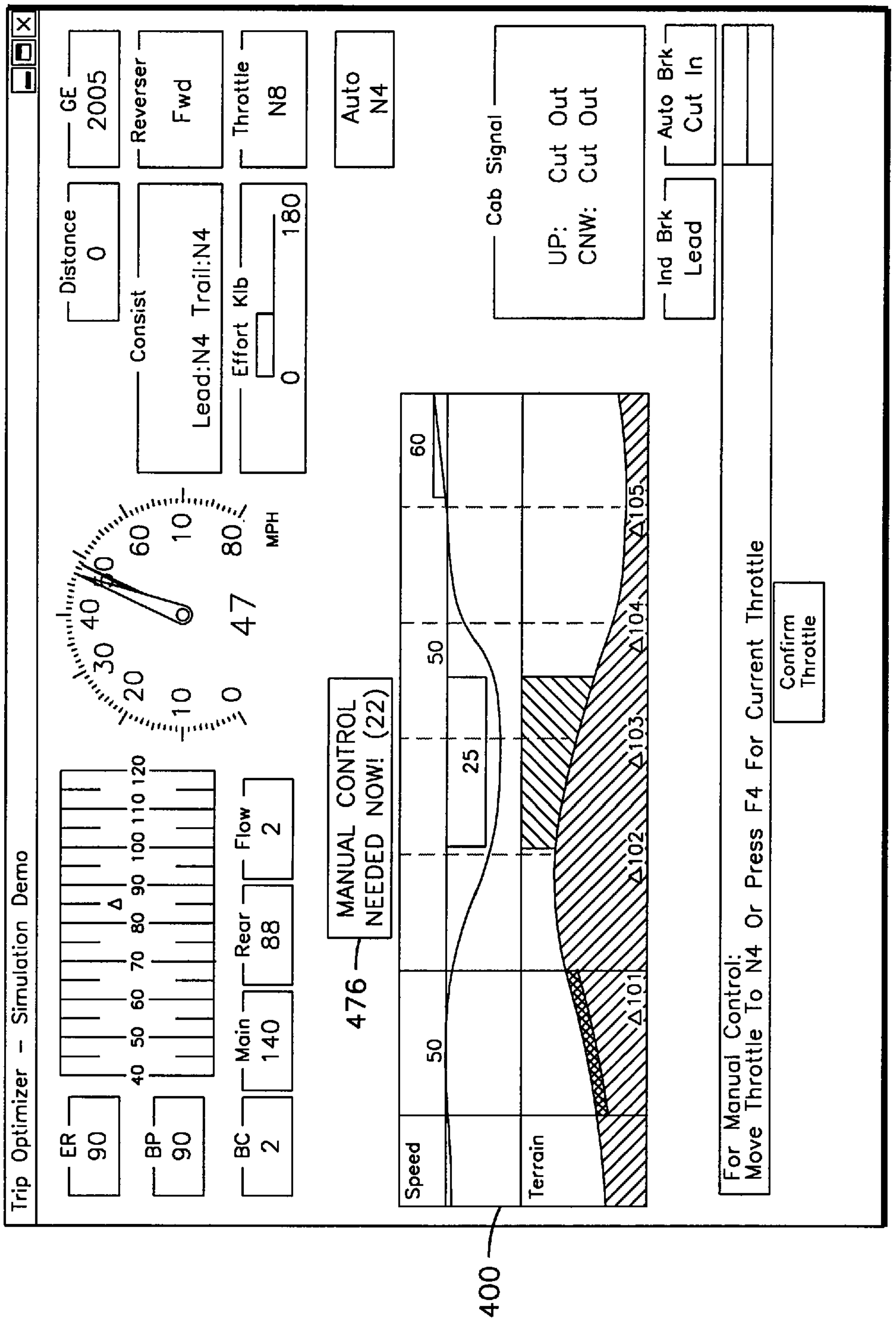
FIG. 22B depicts an illustration of a dynamic display screen notifying the operator that manual control is needed immediately.

FIG. 22A depicts an exemplary illustration of a dynamic display screen notifying the operator in advance that manual control is required, and FIG. 22B depicts an exemplary illustration of a dynamic display screen notifying the operator that manual control is needed immediately. With respect to FIG. 22A, a notice 475 is displayed informing the operator of a near term need to enter manual control. A switch or key 477 is provided to enter manual control. When the need to use manual control is immediate, a notice 476 is also provided to the operator.

Figure 23:
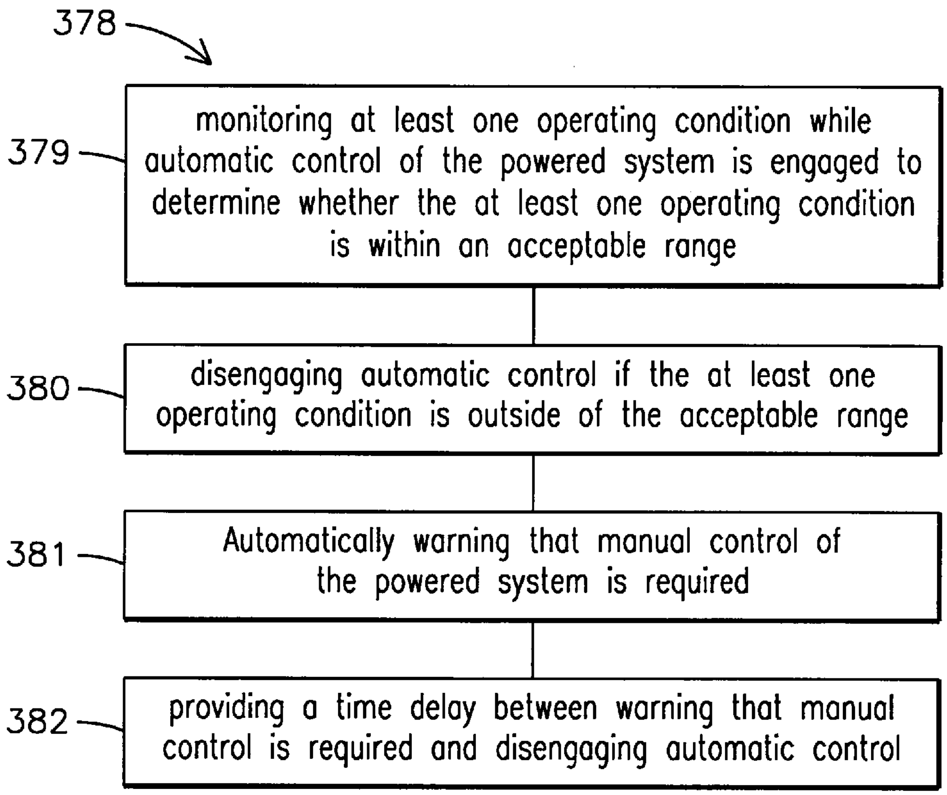
FIG. 23 depicts a flowchart illustrating an embodiment for disengaging automatic control of a powered system.

FIG. 23 depicts a flowchart illustrating an embodiment for disengaging automatic control of a powered system. The flowchart 378 discloses monitoring an operating condition while automatic control of the powered system is engaged to determine whether the operating condition is within an acceptable range, at 379. Automatic control is then disengaged if the operating condition is outside of the acceptable range, at 380. When manual control is required an automatic warning may be emitted, at 381. The warning may be visual, audible, and/or physical. To ensure safe operation of the powered system a time delay is provided between warning that manual control is required and disengaging automatic control, at 382. As disclosed above with respect to FIG. 20, the term "operating condition" is not disclosed as being a limiting term. For example, the operating condition may be a slow order received from a remote monitoring facility, such as but not limited to a dispatch. The information contained in the slow order identifying a new slower speed limit may be outside of a range acceptable for continuing to operate using automatic control.

Furthermore, the acceptable range may also be established by the operator and/or remote monitoring facility. For example, during a segment of a mission, operating in manual mode may be preferred. Therefore the operator and/or remote monitoring facility may define the acceptable range to prohibit automatic control. In another embodiment, the automatic control is simply disengaged as commanded by the operator and/or remote monitoring facility.

Additionally, a need may arise to request an operator to apply air brakes to control the speed of the train. Several approaches may be utilized to accomplish this need, such as visual cues on the operating screen, audible warnings, a list of actions with colored areas that show manual control regions on the map and a combination of visual and audible warnings.

When the system determines that the operator needs to take manual control, the system may take any of several actions depending on the situation. Such actions may include setting the throttle to idle if the operator does not take control within a designated time, or increasing the dynamic braking if the operator does not take control within a designated time. Additionally, if the operator does not take control within a designated time when the locomotive has determined that it is operating at a low speed due to a hard pull up a long grade, the system can continue to monitor this and maintain power on the train until the train stalls or the train speed climbs and maintains automatic control. Additionally, if the operator does not take control within a designated time, the system may initiate a penalty brake application much like an alerter timeout. Additionally, if the operator does not take control, the system may continue to operate until the system nears the track overspeed limit, and then shuts down the engine.

In an additional embodiment of the system, during the trip, a need may arise to alert the operator to areas which the system did not plan for manual control but due to errors in the system operation or system inputs, during automatic control, the system requests that the operator to take manual control to maintain the speed of the train. During operation, the system may monitor train speed and acceleration to determine if it can control the train to within its operating speed limits. If the system determines that it cannot control the train by going to idle, and additional retarding force is needed, either through dynamic or air braking, the system may initiate a request to the operator to take manual control.

Another feature that may be included is allowing for the generating of data logs and reports. This information may be stored on the train and downloaded to an off-board system at some point in time. The downloads may occur via manual and/or wireless transmission. This information may also be viewable by the operator via the locomotive display. The data may include such information as, but not limited to, operator inputs, time system is operational, fuel saved, fuel imbalance across locomotives in the train, train journey off course, system diagnostic issues such as if a GPS sensor is malfunctioning.

Since trip plans must also take into consideration allowable crew operation time, the inventive subject matter may take such information into consideration as a trip is planned. For example, if the maximum time a crew may operate is eight hours, then the trip shall be fashioned to include stopping location for a new crew to take the place of the present crew. Such specified stopping locations may include, but are not limited to, rail yards, meet/pass locations, etc. If, as the trip progresses, the trip time may be exceeded, the inventive subject matter may be overridden by the operator to meet criteria as determined by the operator. Ultimately, regardless of the operating conditions of the train, such as but not limited to high load, low speed, train stretch conditions, etc., the operator remains in control to command a speed and/or operating condition of the train.

Using the inventive subject matter, the train may operate in a plurality of manners. In one operational concept, the inventive subject matter may provide commands for commanding propulsion and dynamic braking. The operator then handles all other train functions. In another operational concept, the inventive subject matter may provide commands for commanding propulsion only. The operator then handles dynamic braking and all other train functions. In yet another operational concept, the inventive subject matter may provide commands for commanding propulsion, dynamic braking, and application of the airbrake. The operator then handles all other train functions.

Embodiments may also be used by notify the operator of upcoming items of interest or actions to be taken. Specifically, using the forecasting logic of the inventive subject matter, the continuous corrections and re-planning to the optimized trip plan, and/or the track database, the operator can be notified of upcoming crossings, signals, grade changes, brake actions, sidings, rail yards, fuel stations, etc. This notification may occur audibly and/or through the operator interface.

Specifically, using the physics based planning model, train set-up information, on-board track database, on-board operating rules, location determination system, real-time closed loop power/brake control, and sensor feedback, the system presents and/or notifies the operator of required actions. The notification can be visual and/or audible. Examples include notifying of crossings that require the operator to activate the locomotive horn and/or bell, and notifying of "silent" crossings that do not require the operator activate the locomotive horn or bell.

In another embodiment, using the physics based planning model discussed above, train set-up information, on-board track database, on-board operating rules, location determination system, real-time closed power/brake control, and sensor feedback, the inventive subject matter may present the operator with information (e.g., a gauge on display) that allows the operator to see when the train will arrive at various locations, as illustrated in FIG. 9. The system will allow the operator to adjust the trip plan (e.g., target arrival time). This information (actual estimated arrival time or information needed to derive off-board) can also be communicated to the dispatch center to allow the dispatcher or dispatch system to adjust the target arrival times. This allows the system to quickly adjust and optimize for the appropriate target function (for example trading off speed and fuel usage).

Figure 24:
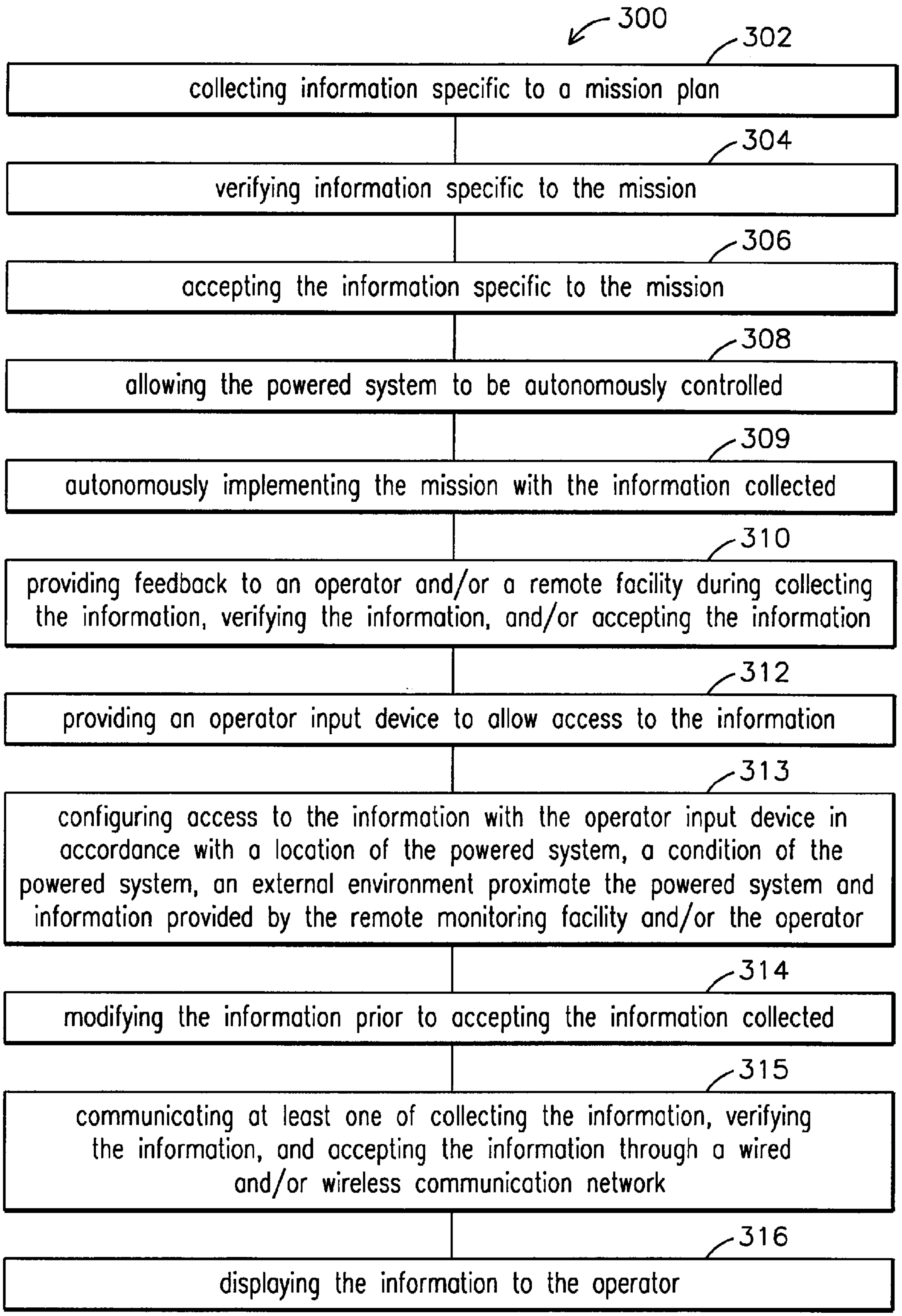
FIG. 24 depicts a flowchart of a method for gathering information for verifying and accepting information used in creating a mission plan.

FIG. 24 depicts a flowchart illustrating an embodiment for autonomously communicating operational information for a mission optimization plan. As illustrated in the flowchart 300, information is collected specific to a mission plan, at 302. The information may be collected from a remote dispatch location and/or at least one train system, or management system as information needed for a mission plan may be stored in different systems. Examples of information may include but are not limited to starting and ending locations, specific temporary system restrictions, load characteristics, etc. The information specific to the mission is verified, at 304. The information is accepted, at 306. The information that is verified and accepted may be the same information collected. In other embodiments the information may not be the information collected.

Though in an embodiment the information is accepted by an operator and/or a remote monitoring facility, the acceptance of the information may be completed autonomously. Furthermore, only one of collecting the information, at 302, verifying the information, at 304, and accepting the information, at 306 need be accomplished. Once at least one of these tasks, and/or events, is completed, the powered system is allowed to be autonomously controlled, at 308. The mission may then be autonomously implemented with the information collected, at 309. Feedback with respect to collecting the information, verifying the information, and/or accepting the information is provided to the operator and/or the remote monitoring facility, at 310.

An operator input device is also available, at 312, so that the operator may have input to the information, such as but not limited to modifying the information, at 314. With respect to a rail vehicle, other information that may be entered may include manifest information and/or general track information. In an embodiment the information may be modified by the user and/or operator prior to accepting the information collected. Additionally, access to the information may be configured with the operator input device in accordance with a location of the powered system, a condition of the powered system, an external environment proximate the powered system, and information provided by the operator and/or the remote monitoring facility, at 313. For example, if a weather change is identified, either one currently being experienced by the powered system and/or one that may occur later during the mission, the operator input device may be used to modify information accordingly.

The information is displayed to the operator, at 316, such as but not limited to a visual display. The display may be an existing display used on and/or with a powered system. This information could be presented to the operator audibly, through another sensory notification (such as but not limited to touch), and/or other printed media. This information need not all be presented to the operator, who may be present on a local unit. This information could be presented at a remote location and verified at the remote location or on the local unit, or powered system. The flowchart 300 may be implemented with a computer software code operable with a processor and configured to reside on a computer readable media. Based on the flowchart 300 and using a rail vehicle as an example, to initiate creating a mission plan and autonomous control, the operator may initiate a departure test. This triggers automatically obtaining required information from a dispatch and/or a train management systems. An example of such information as provided in a display is disclosed in FIG. 25. The departure test may be performed at a crew change location, but can be initiated at anytime during a trip. In an embodiment the departure test is performed while the locomotive is not moving.

After the operator has initiated the departure test, an operator message section 335 of the operating display is updated with status message as to the progress of data acquisition. Initiation of the departure test can be done automatically, where an event triggering the automatic departure test could be location-based, time-based, and/or a combination of both. Initiation of the departure test could also be done by someone other than the operator and could be initiated by at least one of the following a dispatcher, conductor, and/or train setup personnel. When data acquisition has been completed, this data will be presented to the operator for verification. If at any time the data presented does not agree with the operator's paperwork, the trip data may be rejected.

Figure 26:
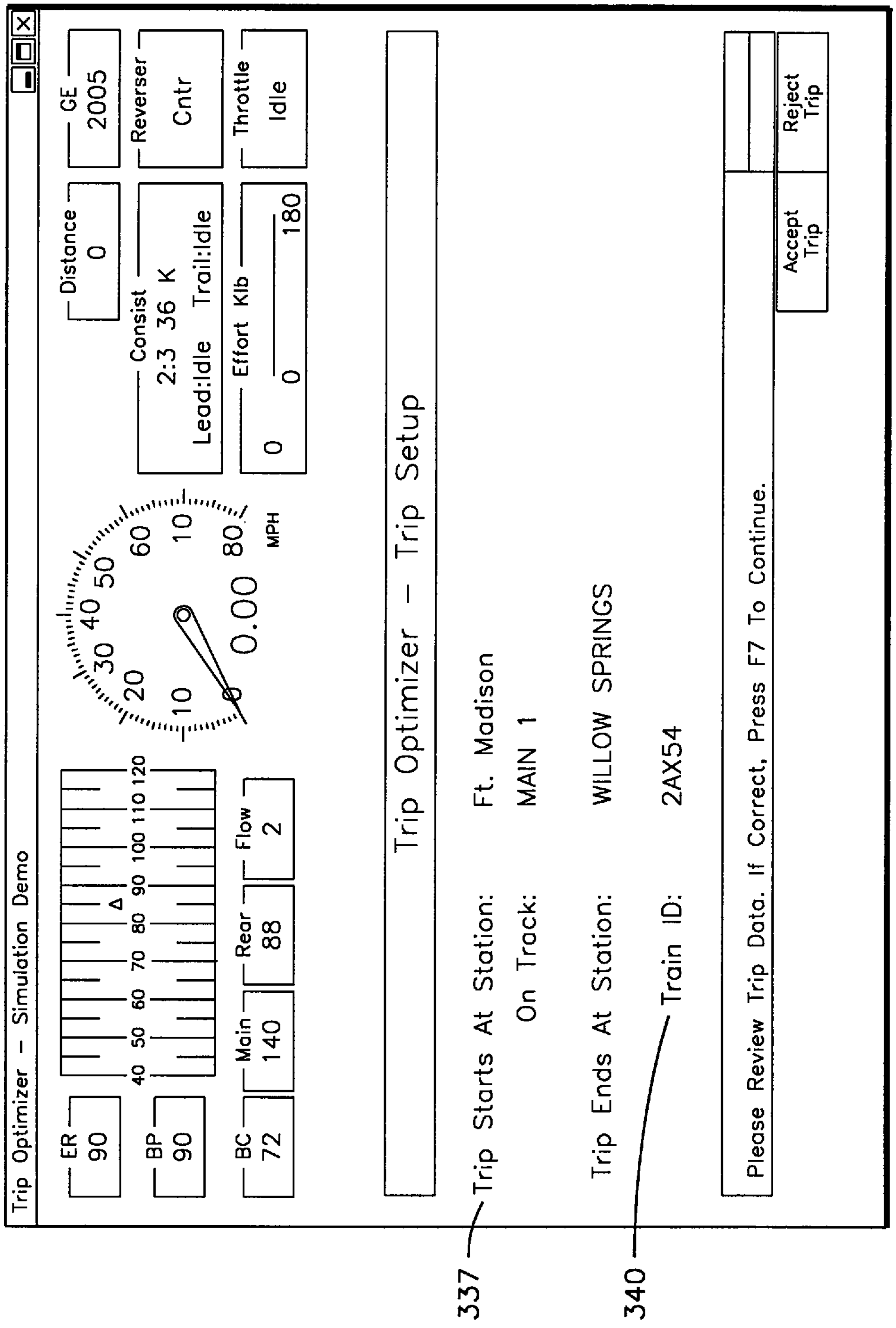
FIG. 26 depicts a display of the information for verifying and accepting information used in creating a mission plan.
Figure 27:
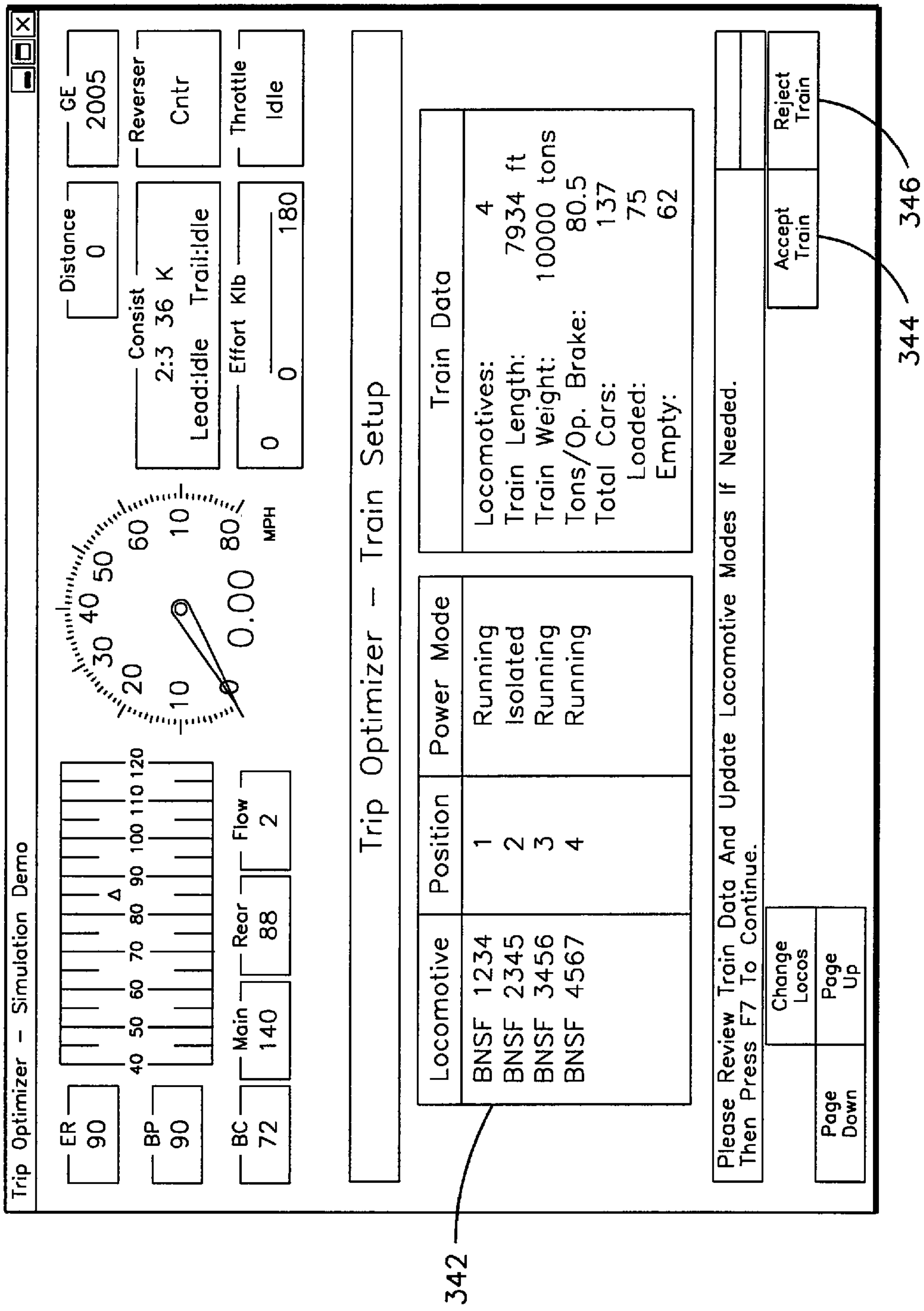
FIG. 27 depicts a display of the information for verifying and accepting information used in creating a mission plan.

FIGS. 26 through 28 depict embodiments of verification screens. Verification screens are presented in a logical order for operator verification. All screens may be approved before generating a mission optimization plan or profile. The first verification screen, depicted in FIG. 26, presented to the operator contains the trip details 337. It contains the trip start and end stations, which will typically be crew change points. The train identification designation 340 is also presented for verification. This information could be presented in alternate forms other than those presented in FIG. 26. The trip information could be presented as a map showing the start and end location, a highlighted list of key information such as but not limited to key locations, and/or as mileposts along the route.

FIG. 27 depicts a second verification screen. The second verification screen may contain the rail vehicle details 342. As with other figures disclosed herein, those skilled in the art will readily recognize that the information illustrated in FIG. 27 could be presented in alternate forms other than those presented in FIG. 27. The train detailed information could be presented graphically. At this screen, the operator has the opportunity to modify the status of the rail vehicle. If the rail vehicle is isolated the operator should indicate as such and save the data. Data associated with the rail vehicle information may be reviewed and accepted if correct 344 or rejected 346.

FIG. 28 depicts a third verification screen. The third verification screen presented for operator verification may contain temporary speed restrictions 350 that the operator, rail vehicle crew has in paperwork provided prior to the mission. The data in FIG. 28 could be presented in alternate forms from at least one of the following graphically on a map/graph, configurable based on route, and/or user selectable viewing. Each subdivision is presented and the operator must review all temporary speed restrictions for accuracy and completeness. When acceptable, the operator may press the accept key 352 if correct.

After the final subdivision slow orders are verified, the display will transition to a trip optimizer operational rolling map screen, such as illustrated at FIGS. 8-10. It is at this time that the fuel optimized speed profile is processed. The rolling map will populate when all the data computations have been completed.

Figure 29:
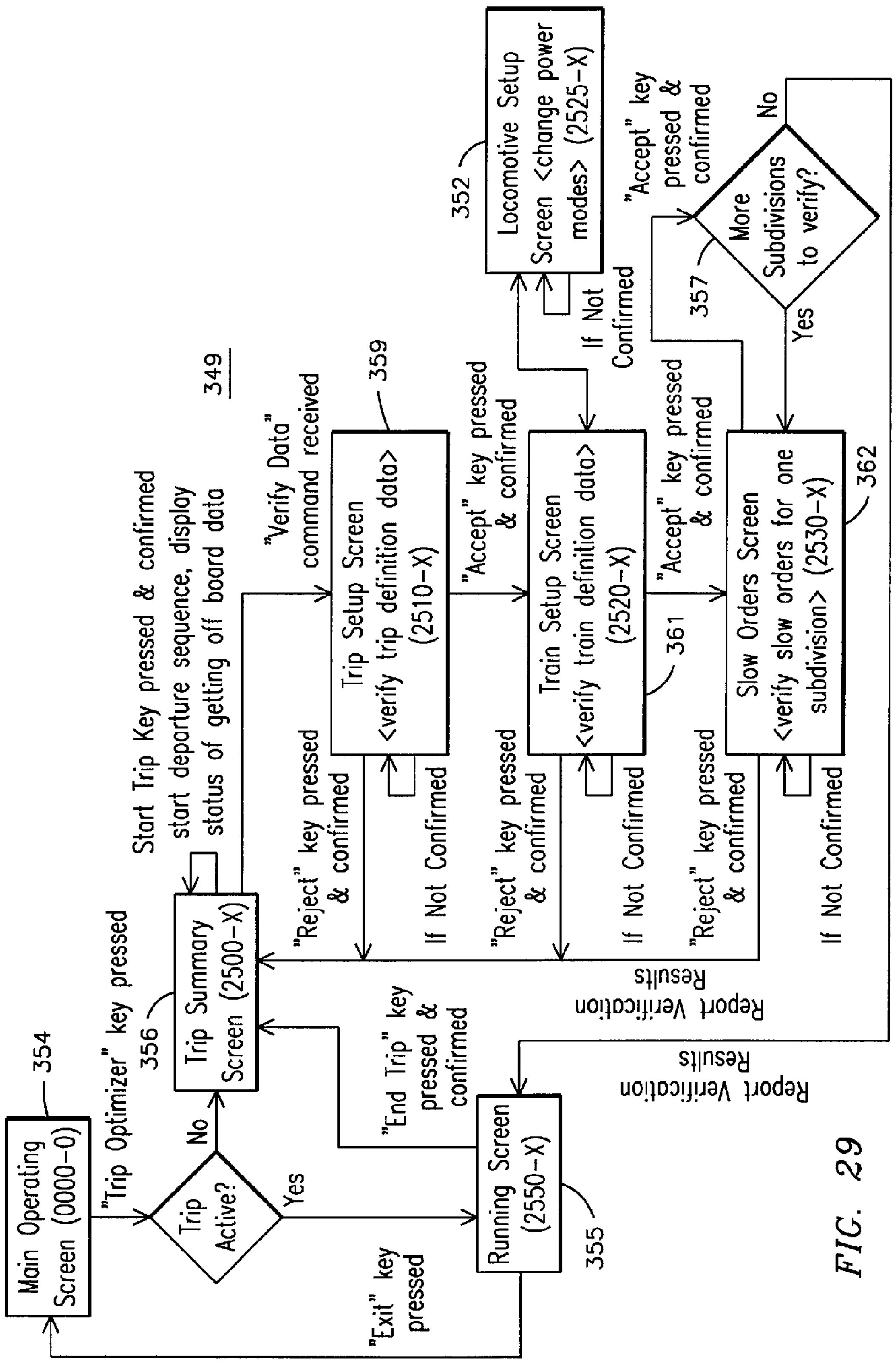
FIG. 29 depicts process flow for display of information for verifying and accepting information used in creating a mission plan.

FIG. 29 depicts a flowchart for displaying information on a display. A main operating screen 354 is provided. When an initiate key is selected, an inquiry regarding whether a mission is active must be answered. If the trip is active, screens 355 illustrating the mission are provided once verification 359, 361, 362 takes place. Examples of verification that may take place include but are not limited to trip definition data, at 359, powered system makeup data, at 361, and slow order data, at 362. When the mission has ended, a trip summary screen 356 is provided. Once no additional subdivisions of data must be verified, at 357, the screens 355 for operating the rail vehicle are provided. This flowchart 349 is associated with the screens disclosed herein where various reject and accept keys are provided on respective screens as disclosed.

Data verification could be condensed by using advanced computer security techniques such as a simple cyclic redundancy check (CRC) value of the data. The operator could verify the entire set of data or a CRC value of the combined data. Verification of data is not limited to being performed on board the powered system. Verification may be accomplished off board, such as but not limited to at a remote monitoring facility, or onboard the unit. With respects to a rail vehicle, verification could also be performed by any of the operator, conductor and/or the dispatcher of the mission.

Figure 30:
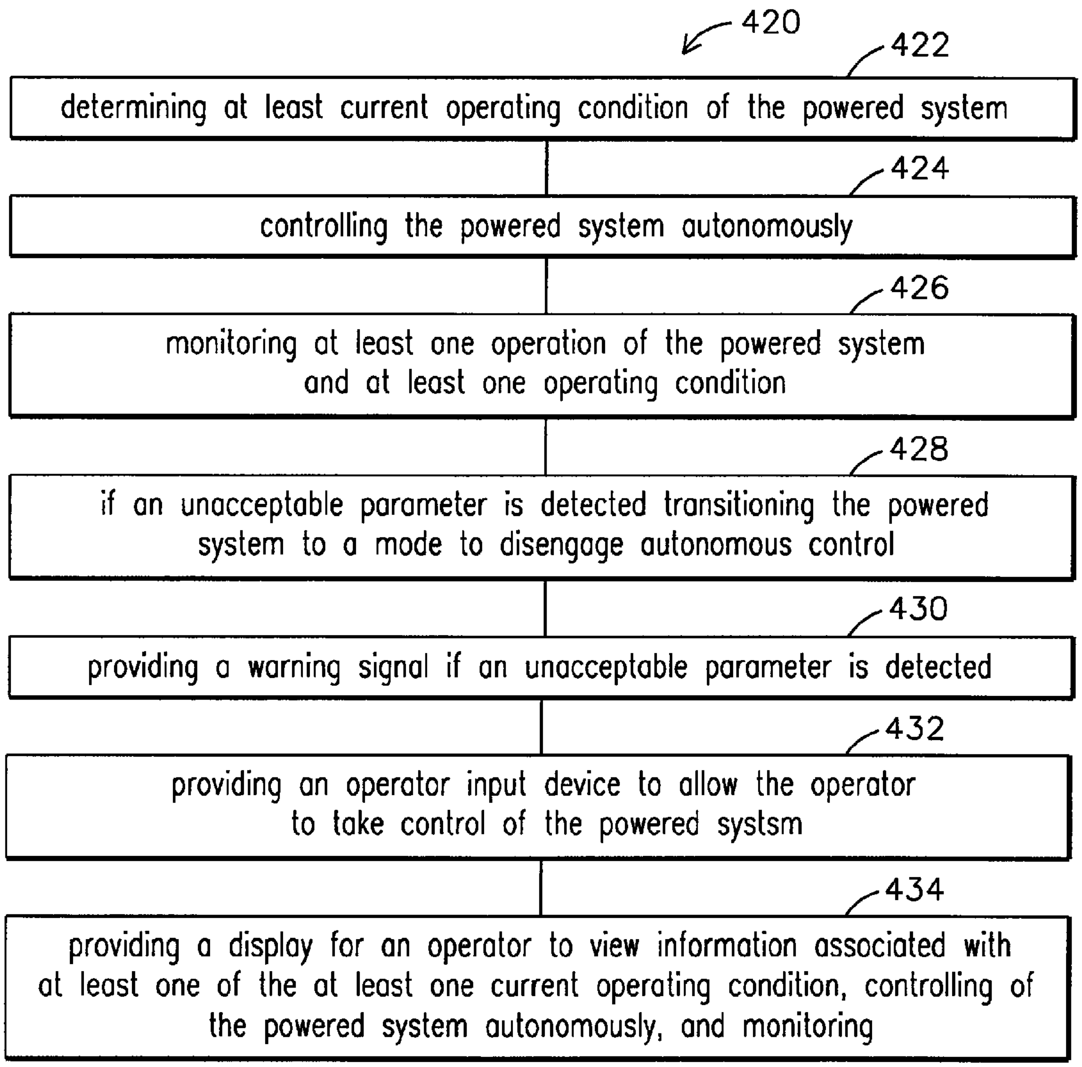
FIG. 30 depicts a flowchart of a method for operating a powered system having at least one power generating unit.

FIG. 30 depicts a flowchart 420 illustrating an embodiment allowing autonomous control of a powered system having at least one primary power generating unit. As illustrated in the flowchart 420 at least one current operating condition of the powered system is determined and/or identified, at 422. If the operating condition is at an acceptable level the powered system may be controlled autonomously, such as but not limited to in accordance with a mission optimization plan, at 424. The operation of the powered system and/or the at least one operating condition is monitored, at 426. If an unacceptable parameter is detected, such as but not limited to where autonomous operation is deemed unsafe, the powered system is transitioned to a mode to disengage autonomous control, at 428. A warning signal may be sounded if an unacceptable parameter is detected, at 430. An operator input device may also be provided to allow the operator to take control of the powered system, at 432. A display for an operator to view information associated with at least one of the at least one current operating condition, controlling of the powered system autonomously, and monitoring is also provided, at 434. The type of information is disclosed herein. In any case those skilled in the art would readily recognize the sort or types of information with respects to each powered system disclosed.

Transitioning of the powered system may further include a sequence and/or procedure to allow for a systematic transfer from autonomous control to manual control of the powered system. As with all of the flowcharts disclosed herein, the flowchart 420 may be implemented with a computer software code operable with a processor and configured to reside on a computer readable media.

Figure 31:
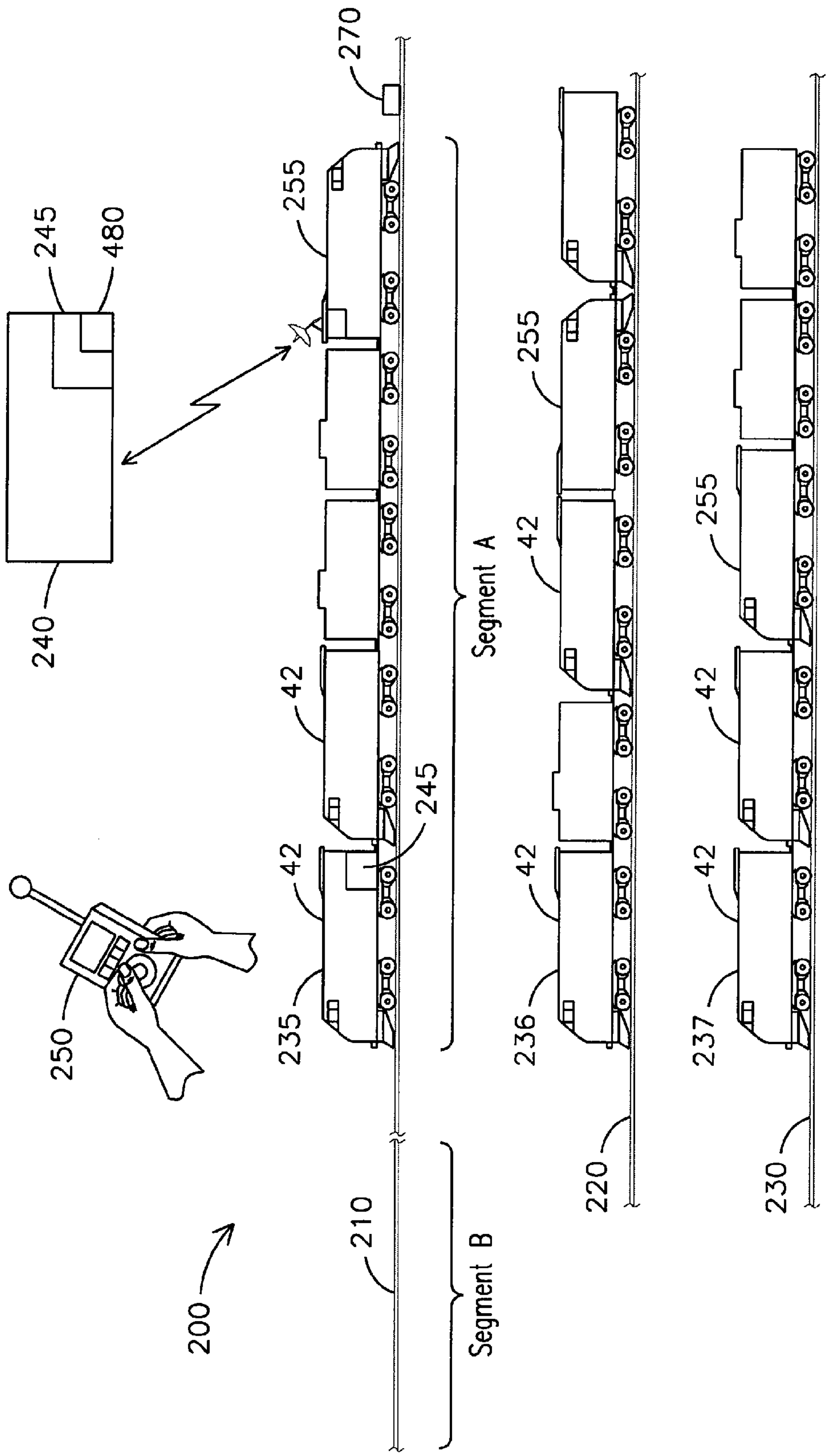
FIG. 31 depicts an embodiment of a network of railway tracks with multiple trains.

FIG. 31 depicts an embodiment of a network of railway tracks with multiple trains. In the railroad network 200, it is desirable to obtain an optimized fuel efficiency and time of arrival for the overall network of multiple interacting tracks 210, 220, 230, and trains 235, 236, 237. As illustrated multiple tracks 210, 220, 230 are shown with a train 235, 236, 237 on each respective track. Though locomotive consists 42 are illustrated as part of the trains 235, 236, 237, those skilled in the art will readily recognize that any train may only have a single locomotive consist having a single locomotive. As disclosed herein, a remote facility 240 may also be involved with improving fuel efficiency and reducing emissions of a train through optimized train power makeup. This may be accomplished with a processor 245, such as a computer, located at the remote facility 240. In another embodiment a hand-held device 250 may be used to facilitate improving fuel efficiency of the train 235, 236, 237 through optimized train power makeup. Typically in either of these approaches, configuring the train 235, 236, 237 usually occurs at a hump or rail yard, more specifically when the train is being compiled.

However as discussed below, the processor 245 may be located on the train 235, 236, 237 or aboard another train, wherein train setup may be accomplished using inputs from the other train. For example, if a train has recently completed a mission over the same tracks, input from that train's mission may be supplied to the current train as it either is performing and/or is about to begin its mission. Thus configuring the train may occur at train run time, and even during the run time. For example, real time configuration data may be utilized to configure the train locomotives. One such example is provided above with respect to using data from another train. Another example entails using other data associated with trip optimization of the train as discussed above. Additionally the train setup may be performed using input from a plurality of sources, such as, but not limited to, a dispatch system, a wayside system 270, an operator, an off-line real time system, an external setup, a distributed network, a local network, and/or a centralized network.

Figure 32:
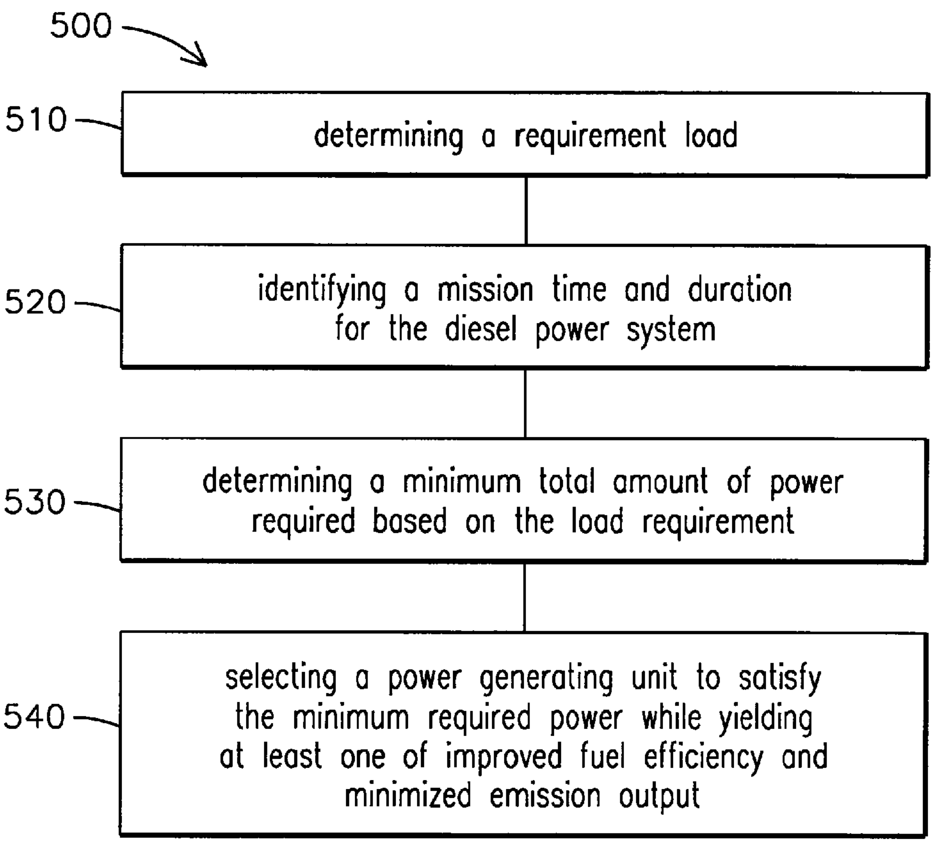
FIG. 32 depicts an embodiment of a flowchart for improving fuel efficiency of a train through optimized train power makeup.

FIG. 32 depicts an embodiment of a method for improving fuel efficiency and reducing emission output through optimized train power makeup. As disclosed above to minimize fuel use and emissions while preserving time arrival, in an embodiment acceleration and matched breaking are minimized. Undesired emissions may also be minimized by powering a minimal set of locomotives. For example, in a train with several locomotives or locomotive consists, powering a minimal set of locomotives at a higher power setting while putting the remaining locomotives into idle, un-powered standby, or an automatic engine start-stop (AESS) mode as discussed below, will reduce emissions. This is due, in part, because at lower power settings such as notch 1-3, exhaust emissions after-treatment devices (e.g., catalytic converters) located on the locomotives are at a temperature below which these systems' operations are optimal. Therefore, using the minimum number of locomotives or locomotive consists to make the mission on time, operating at high power settings will allow for the exhaust emission treatment devices, such as but not limited to catalytic converters, to operate at optimal temperatures thus further reducing emissions.

Figure 12:
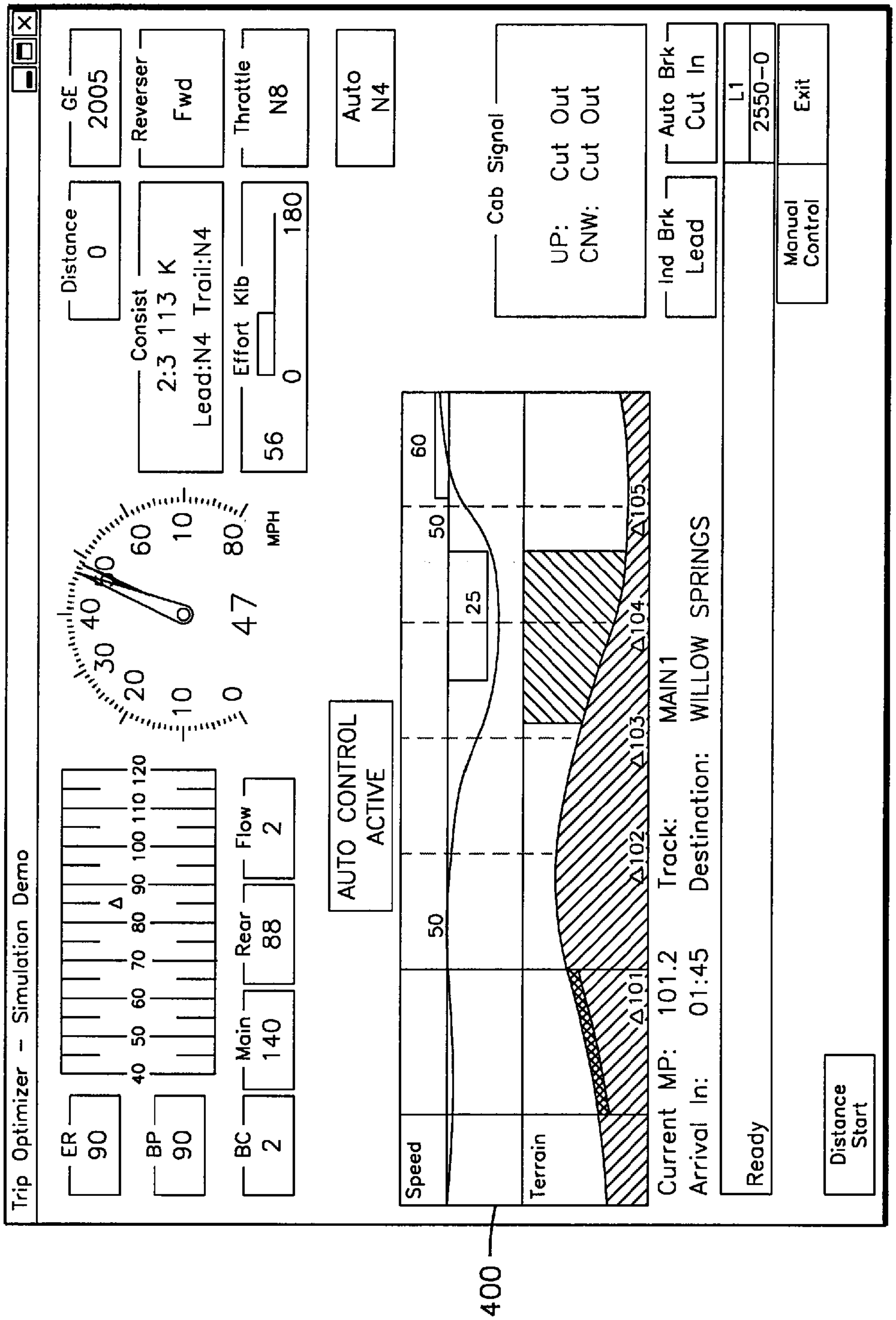
FIG. 12 depicts another illustration of a dynamic display for use by the operator.
Figure 33:
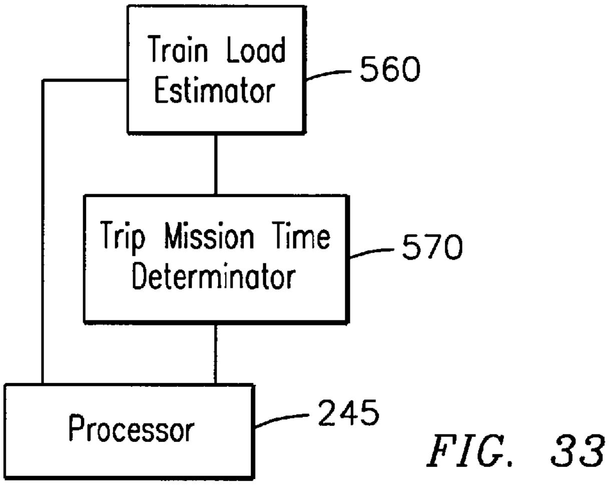
FIG. 33 depicts a block diagram of elements included in a system for optimized train power makeup.

The flowchart 500 in FIG. 12 provides for determining a train load, at 510. When the engine is used in other applications, the load is determined based on the engine configuration. The train load may be determined with a load, or train load, estimator 560, as illustrated in FIG. 33. In an embodiment the train load is estimated based on information obtained as disclosed in a train makeup docket 480, as illustrated in FIG. 31. For example, the train makeup docket 480 may be contained in the computer 245 (illustrated in FIGS. 31 and 33), wherein the processor 245 makes the estimation, or may be on paper wherein an operator makes the estimation. The train makeup docket 480 may include such information as, but not limited to, number of cars, weight of the cars, content of the cars, age of cars, etc. In another embodiment the train load is estimated using historical data, such as but not limited to prior train missions making the same trip, similar train car configurations, etc. As discussed above, using historical data may be accomplished with a processor or manually. In yet another embodiment, the train load is estimated using a rule of thumb or table data. For example, the operator configuring the train 235, 236, 237 may determine the train load required based on established guidelines such as, but not limited to, a number of cars in the train, types of cars in the train, weight of the cars in the train, an amount of products being transported by the train, etc. This same rule of thumb determination may also be accomplished using the processor 245.

Identifying a mission time and/or duration for the diesel power system, at 520, is disclosed. With respect to engines used in other applications, identifying a mission time and/or duration for the diesel power system may be equated to defining the mission time within which the engine configuration is expected to accomplish the mission. A determination is made about a minimum total amount of power required based on the train load, at 530. The locomotive is selected to satisfy the minimum required power while yielding improved fuel efficiency and/or minimized emission output, at 540. The locomotive may be selected based on a type of locomotive (based on its engine) needed and/or a number of locomotives (based on a number of engines) needed. Similarly, with respect to diesel engines used in other power applications, such as but not limited to marine, OHV, and stationary power stations, where multiple units of each are used to accomplish an intended mission unique for the specific application, the type of power system and a number of power systems may be selected based on a mission objective.

Towards this end, a trip mission time determinator 570, as further illustrated in FIG. 33, may be used to determine the mission time, based on information such as weather conditions, track conditions, etc. The locomotive makeup may be based on types of locomotives needed, such as based on power output, and/or a minimum number of locomotives needed. For example, based on the available locomotives, a selection is made of those locomotives that just meet the total power required. Towards this end, as an example, if ten locomotives are available, a determination of the power output from each locomotive is made. Based on this information, the fewest number and type of locomotives needed to meet the total power requirements are selected. For example the locomotives may have different horse power (HP) ratings or starting tractive effort (TE) ratings. In addition to the total power required, the distribution of power and type of power in the train can be determined. For example, to limit the maximum coupler forces on heavy trains, the locomotives may be distributed within the train. Another consideration is the capability of the locomotive. It may be possible to put 4 DC locomotives on the head end of a train, however 4 AC units with the same horsepower may not be used at the head end since the total drawbar forces may exceed designated limits.

In another embodiment, the selection of locomotives may not be based solely on reducing a number of locomotives used in a train. For example, if the total power requirement is minimally met by five of the available locomotives when compared to also meeting the power requirement by the use of three of the available locomotives, the five locomotives are used instead of the three. In view of these options, those skilled in the art will readily recognize that a minimum number of locomotives may be selected from a sequential (and random) set of available locomotives. Such an approach may be used when the train 235, 236, 237 is already compiled and a decision is being made at run time and/or during a mission wherein the remaining locomotives are not used to power the train 235, 236, 237, as discussed in further detail below.

While compiling the train 235, 236, 237, if the train 235, 236, 237 requires backup power, incremental locomotive 255, or locomotives, may be added. However this additional locomotive 255 is isolated to minimize fuel use, emission output, and power variation, but may be used to provide backup power in case an operating locomotive fails, and/or to provide additional power to accomplish the trip within an established mission time. The isolated locomotive 255 may be put into an AESS mode to minimize fuel use while having the locomotive be available when needed. In an embodiment, if a backup, or isolated, locomotive 255 is provided, its dimensions, such as weight, may be taken into consideration when determining the train load.

Thus, as discussed above in more detail, determining minimum power needed to power the train 235, 236, 237 may occur at train run time and/or during a run (or mission). In this instance, once a determination is made as to optimized train power and the locomotives or locomotive consists 42 in the train 235, 236, 237 are identified to provide the requisite power needed, the additional locomotive(s) 255 not identified for use are put in the idle, or AESS, mode.

In an embodiment, the total mission run may be broken into a plurality of sections, or segments, such as but not limited to at least 2 segments, such as segment A and segment B as illustrated in FIG. 31. Based on the amount of time taken to complete any segment, the backup power, provided by the isolated locomotive 255, is made available in case incremental power is needed to meet the trip mission objective. Towards this end, the isolated locomotive 255 may be utilized for a specific trip segment to get the train 235, 236, 237 back on schedule and then switched off for subsequent segments, if the train 235, 236, 237 remains on schedule.

Thus, in operation, the lead locomotive may put the locomotive 255 provided for incremental power into an isolation mode until the power is needed. This may be accomplished by use of wired or wireless modems or communications from the operator, usually on the lead locomotive, to the isolated locomotive 255. In another embodiment, the locomotives operate in a distributed power configuration and the isolated locomotive 255 is already integrated in the distributed power configuration, but is idle, and is switched on when the additional power is required. In yet another embodiment, the operator puts the isolated locomotive 255 into the appropriate mode.

In an embodiment, the initial setup of the locomotives, based on train load and mission time, is updated by the trip optimizer, as disclosed in above, and adjustments to the number and type of powered locomotives are made. As an exemplary illustration, consider a locomotive consist 42 of three locomotives having relative available maximum power of 1, 1.5 and 0.75, respectively. (Relative available power is relative to a reference locomotive, wherein railroads use “reference” locomotives to determine the total consist power. For example, in the case of a “3000 HP” reference locomotive, in the example above the first locomotive would have 3000 HP, the second 4500 HP, and the third 2250 HP). Suppose that the mission is broken into seven segments. Given the above scenario the following combinations are available and can be matched to the track section load, 0.75, 1, 1.5, 1.75, 2.25, 2.5, 3.25, which is the combination of maximum relative HP settings for the consist. Thus, for each respective relative HP setting mentioned above, for 0.75 the third locomotive is on and the first and second are off, for 1 the first locomotive is on and the second and third are off, etc. In a preferred embodiment the trip optimizer selects the maximum required load and adjusts via notch calls while minimizing an overlap of power settings. Hence, if a segment calls for between 2 and 2.5 (times 3000 HP) then locomotive 1 and locomotive 2 are used while locomotive 3 is in either idle or in standby mode, depending on the time it is in this segment and the restart time of the locomotive.

In another embodiment, an analysis may be performed to determine a trade off between emission output and locomotive power settings to maximize higher notch operation where the emissions from the exhaust after treatment devices are more optimal. This analysis may also take into consideration one of the other parameters discussed above regarding train operation optimization. This analysis may be performed for an entire mission run, segments of a mission run, and/or combinations of both.

FIG. 33 depicts a block diagram of exemplary elements included in a system for optimized train power makeup. As illustrated and discussed above, a train load estimator 560 is provided. A trip mission time determinator 570 is also provided. A processor 240 is also provided. As disclosed above, though directed at a train, similar elements may be used for other engines not being used within a rail vehicle, such as but not limited to off-highway vehicles, marine vessels, and stationary units. The processor 240 calculates a total amount of power required to power the train 235, 236, 237 based on the train load determined by the train load estimator 560 and a trip mission time determined by the trip mission time determinator 570. A determination is further made of a type of locomotive needed and/or a number of locomotives needed, based on each locomotive power output, to minimally achieve the minimum total amount of power required based on the train load and trip mission time.

The trip mission time determinator 570 may segment the mission into a plurality of mission segments, such as a segment A and a segment B, as discussed above. The total amount of power may then be individually determined for each segment of the mission. As further discussed above, an additional locomotive 255 is part of the train 235, 236, 237 and is provided for backup power. The power from the backup locomotive 255 may be used incrementally as a requirement is identified, such as but not limited to providing power to get the train 235, 236, 237 back on schedule for a particular trip segment. In this situation, the train 235, 236, 237 is operated to achieve and/or meet the trip mission time.

The train load estimator 560 may estimate the train load based on information contained in the train makeup docket 480, historical data, a rule of thumb estimation, and/or table data. Furthermore, the processor 245 may determine a trade off between emission output and locomotive power settings to maximize higher notch operation where the emissions from the exhaust after-treatment devices are optimized.

Figure 34:
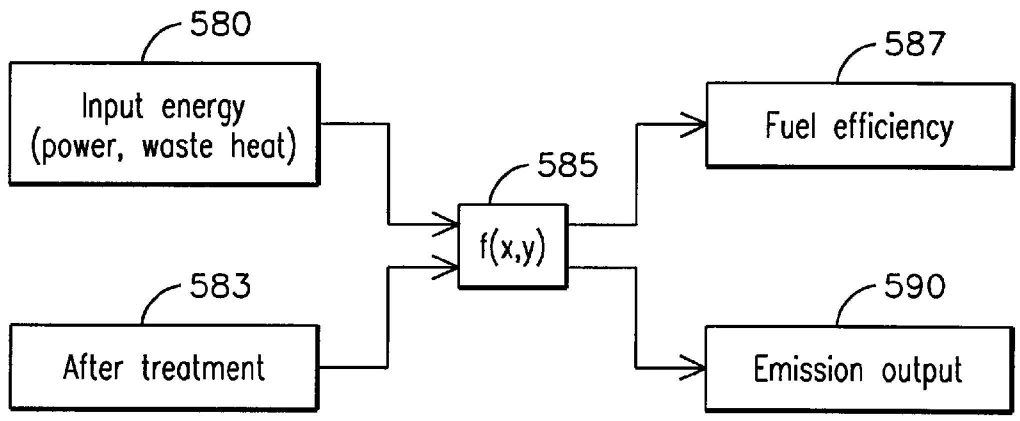
FIG. 34 depicts a block diagram of a transfer function for determining a fuel efficiency and emissions for a diesel powered system.

FIG. 34 depicts a block diagram of a transfer function for determining a fuel efficiency and emissions for a diesel powered system. Such diesel powered systems include, but are not limited to, locomotives, marine vessels, OHV's, and/or stationary generating stations. As illustrated, information pertaining to input energy 580 (such as power, waste heat, etc.) and information about an after treatment process 583 are provided to a transfer function 585. The transfer function 585 utilizes this information to determine an optimum fuel efficiency 587 and emission output 590.

Figure 35:
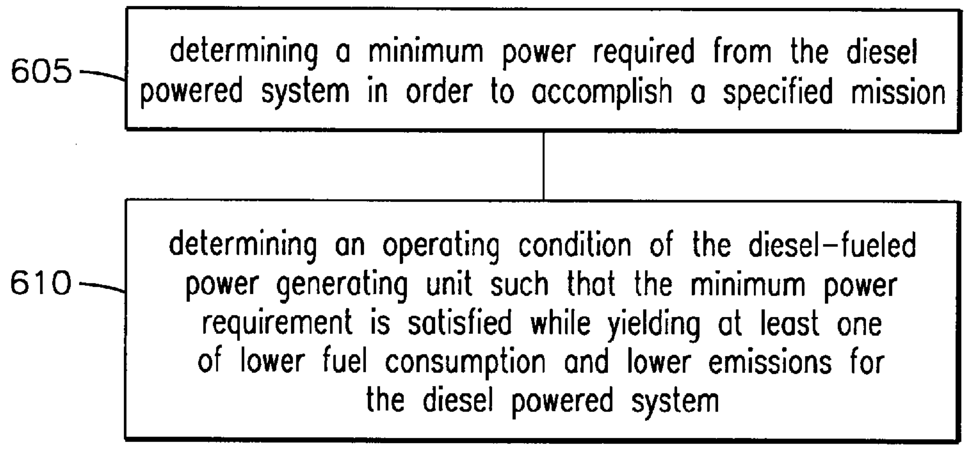
FIG. 35 depicts an embodiment of a flowchart determining a configuration of a diesel powered system having at least one diesel-fueled power generating unit.

FIG. 35 depicts an embodiment of a flow for determining a configuration of a diesel powered system having at least one diesel-fueled power generating unit. The flowchart 600 includes determining a minimum power required from the diesel powered system in order to accomplish a specified mission, at 605. Determining an operating condition of the diesel-fueled power generating unit such that the minimum power requirement is satisfied while yielding lower fuel consumption and/or lower emissions for the diesel powered system, at 610, is also disclosed. As disclosed above, this flowchart 600 is applicable for a plurality of diesel-fueled power generating units, such as but not limited to locomotives, marine vessels, OHV's, and/or stationary generating stations. Additionally, this flowchart 600 may be implemented using a computer software program that may reside on a computer readable media.

Figure 36:
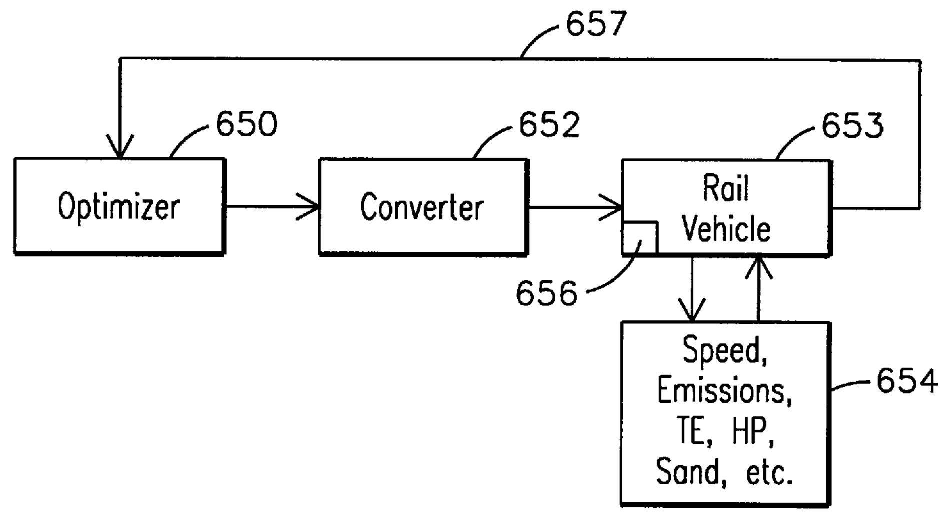
FIG. 36 depicts an embodiment of a closed-loop system for operating a rail vehicle.

FIG. 36 depicts an embodiment of a closed-loop system for operating a rail vehicle. As illustrated, an optimizer 650, converter 652, rail vehicle 653, and at least one output 654 from gathering specific information, such as but not limited to speed, emissions, tractive effort, horse power, a friction modifier technique (such as but not limited to applying sand), etc., are part of the closed-loop control communication system 657. The output 654 may be determined by a sensor 656 that is part of the rail vehicle 653, or in another embodiment independent of the rail vehicle 653. Information initially derived from information generated from the trip optimizer 650 and/or a regulator is provided to the rail vehicle 653 through the converter 652. Locomotive data gathered by the sensor 656 from the rail vehicle is then communicated 657 back to the optimizer 650.

The optimizer 650 determines operating characteristics for at least one factor that is to be regulated, such as but not limited to speed, fuel, emissions, etc. The optimizer 650 determines a power and/or torque setting based on a determined optimized value. The converter 652 is provided to convert the power, torque, speed, emissions, initiate applying a friction modifying technique (such as but not limited to applying sand), setup, configurations, etc., into a form suitable for applying to the control inputs for the rail vehicle 653, usually a locomotive. Specifically, this information or data about power, torque, speed, emissions, friction modifying (such as but not limited to applying sand), setup, configurations etc., and/or control inputs is converted to an electrical signal.

Figure 37:
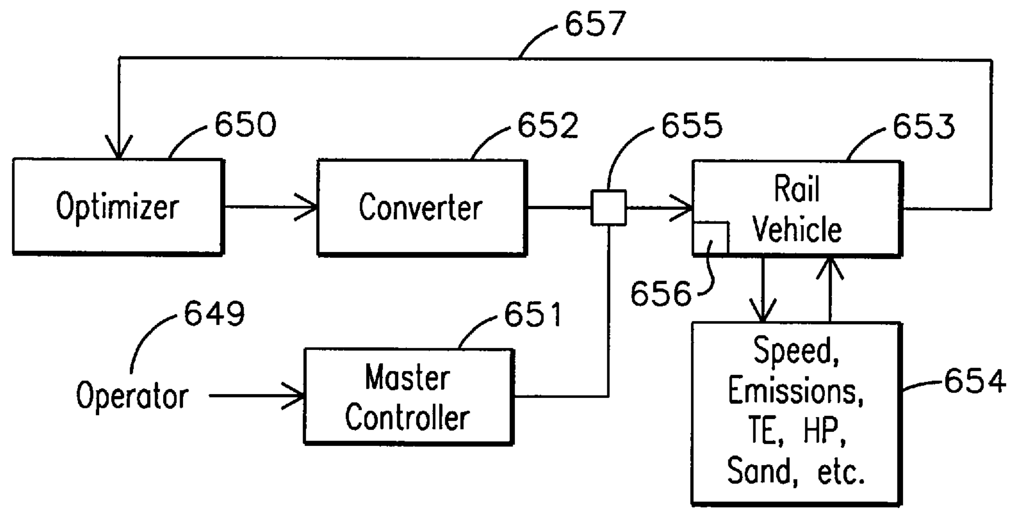
FIG. 37 depicts the closed loop system of FIG. 16 integrated with a master control unit.

FIG. 37 depicts the closed loop system integrated with a master control unit 651. As illustrated in further detail below, the converter 652 may interface with any one of a plurality of devices, such as but not limited to a master controller, remote control locomotive controller, a distributed power drive controller, a train line modem, analog input, etc. The converter, for example, may disconnect the output of the master controller (or actuator) 651. The actuator 651 is normally used by the operator to command the locomotive, such as but not limited to power, horsepower, tractive effort, implement a friction modifying technique (such as but not limited to applying sand), braking (including at least one of dynamic braking, air brakes, hand brakes, etc.), propulsion, etc. levels to the locomotive. Those skilled in the art will readily recognize that the master controller may be used to control both hard switches and software based switches used in controlling the locomotive. The converter 652 then applies signals to the actuator 651. The actuator 651 may be disconnected using electrical wires, software switches, a configurable input selection process, etc. A switching device 655 is illustrated to perform this function.

Though FIG. 37 discloses a master controller, this is specific to a locomotive. Those skilled in the art will recognize that in other applications, such as those disclosed above, another device provides the function of the master controller as used in the locomotive. For example, an accelerator pedal is used in an OHV and transportation bus, and an excitation control is used on a generator. With respect to marine vessels, there may be multiple force producers (propellers), in different angles/orientation, that need to be controlled closed loop.

As discussed above, the same technique may be used for other devices, such as but not limited to a control locomotive controller, a distributed power drive controller, a train line modem, analog input, etc. Though not illustrated, those skilled in the art will readily recognize that the master controller similarly could use these devices and their associated connections to the locomotive and use the input signals. The communication system 657 for these other devices may be either wireless or wired.

Figure 38:
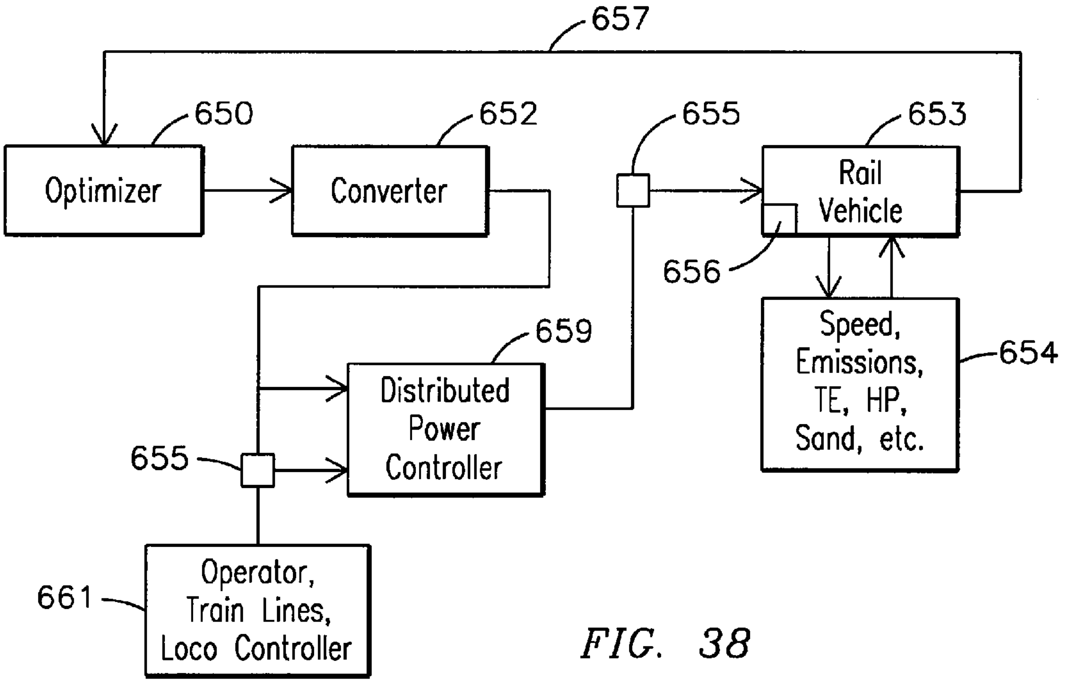
FIG. 38 depicts an embodiment of a closed-loop system for operating a rail vehicle integrated with another input operational subsystem of the rail vehicle.

FIG. 38 depicts an embodiment of a closed-loop system for operating a rail vehicle integrated with another input operational subsystem of the rail vehicle. For example, the distributed power drive controller 659 may receive inputs from various sources 661, such as but not limited to the operator, train lines, and locomotive controllers, and transmit the information to locomotives in the remote positions. The converter 652 may provide information directly to the input of the DP controller 659 (as an additional input) or break one of the input connections and transmit the information to the DP controller 659. A switch 655 is provided to direct how the converter 652 provides information to the DP controller 659 as discussed above. The switch 655 may be a software-based switch and/or a wired switch. Additionally, the switch 655 is not necessarily a two-way switch. The switch may have a plurality of switching directions based on the number of signals it is controlling.

Figure 39:
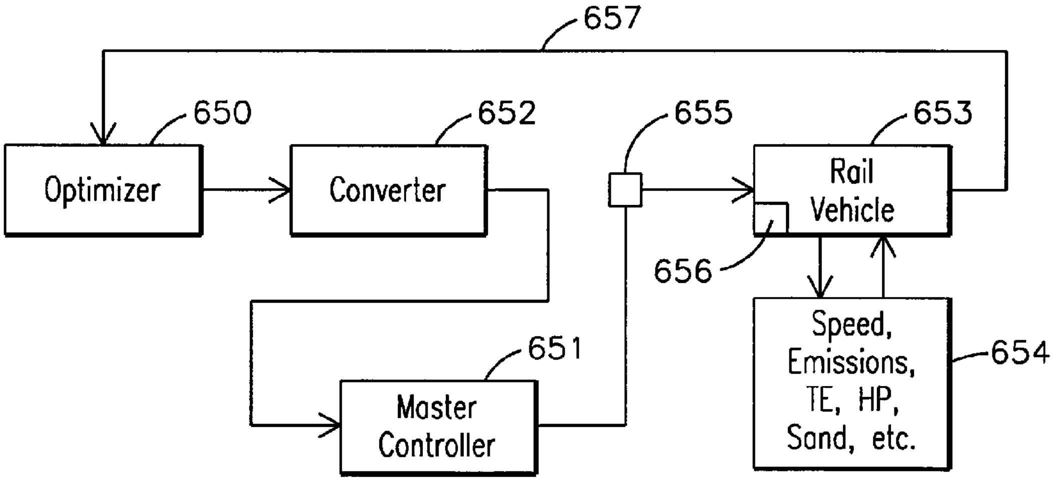
FIG. 39 depicts an embodiment of the closed-loop system with a converter which may command operation of the master controller.

In another embodiment, the converter may command operation of the master controller, as illustrated in FIG. 39. The converter 652 has a mechanical means for moving the actuator 651 automatically based on electrical signals received from the optimizer 650.

Sensors 656 are provided aboard the locomotive to gather operating condition data, such as but not limited to speed, emissions, tractive effort, horse power, etc. Locomotive output information 654 is then provided to the optimizer 650, usually through the rail vehicle 653, thus completing the closed loop system.

Figure 40:
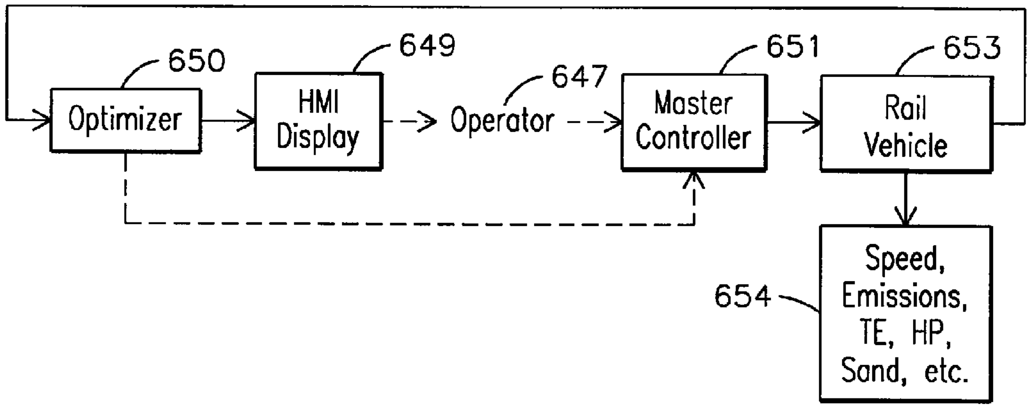
FIG. 40 depicts an embodiment of a closed-loop system.

FIG. 40 depicts another closed loop system where an operator is in the loop. The optimizer 650 generates the power/operating characteristic required for the optimum performance. The information is communicated to the operator 647, such as but not limited to, through a human machine interface (HMI) and/or display 649. This could be in various forms including audio, text, plots, or video displays. The operator 647 in this case can operate the master controller or pedals or any other actuator 651 to follow the optimum power level.

If the operator follows the plan, the optimizer continuously displays the next operation required. If the operator does not follow the plan, the optimizer may recalculate/re-optimize the plan, depending on the deviation and the duration of the deviation of power, speed, position, emission etc. from the plan. If the operator fails to meet an optimized plan to an extent where re-optimizing the plan is not possible or where safety criteria have been or may be exceeded, in an embodiment the optimizer may take control of the vehicle to ensure optimized operation, annunciate a need to consider the optimized mission plan, or simply record the occurrence for future analysis and/or use. In such an embodiment, the operator could retake control by manually disengaging the optimizer.

Figure 41:
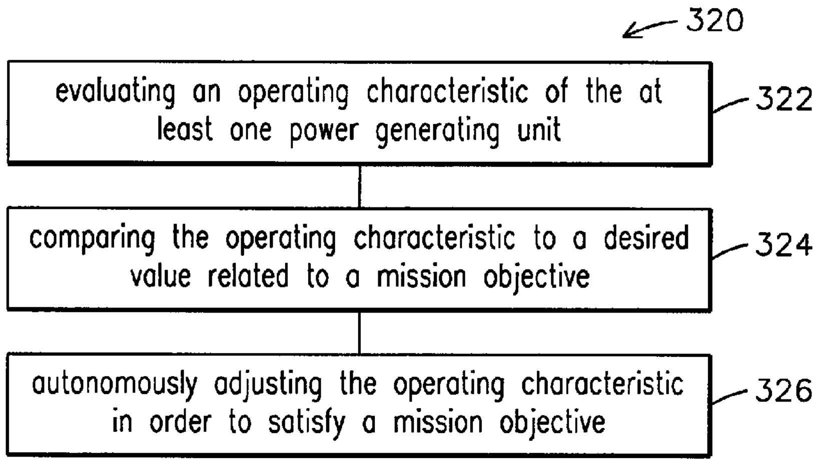
FIG. 41 depicts embodiments flowchart of a method for operating a powered system.

FIG. 41 depicts an embodiment of a flowchart 320 for operating a powered system having at least one power generating unit where the powered system may be part of a fleet and/or a network of powered systems. Evaluating an operating characteristic of at least one power generating unit is disclosed, at 322. The operating characteristic is compared to a desired value related to a mission objective, at 324. The operating characteristic is autonomously adjusted in order to satisfy a mission objective, at 326. As disclosed herein the autonomously adjusting may be performed using a closed-loop technique. Furthermore, the embodiments disclosed herein may also be used where a powered system is part of a fleet and/or a network of powered systems.

Figure 42:
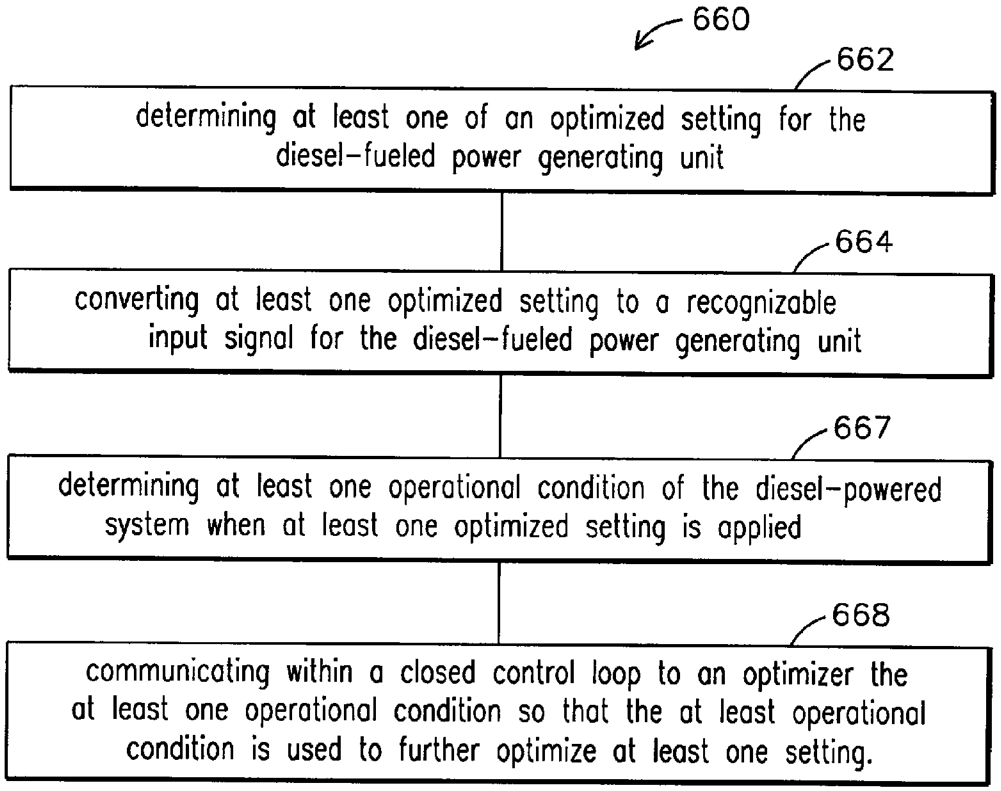
FIG. 42 depicts a flowchart of a method for operating a rail vehicle in a closed-loop process.

FIG. 42 depicts an exemplary flowchart 660 showing a method for operating a rail vehicle in a closed-loop process. The flowchart 660 includes determining an optimized setting for a locomotive consist, at 662. The optimized setting may include a setting for any setup variable such as but not limited to at least one of power level, optimized torque emissions, other locomotive configurations, etc. The optimized power level and/or the torque setting are converted to a recognizable input signal for the locomotive consist, at 664. At least one operational condition of the locomotive consist is determined when at least one of the optimized power level and the optimized torque setting is applied, at 667. Communicating within a closed control loop to an optimizer the at least one operational condition so that the at least operational condition is used to further optimize at least one of power level and torque setting, at 668, is further disclosed.

As disclosed above, this flowchart 660 may be performed using a computer software code. Therefore, for rail vehicles that may not initially have the ability to utilize the flowchart 660 disclosed herein, electronic media containing at least one computer software module that is part of the computer software code may be accessed by a computer on the rail vehicle so that at least of the software modules may be loaded onto the rail vehicle for implementation. Electronic media is not to be limiting since any of the computer software modules may also be loaded through an electronic media transfer system, including a wireless and/or wired transfer system, such as but not limited to using the Internet to accomplish the installation.

Locomotives produce emissions at rates based on notch levels. In reality, a lower notch level does not necessarily result in a lower emission per unit output, such as for example gm/hp-hr, and the reverse is true as well. Such emissions may include, but are not limited to, particulates, exhaust, heat, etc. Similarly, noise levels from a locomotive also may vary based on notch levels, in particularly noise frequency levels. Therefore, when emissions are mentioned herein, those skilled in the art will readily recognize that embodiments of the invention are also applicable for reducing noise levels produced by a diesel powered system. Therefore, even though both emissions and noise are disclosed at various times herein, the term emissions should also be read to also include noise.

When an operator calls for a specific horse power level, or notch level, the operator is expecting the locomotive to operate at a certain traction power or tractive effort. In an embodiment, to minimize emission output, the locomotive is able to switch between notch/power/engine speed levels while maintaining the average traction power desired by the operator. For example, suppose that the operator calls for notch 4 or 2000 HP. Then the locomotive may operate at notch 3 for a given period, such as a minute, and then move to notch 5 for a period and then back to notch 3 for a period such that the average power produced corresponds to notch 4. The locomotive moves to notch 5 because the emission output of the locomotive at this notch setting is already known to be less than when at notch 4. During the total time that the locomotive is moving between notch settings, the average is still notch 4, thus the tractive power desired by the operator is still realized.

The time for each notch is determined by various factors, such as but not limited to, the emissions at each notch, power levels at each notch, and the operator sensitivity. Those skilled in the art will readily recognize that embodiments of the invention are operatable when the locomotive is being operated manually, and/or when operation is automatically performed, such as but not limited to when controlled by an optimizer, and during low speed regulation.

In another embodiment, multiple set points are used. These set points may be determined by considering a plurality of factors such as, but not limited to, notch setting, engine speed, power, engine control settings, etc. In another embodiment, when multiple locomotives are used but may operate at different notch/power settings, the notch/power setting are determined as a function of performance and/or time. When emissions are being reduced, other factors that may be considered wherein a tradeoff may be considered in reducing emissions include, but are not limited to, fuel efficiency, noise, etc. Likewise, if the desire is to reduce noise, emissions and fuel efficiency may be considered. A similar analysis may be applied if fuel efficiency is what is to be improved.

Figure 43:
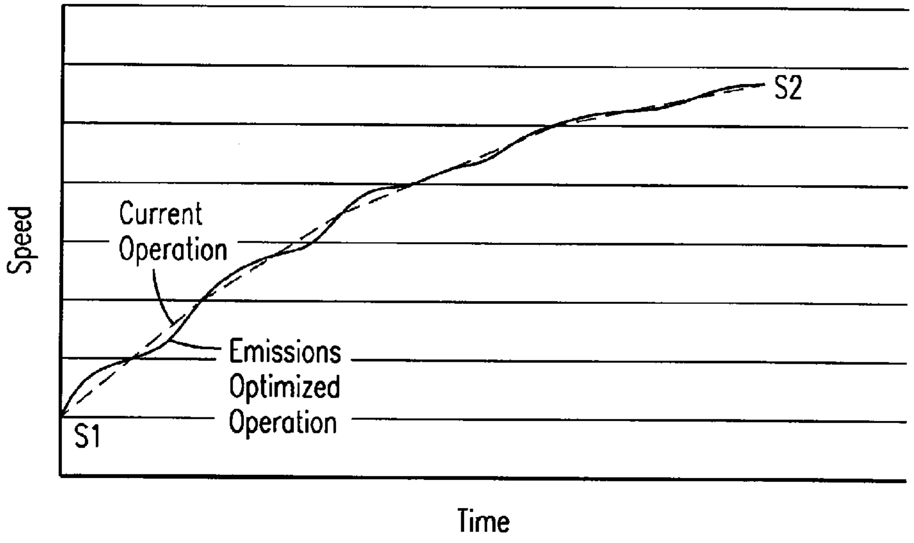
FIG. 43 depicts an embodiment of a speed versus time graph comparing current operations to emissions optimized operation

FIG. 43 depicts an embodiment of a speed versus time graph comparing current operations to emissions optimized operation. The speed change compared to desirable speed can be arbitrarily minimized. For example, if the operator desires to move from one speed (S1) to another speed (S2) within a desired time, it can be achieved with minor deviations.

Figure 44:
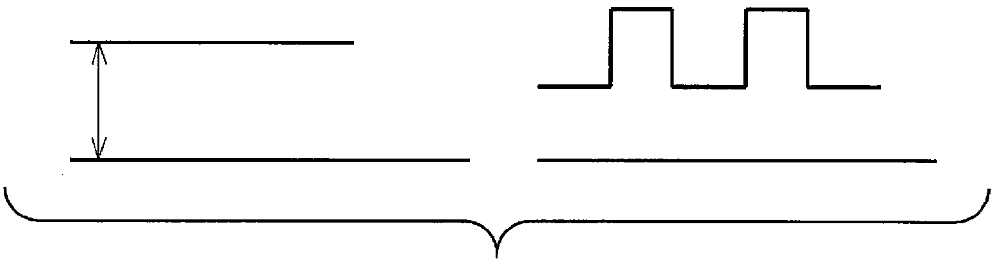
FIG. 44 depicts a modulation pattern compared to a given notch level.

FIG. 44 depicts a modulation pattern that results in maintaining a constant desired notch and/or horsepower. The amount of time at each notch depends on the number of locomotives and the weight of the train and its characteristics. Essentially, the inertia of the train is used to integrate the tractive power/effort to obtain a desired speed. For example, if the train is heavy the time between transitions of notches 3 to 5 and vice versa in the example can be large. In another example, if the number of locomotives for a given train is great, the times between transitions need to be smaller. More specifically, the time modulation and/or cycling will depend on train and/or locomotive characteristics.

As discussed previously, emission output may be based on an assumed notch distribution, but the operator/rail road is not required to have that overall distribution. Therefore, it is possible to enforce the notch distribution over a period of time, over many locomotives over a period of time, and/or for a fleet locomotives over a period of time. By being provided with emission data, the trip optimizer described herein compares the desired notch/power setting with emission output based on notch/power settings and determines the notch/power cycle to meet the speed required while minimizing emission output. The optimization could be explicitly used to generate the plan, or the plan could be modified to enforce, reduce, and/or meet the emissions required.

Figure 45:
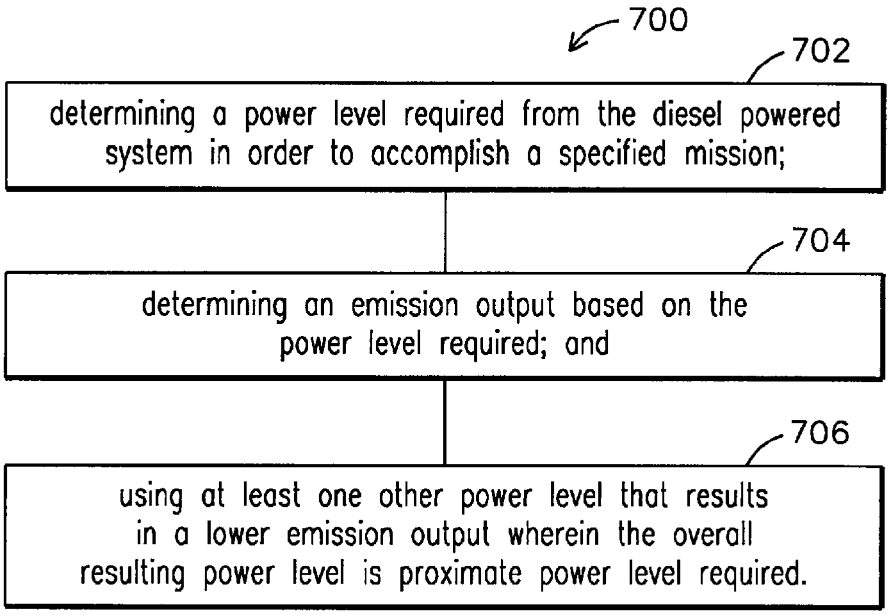
FIG. 45 depicts a flowchart of a method for determining a configuration of a diesel powered system.

FIG. 45 depicts an exemplary flowchart 700 of a method for determining a configuration of a diesel powered system having at least one diesel-fueled power generating unit. The flowchart 700 provides for determining a minimum power, or power level, required from the diesel powered system in order to accomplish a specified mission, at 702. An emission output based on the minimum power, or power level, required is determined, at 704. Using at least one other power level that results in a lower emission output wherein the overall resulting power is proximate the power required, at 706, is also disclosed. Therefore, in operation, the desired power level with at least another power level may be used and/or two power levels, not including the desired power level may be used. In the second example, as disclosed above, if the desired power level is notch 4, the two power levels used may include notch 3 and notch 5.

As disclosed, emission output data based on notch speed is provided to the trip optimizer. If a certain notch speed produces a high amount of emission, the trip optimizer can function by cycling between notch settings that produce lower amounts of emission output so that the locomotive will avoid operating at the particular notch while still meeting the speed of the avoided notch setting. For example, applying the same example provided above, if notch 4 is identified as a less than optimum operational setting because of emission output, but other notch 3 and 5 produce lower emission outputs, the trip optimizer may cycle between notch 3 and 5 where that the average speed equates to speed realized at notch 4. Therefore, while providing speed associated with notch 4, the total emission output is less than the emission output expected at notch 4.

Therefore, when operating in this configuration, although speed constraints imposed based on defining notch limitations may not actually be adhered to, total emission output over a complete mission may be improved. More specifically, though a region may impose that rail vehicles are not to exceed notch 5, the trip optimizer may determine that cycling between notch 6 and 4 may be preferable to reach the notch 5 speed limit but while also improving emission output because emission output for the combination of notch 6 and 4 are better than when operating at notch 5, since either notch 4 or notch 6 or both are better than notch 5.

Figure 46:
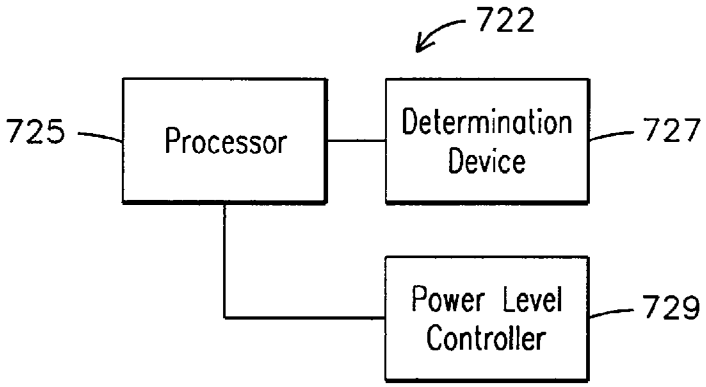
FIG. 46 depicts a system for minimizing (e.g., reducing) emission output.

FIG. 46 illustrates a system for minimizing emission output, noise level, etc., from a diesel powered system having at least one diesel-fueled power generating unit while maintaining a specific speed. As disclosed above, the system 722 includes a processor 725 for determining a minimum power required from the diesel-powered system 18 in order to accomplish a specified mission. The processor 725 may also determine when to alternate between two power levels. A determination device 727 is used to determine an emission output based on the minimum power required. A power level controller 729 for alternating between power levels to achieve the minimum power required is also included. The power level controller 729 functions to produce a lower emission output while the overall average resulting power is proximate the minimum power required.

Figure 47:
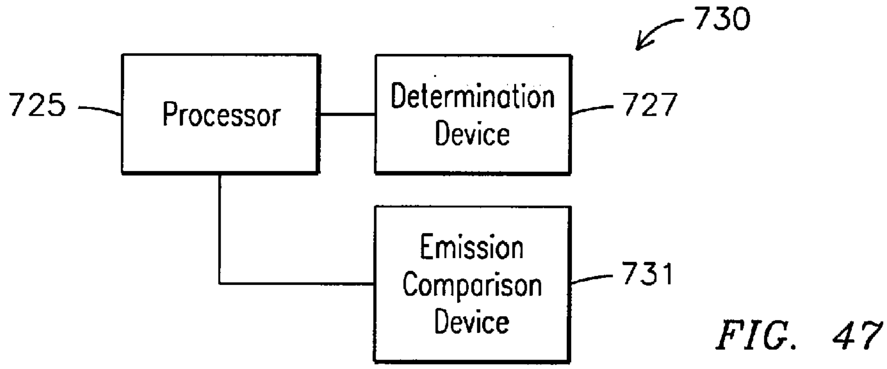
FIG. 47 depicts a system for minimizing emission output from a diesel powered system.

FIG. 47 illustrates a system 730 for minimizing outputs such as emission output and noise output from a diesel powered system having at least one diesel-fueled power generating unit, while maintaining a specific speed. The system includes processor 727 for determining a power level required from the diesel-powered system in order to accomplish a specified mission. The system further includes an emission determinator device 727 for determining an emission output based on the power level required. An emission comparison device 731 is also disclosed. The emission comparison device 731 compares emission outputs for other power levels with the emission output based on the power level required. The emission output of the diesel-fueled power generating unit 18 is reduced based on the power level required by alternating between at least two other power levels which produce less emission output than the power level required, wherein alternating between the at least two other power levels produces an average power level proximate the power level required while producing a lower emission output than the emission output of the power level required. As disclosed herein, alternating may simply result in using at least one other power level. Therefore, although characterized as an alternating operation, this term is not meant to be limiting. Towards this end, in an embodiment a device is provided for alternating between the at least two power levels and/or at least use on other power level. The device may be software-based, where it may reside in the processor 725, or may be mechanical-based such as the converter 652, master controller 651, etc., and/or a combination.

Although the above examples illustrate cycling between two notch levels to meet a third notch level, those skilled in the art will readily recognize that more than two notch levels may be used when seeking to meet a specific desired notch level. Therefore, three or more notch levels may be included in cycling to achieve a specific desired net level to improve emissions while still meeting speed requirements. Additionally, one of the notch levels that are alternated with may include the desired notch level. Therefore, at a minimum, the desired notch level and another notch level may be the two power levels that are alternated between.

Figure 48:
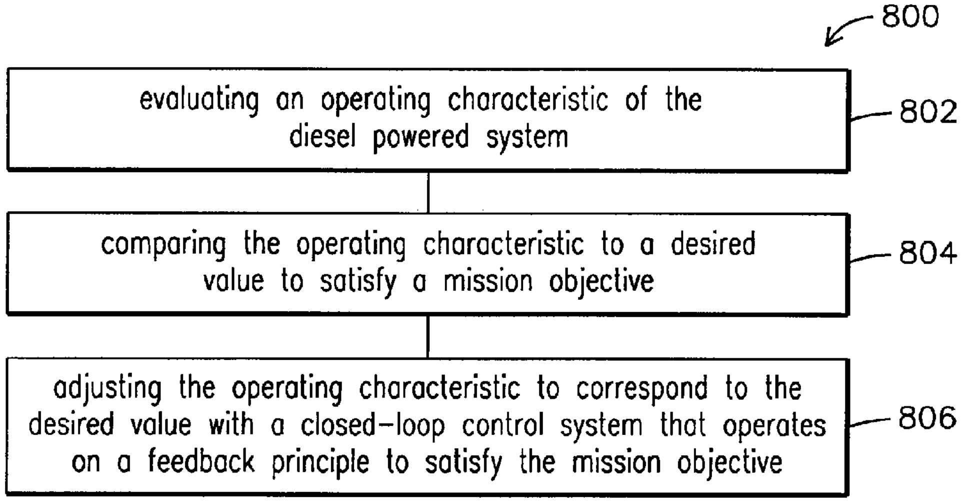
FIG. 48 depicts a flowchart illustrating an embodiment for operating a diesel powered system having at least one diesel-fueled power generating unit.

FIG. 48 discloses an exemplary flowchart 800 of a method for operating a diesel powered system having at least one diesel-fueled power generating unit. The mission objective may include consideration of at least one of total emissions, maximum emission, fuel consumption, speed, reliability, wear, forces, power, mission time, time of arrival, time of intermediate points, and/or braking distance. Those skilled in the art will readily recognize that the mission objective may further include other objectives based on the specific mission of the diesel powered system. For example, as disclosed above, a mission objective of a locomotive is different than that that of a stationary power generating system. Therefore, the mission objective is based on the type of diesel powered system the flowchart 800 is utilized with.

The flowchart 800 discloses evaluating an operating characteristic of the diesel powered system, at 802. The operating characteristic may include at least one of emissions, speed, horse power, friction modifier, tractive effort, overall power output, mission time, fuel consumption, energy storage, and/or condition of a surface upon which the diesel powered system operates. Energy storage is important when the diesel powered system is a hybrid system having for example a diesel fueled power generating unit as its primary power generating system, and an electrical, hydraulic, or other power generating system as its secondary power generating system. With respect to speed, this operating characteristic may be further subdivided with respect to time varying speed and position varying speed.

The operational characteristic may further be based on a position of the diesel powered system when used in conjunction with at least one other diesel powered system. For example, in a train, when viewing each locomotive as a diesel powered system, a locomotive consist may be utilized with a train. Therefore there will be a lead locomotive and a remote locomotive. For those locomotives that are in a trail position, trail mode considerations are also involved. The operational characteristic may further be based on an ambient condition, such as but not limited to temperature and/or pressure.

Also disclosed in the flowchart 800 is comparing the operating characteristic to a desired value to satisfy the mission objective, at 804. The desired value may be determined from at least one of the operational characteristic, capability of the diesel powered system, and/or at least one design characteristic of the diesel powered system. With respect to the design characteristics of the diesel powered system, there are various modules of locomotives where the design characteristics vary. The desired value may be determined at a remote location, such as but not limited to a remote monitoring station, and/or at a location that is a part of the diesel powered system.

The desired value may be based on a location and/or operating time of the diesel powered system. As with the operating characteristic, the desired value is further based on at least one of emissions, speed, horse power, friction modifier, tractive effort, ambient conditions including at least one of temperature and pressure, mission time, fuel consumption, energy storage, and/or condition of a surface upon which the diesel powered system operates. The desired value may be further determined based on a number of diesel-fueled power generating units that are either a part of the diesel powered system and/or a part of a consist, or at the sub-consist level as disclosed above.

Adjusting the operating characteristic to correspond to the desired value with a closed-loop control system that operates in a feedback process to satisfy the mission objective, at 806, is further disclosed. The feedback process may include feedback principals readily known to those skilled in the art. In general, but not to be considered limiting, the feedback process receives information and makes determinations based on the information received. The closed-loop approach allows for the implementation of the flowchart 800 without outside interference. However, if required due to safety issues, a manual override is also provided. The operating characteristic may be adjusted based on an ambient condition. As disclosed above, this flowchart 800 may also be implemented in a computer software code where the computer software code may reside on a computer readable media.

Figure 49:
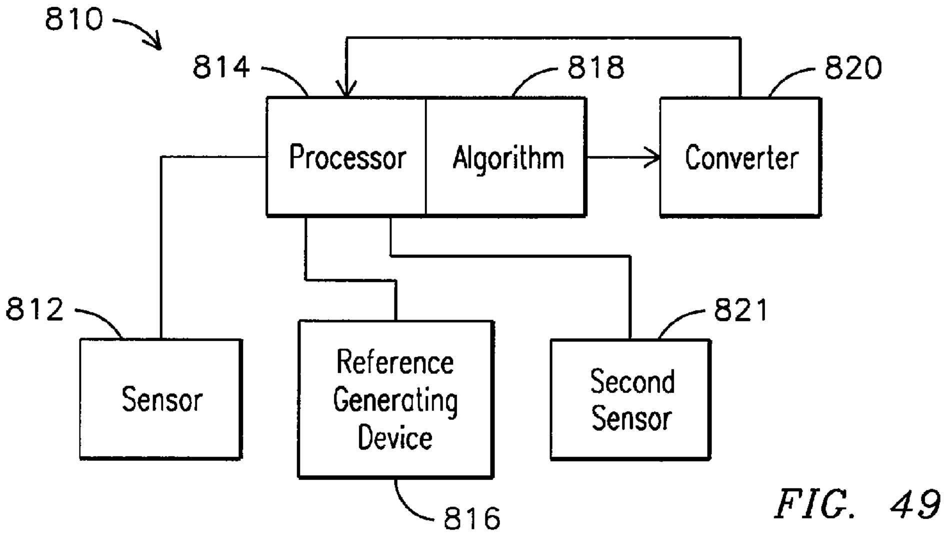
FIG. 49 depicts a block diagram of an exemplary system operating a diesel powered system having at least one diesel-fueled power generating unit.

FIG. 49 discloses a block diagram of an exemplary system 810 for operating a diesel powered system having at least one diesel-fueled power generating unit. The system 810 includes a sensor 812 that is configured for determining at least one operating characteristic of the diesel powered system. In an embodiment, a plurality of sensors 812 are provided to gather operating characteristics from a plurality of locations on the diesel powered system and/or a plurality of subsystems within the diesel powered system. Those skilled in the art will also recognize that the sensor 812 may be an operation input device. Therefore, the sensor 812 can gather operating characteristics, or information, about emissions, speed, horse power, friction modifier, tractive effort, ambient conditions including at least one of temperature and pressure, mission time, fuel consumption, energy storage, and/or condition of a surface upon which the diesel powered system operates. A processor 814 is in communication with the sensor 812. A reference generating device 816 is provided and is configured to identify the preferred operating characteristic. The reference generating device 816 is in communication with the processor 814. When the term "in communication" is used, those skilled in the art will readily recognize that the form of communication may be facilitated through a wired and/or wireless communication system and/or device or other communication mechanism. The reference generating device 816 is at least one of remote from the diesel powered system and a part of the diesel powered system.

The processor 814 includes an algorithm 818 that operates in a feedback process for comparing the operating characteristic to the preferred operating characteristic to determine a desired operating characteristic. A converter 820, in closed loop communication with the processor 814 and/or algorithm 818, is further provided to implement the desired operating characteristic. The converter 820 may be at least one of a master controller, a remote control controller, a distributed power controller, and/or a trainline modem. More specifically, when the diesel powered system is a locomotive system, the converter may be a remote control locomotive controller, a distributed power locomotive controller, and a train line modem.

As further illustrated, the system 810 may include a second sensor 821. The second sensor is configured to measure at least one ambient condition, information about which is provided to the algorithm 818 and/or processor 814 to determine a desired operating characteristic. As disclosed above, examples of an ambient condition include, but are not limited to temperature and pressure.

In an embodiment, utilizing the screens disclosed above as well as any embodiment of an automatic controller disclosed above, an operator may be trained how to operate the powered system. The training may be of a type to ensure that an experienced operator maintains a skill set and/or does not lose a skill set previously learned, and/or to teach a novice operator. In an embodiment, as the automatic controller is controlling the powered system, information and/or instruction may be relayed to the operator explaining why the automatic controller is taking any specific action that affects the powered system's operations. The information and/or instruction may be verbally and/or visually communicated to the operator.

In one example, if power to the powered system is limited during a certain part of the mission, a verbal statement regarding limiting power to reduce a chance of derailment may be aired to the operator. Additionally, the type of information and/or instruction communicated to the operator is not limited. For example, the type of information and/or instruction may include, but is not limited to, actions taken (such as but not limited to why speed is limited, why acceleration is limited, why power is limited, etc.), and reasons for action (such as but not limited to slack action, crest ahead, sag ahead, forces based on coupler type and/or limit and/or state, etc.).

Figure 50:
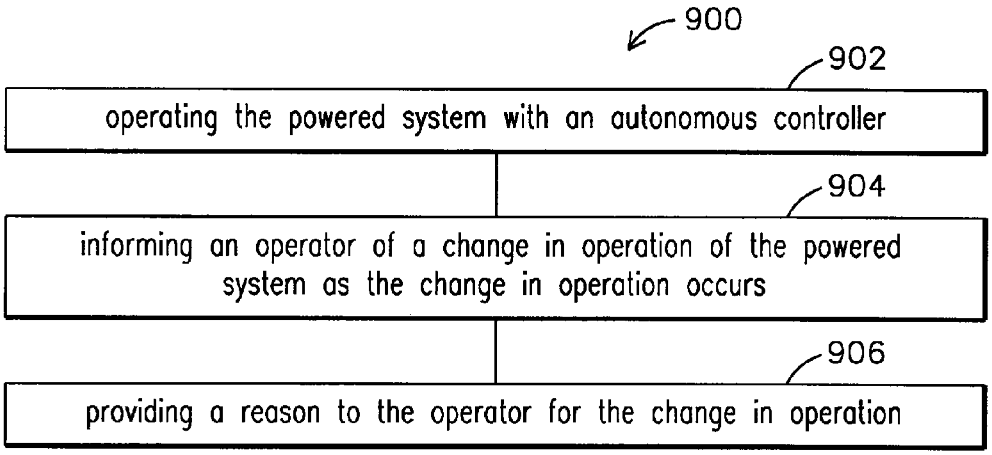
FIG. 50 depicts a flowchart illustrating an embodiment for training an operator to control a powered system.

Toward this end, FIG. 50 discloses a flowchart 900 illustrating an embodiment of a method for training an operator to control a powered system. As disclosed in the flowchart 900, the powered system is operated 902 with an autonomous controller. The operator is informed 904 of a change in operation of the powered system as the change in operation occurs, or simultaneously. The information may also include providing 906 a reason to the operator for the change where the reason is also provided simultaneous to the change being made. The type of information communicated to the operator may also include, but is not limited to, maximum values, minimum values and/or a range of action with respect to tolerance levels and/or sensitivity information.

For example, the onboard controller can automatically control the vehicle as the vehicle actually travels along a route according to a trip plan (that reduces fuel consumption and/or emission generation). The operational settings of the vehicle that are automatically and actually implemented to keep the vehicle traveling according to the trip plan may be announced to an onboard operator so that the operator. Additionally or alternatively, to the extent that the operational settings designated by the trip plan deviate from the operational settings used by the controller to automatically control the vehicle according to the trip plan, the operational settings of the trip plan and/or the differences between the operational settings of the trip plan and the operational settings that actually are implemented by the controller can be communicated to the operator. The operational settings can be communicated to the operator as throttle settings, brake settings, changes in throttle settings, changes in brake settings, speeds, accelerations, and the like.

The operational settings that are implemented to keep the vehicle traveling according to the trip plan can be communicated to the operator as the controls of the vehicle (e.g., the throttle, brakes, and the like) are automatically changed to follow the trip plan. For example, as the throttle and/or brake is automatically changed to keep the vehicle traveling according to the trip plan, the changes in the throttle and/or brake settings can be communicated to the operator, such as in real-time. By real-time, it is meant that a first change in an operational setting is automatically implemented and communicated to an operator during implementation of the first change, and not before the first change is implemented, but before a subsequent, second change in the same operational setting occurs or is implemented. There may be a slight, but short, delay between actual implementation of the change in the operational setting and when the change is communicated to the operator.

Additionally or alternatively, the operational settings that are implemented to keep the vehicle traveling according to the trip plan can be communicated to the operator before the operational settings are changed. For example, during travel of the vehicle along a route, the next or another upcoming change in a throttle and/or brake setting (as designated by the trip plan) may be communicated to the operator before the throttle and/or brake setting is automatically changed to keep the vehicle traveling according to the trip plan. Communicating these changes to the operator before the changes in the operational settings are implemented may assist in teaching the operator how to better control the vehicle as the vehicle approaches an upcoming section of the route.

Optionally, one or more reasons or purposes for changing the operational settings of the vehicle may be communicated to the operator. The trip optimizer system may be programmed or associated with one or more designated reasons for why the throttle settings, brake settings, and the like, are changed at different locations and/or times during the trip. Examples of these reasons may include reducing throttle settings and/or increasing brake settings in one or more locomotives in a front end of a train as the front end crests a peak of the route in order to reduce coupler forces in the center of the train, increasing throttle settings and/or decreasing brake settings in one or more locomotives in a back end of the train as the front end crests a peak of the route in order to reduce coupler forces in the center of the train, increasing the power output from one or more locomotives in the front end of a train in order to increase the amount of power supplied to fans or other cooling elements so that the fans or other cooling elements can cool the engine, motors, brake grids, and the like, as the train travels toward a tunnel or other area having restricted airflow for cooling the engine, motors, brake grids, and the like, changing vehicle speed or torque to reduce or control wheel slip, and the like. These reasons for changing the operational settings can be audibly and/or visually presented to the operator as the changes occur or shortly thereafter. The operator can learn from how the operational settings are changed and/or why the operational settings are changed in this way so that the operator can learn how to better manually control the vehicle through different segments of the trip at a later time.

The controls and/or changes in controls that are used to keep the vehicle traveling according to the trip plan can be communicated in one or more ways. As one example, the controls and/or changes in controls can be audibly communicated to the operator. The operational settings that are automatically implemented may be projected using audible alarms, voices, or other sounds that represent the operational settings and/or changes in the operational settings. Additionally or alternatively, the operational settings and/or changes in the operational settings may be visually presented on a display in the vehicle, such as via text-based notifications, graphs, or other visual representations of the operational settings. Additionally or alternatively, the operational settings and/or changes in the operational settings may be haptically communicated. For example, one or more levers, buttons, switches, pedals, operator seats, and the like, may vibrate, move, heat up, cool down, or otherwise change in a way that is perceived by the operator via the touch of the operator to communicate the operational settings and/or changes in the operational settings. With respect to the throttle and/or brakes, throttle and/or brake levers (or other devices that may be used to manually control the throttle and/or brakes) may automatically move such that the operator grasping the levers feels the levers automatically move. The operator may learn the movements of the levers or other devices and the timings of changes in positions of the levers or other devices so that the operator may later manually actuate the same levers to control the vehicle according to the trip plan over one or more portions of a trip.

Figure 51:
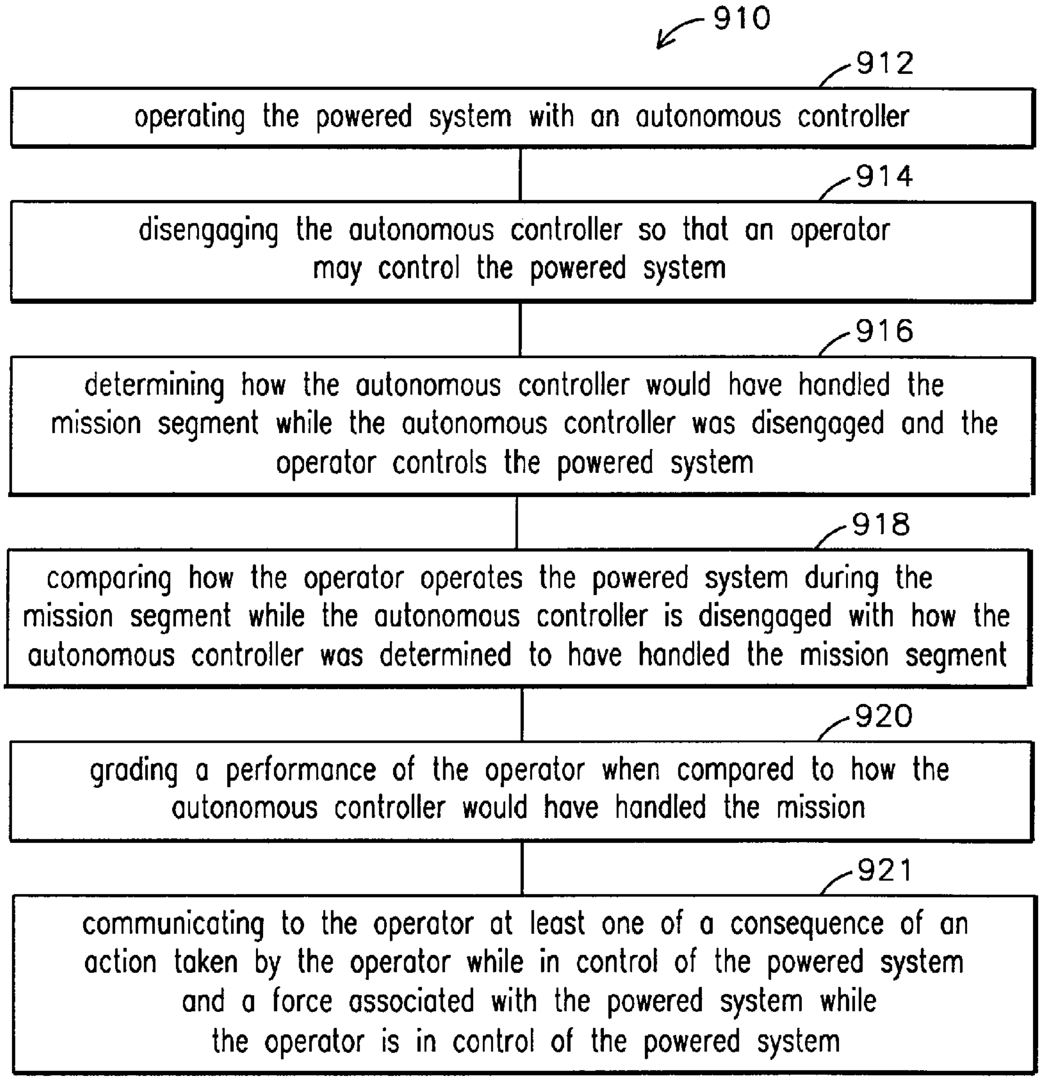
FIG. 51 depicts another flowchart illustrating an embodiment for training an operator to control a powered system.

FIG. 51 discloses a flowchart 910 illustrating another embodiment of a method for training an operator to control a powered system. As disclosed in this flowchart 910, the powered system is operated 912 with an autonomous controller. During operation, the autonomous controller is disengaged 914 so that the operator may take control of the powered system. For example, the operator is expected to take over operating the powered system when difficult parts of the mission are encountered. Working the most difficult part of missions will assist the operator in maintaining skills already developed. While the autonomous controller is disengaged, a projected performance of the autonomous controller is determined 916. The projected performance and/or the operator's performance may be recorded. Once the operator has completed operating the powered vehicle for the particular segment, the operator's performance is compared 918 to the projected performance of the autonomous controller. The operator's performance is graded 920, or rated. A consequence of an action taken by the operator while the operator is in control of the powered system and/or a force associated with the powered system while the operator is in control of the powered system is communicated 921 to the operator. As disclosed herein the form of communication may be at least one of visual, audible, and/or touch.

While in manual operation, train forces and/or consequences of actions taken by the operator may be communicated to the operator. For example, though not limited to these examples, based on the operator's action an expected result and/or a range of a resultant action may be communicated to the operator. A recommended action may also be communicated to the operator. An action taken by the operator may be rated, as disclosed herein based on how the controller would have handled the situation, or in other words while the operator controls the powered system the autonomous controller is gathering information and is determining its operation of the powered system as if it was in control. Other information that may be communicated to the operator may include, but is not limited to, a figure of merit, a number of slack actions, a severity of a slack action, and a rating and/or grade with respect to ease of handling the powered system.

Figure 52:
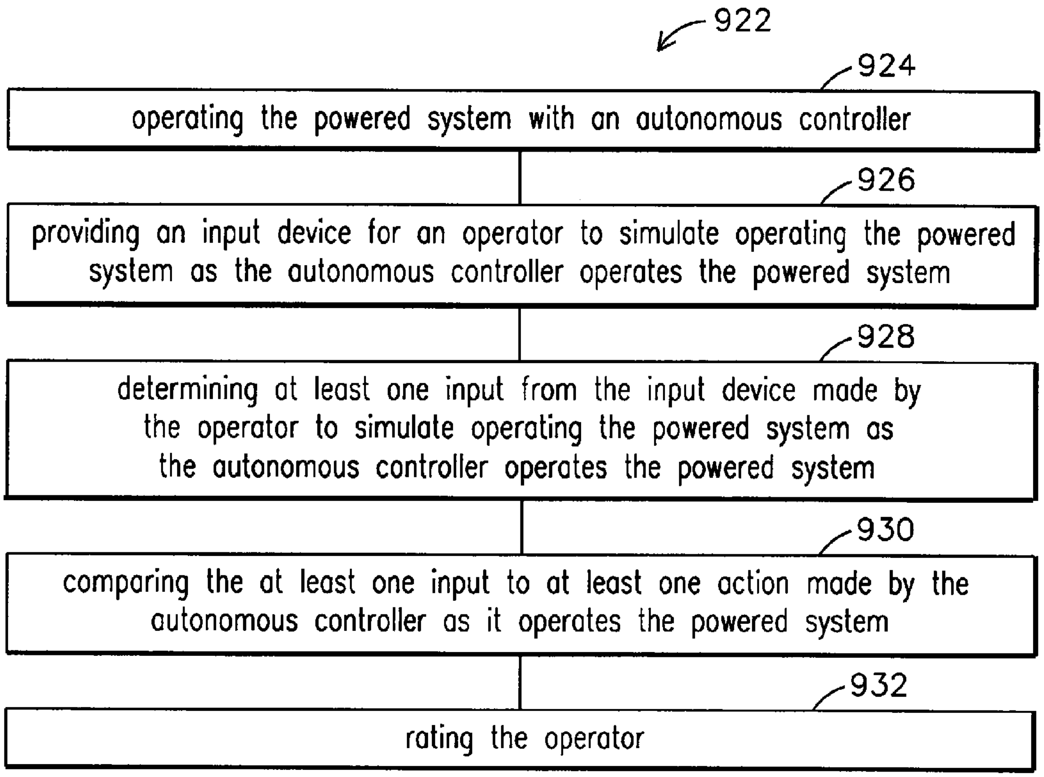
FIG. 52 depicts another flowchart illustrating an embodiment for training an operator to control a powered system.

FIG. 52 discloses a flowchart 922 illustrating another embodiment of a method for training an operator to control a powered system. As disclosed in the flowchart 922, while the autonomous controller operates 924 the powered system, an input device is provided 926 for the operator to simulate operating the powered system while the autonomous controller is actually operating the powered system. At least one input from the input device made by the operator to simulate operating the powered system is determined 928. The at least one input is compared 930 to at least one action made by the autonomous controller as it actually operates the powered system. The timing for both the input initiated by the operator and the controller's actions are considered at the same period in the mission. The operator is rated 932, or graded based on the comparison. Therefore, as the operator is able to enter an action and is able to see why the action entered should and/or should not have been done.

Figure 53:
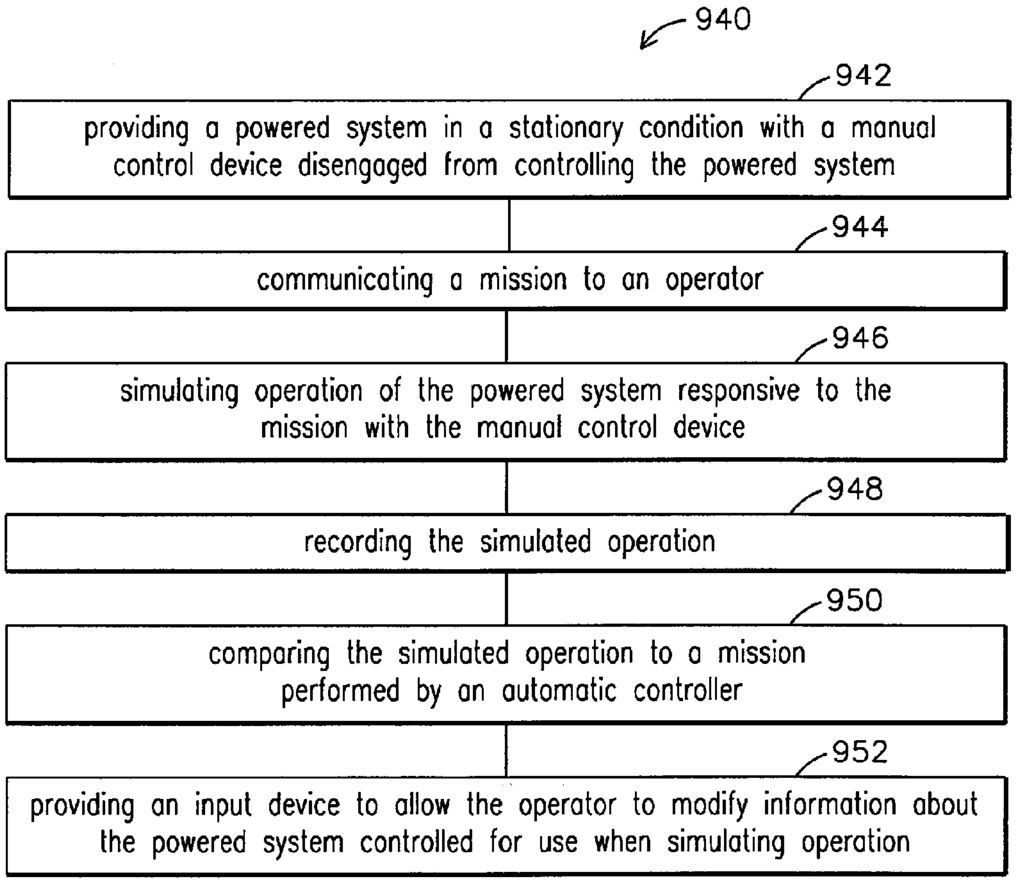
FIG. 53 depicts another flowchart illustrating an embodiment for training an operator to control a powered system.

FIG. 53 discloses a flowchart 940 illustrating another embodiment of a method for training an operator to control a powered system. As disclosed in the flowchart 940, the powered system is provided 942 in a stationary condition with its manual control device and/or handles, such as but not limited to a throttle, disengaged so that an operator may move the manual control device and/or handles without actually moving the powered system. The powered system is a fully functional system that is able to perform an actual mission. Therefore, those skilled in the art will recognize that the powered system is not a permanent simulation system.

A mission is communicated 944 to the operator, such as a preplan mission, a recently performed mission, a mission to next be performed, etc. Operation of the powered system is simulated 946 in a manner which is responsive to the manual control device controlled by the operator. For example, with respect to a rail vehicle, while waiting for another rail vehicle to pass on common track and then continuing a mission, the operator may train while waiting using the method disclosed herein. Those skilled in the art will recognize the reason for the powered system to be temporarily stationary is not limited. With respect to a rail vehicle in an embodiment, the rail vehicle may be temporarily stopped during a mission. The simulated operation may be recorded 948. The operation by the operator, such as but not limited to the recorded operation, may be compared 950 to the autonomous controller's projected performance.

In an embodiment, the operator may simulate controlling the powered system while the powered system is stationary. For example, before leaving on a trip, while stationary on a siding section of rail, or while otherwise not moving, the onboard controller of the vehicle may simulate movement of the vehicle along while an onboard operator manually actuates the controls (e.g., the throttle and/or brake settings) of the vehicle. The operator can do so in order to simulate controlling the vehicle over one or more segments of a trip in order to practice manual control of the vehicle over those segments of the trip. The segment of the trip that is used by the operator to practice controlling the vehicle may be referred to as a trip segment of interest.

The trip segment of interest may be manually or automatically selected. For example, the operator may select the segment of interest to be practiced while stationary from a trip plan (e.g., using an input device such as a touch screen, mouse, stylus, or the like) presented to the operator on an onboard display device. The trip plan may be used for the trip that the vehicle is about to embark on or that the vehicle was traveling. The segment of interest may be automatically selected, such as by selecting a random segment of the trip plan on which to practice, selecting a segment of the trip plan associated with at least a threshold level of difficulty, and the like. The level of difficulty for a segment of a trip plan may be measured or estimated from a number of operational changes required over the segment (e.g., with greater levels of difficulty for segments having more required operational setting changes in order to follow the trip plan and lesser levels of difficulty for segments having fewer required operational setting changes). Additionally or alternatively, the levels of difficulty associated with different segments of a trip plan may be measured or estimated from previous travels of the vehicle (or similar types of vehicles) over the same trip. For example, during previous trips over the same route where operational settings of the vehicle are manually controlled in order to follow a trip plan, differences between the actual operational settings that are manually controlled are compared to the designated operational settings of the trip plan. Differences between the manually controlled operational settings and the operational settings designated by the trip plan can be recorded or otherwise logged. The segments of the trip associated with larger differences between the manual operational settings and the designated operational settings of the trip plan may be associated with larger levels of difficulty than the segments associated with smaller differences.

In order for the operator to practice the selected segment of interest, the trip optimizer system onboard the vehicle may simulate travel of the vehicle over the segment of interest while the operator manually actuates the controls of the vehicle. The display device may present the grade, curvature, weather conditions, simulated speed, simulated acceleration, simulated coupler forces, or the like, to the operator as travel of the vehicle along the segment of interest is simulated. The simulated movements of the vehicle may be obtained from one or more previous trips of the vehicle along the same trip segment of interest, from one or more mathematical and/or computerized models of movement of the vehicle along the same trip segment of interest, and the like. The operator may manually actuate the controls of the vehicle to simulate manual control of the vehicle as the trip optimizer system simulates movement of the vehicle along the selected trip segment of interest. The vehicle may remain stationary during the operator practicing control of the vehicle. The trip optimizer system may track and record the changes to the operational settings of the vehicle as implemented by the operator during the simulated movements.

Feedback may be provided to the operator so that the operator can determine how closely the operator is able to simulate travel of the vehicle according to the trip plan. For example, differences between the operational settings designated by the trip plan over the segment of interest and the manually selected operational settings may be recorded and/or presented to the operator. These differences can be presented to the operator visually and/or audibly. Additionally or alternatively, differences between the amount of fuel consumed and/or the emissions generated by the simulated control of the vehicle by the operator versus the amount of fuel consumed and/or the emissions generated if the vehicle were automatically controlled according to the trip plan may be determined by the optimizer system and presented to the operator. The operator may refer to these differences so that the operator may practice and improve his or her control of the vehicle while the vehicle is stationary. When the vehicle actually travels over the selected segment of interest, the manual control of the vehicle may be improved due to this practice by the operator.

In another embodiment, instead of simulating the mission provided, the operator may modify the mission, such as but not limited to selecting at type of powered system (such a type of locomotive), arrival time, and/or other conditions that may include information about the powered system, with an input device that is provided 952. How the controller would have handled the modified mission is also determined whereas a comparison between the controller and operator may still be performed.

As disclosed above with respect to the other flowcharts, the flowcharts illustrated in FIG. 50 through 53 may be performed using a computer software code or modules. Tangible and non-transitory electronic media containing the computer software modules may be accessed by a processor, or computer. Electronic media is not to be limiting since any computer software module that is part of the computer software code may also be loaded and/or accessible through an electronic media transfer system, including a wireless and/or wired transfer system, such as but not limited to using the Internet to accomplish the installation.

Figure 54:
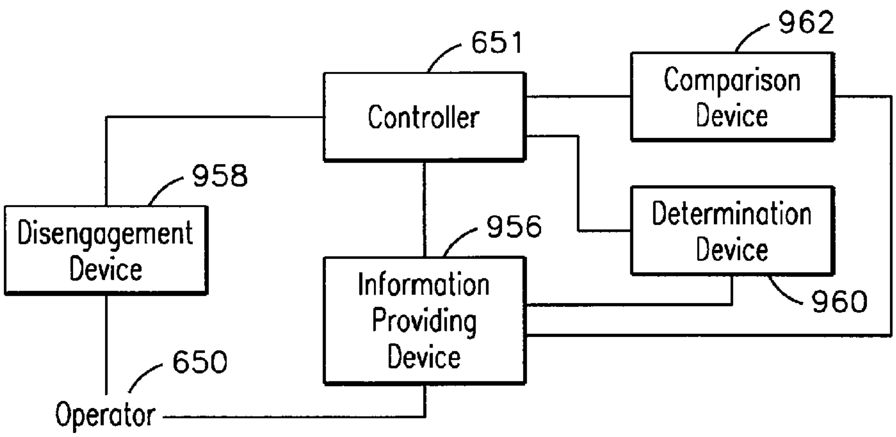
FIG. 54 depicts a block diagram illustrating an embodiment of a system for training an operator to control a powered system.

FIG. 54 discloses a block diagram illustrating an embodiment of elements that are part of a training system for instructing an operator how to control a powered system. A controller 955 configured to autonomously control the powered system is disclosed. An information providing device 956 is provided. This device 956 is used to provide information to the operator responsive to how the controller operates the powered system. The information providing device 956 may be visually based, such as but not limited to a display, and audibly based, such as but not limited to an audio system. The information providing device may also be one which allows the operator to receive an electronic pulse when an operating change is occurring. The information provided may include information regarding an operation change as the change is occurring and/or information explaining why the operating change is occurring. A disengagement device 958 is provided to disengage the controller from autonomously controlling the powered system. When disengaged, the operator is able to control the powered system. While the operator is controlling the powered system, a determination device 960 configured to determine how the controller would have operated the powered system, if it was not disengaged. A comparison device 962 is further provided to compare how the operator controlled the powered system against the projected performance of the controller. The operator may receive a grade and/or rating based on this comparison. Those skilled in the art will recognize that the determination device 960 and/or the comparison device 962 may be a processor that utilizes a computer software code to reach its results. Additionally, input from the powered system is further provided to the determination device 960 and/or comparison device 962 in making the determination. The operation by the operator and/or the controller may be stored with a recording device 964.

When the operator is rated and/or scored, a plurality of variations is possible. For example, a rating and/or score may be determined over a period of operation, a degree of difficulty experienced, and/or skill in handling special situations. A continuous rating and/or score may be displayed where in an embodiment the rating and/or score may be further compared to a rating and/or score provided to the autonomous controller as well. When compared to the autonomous controller, the operator may have an opportunity to try to beat the autonomous controller's performance. Though a plurality of factors may be considered in rating and/or grading the operator, examples may include measurable units of train handling criterion, such as but not limited to maximum buffering/draft force, a number of slack actions, severity of a slack action, powered system handling relative to the terrain.

In an embodiment, a method (e.g., for controlling a vehicle) includes at least one of obtaining or creating a trip plan having designated operational settings of the vehicle as a function of at least one of time or distance along a route for a trip of the vehicle, autonomously controlling actual operational settings of the vehicle as the vehicle actually travels along the route during the trip such that the vehicle travels according to the designated operational settings of the trip plan, and communicating at least one of the actual operational settings of the vehicle or changes to the actual operational settings of the vehicle to an operator as the vehicle is autonomously controlled during travel along the route to instruct the operator how to manually control the vehicle according to the trip plan.

In one aspect, the at least one of the actual operational settings of the vehicle or the changes to the actual operational settings of the vehicle are communicated to the operator as the actual operational settings are autonomously changed.

In one aspect, the at least one of the actual operational settings or the changes to the actual operational settings also are communicated to the operator with one or more reasons why the at least one of the actual operational settings or the changes to the actual operational settings are used to automatically control the vehicle.

In one aspect, autonomously controlling the actual operational settings of the vehicle includes automatically implementing a plurality of the changes to the actual operational settings that include a first change and a subsequent second change, wherein the first change is communicated to the operator before the subsequent second change is autonomously implemented to control the vehicle.

In one aspect, communicating the at least one of the actual operational settings of the vehicle or the changes to the actual operational settings of the vehicle to the operator occurs as the at least one of the actual operational settings or the changes to the actual operational settings are autonomously implemented by an onboard controller of the vehicle.

In one aspect, communicating the at least one of the actual operational settings of the vehicle or the changes to the actual operational settings of the vehicle to the operator occurs prior to implementation of the actual operational settings or the changes to the operational settings.

In one aspect, one or more of the at least one of obtaining or creating the trip plan, autonomously controlling the actual operational settings of the vehicle, or communicating the at least one of the actual operational settings of the vehicle or the changes to the actual operational settings of the vehicle is performed by one or more processors disposed onboard the vehicle.

In one aspect, the operational settings of the vehicle are at least one of throttle settings or brake settings.

In one aspect, autonomously controlling the vehicle according to the designated operational settings of the trip plan results in the vehicle at least one of consuming less fuel or producing fewer emissions while traveling along the route to a destination location within a designated time period relative to the same vehicle traveling along the same route to the same destination location within the same designated time period using one or more of the operational settings that differ from the designated operational settings.

In an embodiment, a method (e.g., for simulating control of a vehicle) includes presenting simulated travel of the vehicle along a route to an operator disposed onboard the vehicle while the vehicle is stationary. The simulated travel represents movements of the vehicle along the route. The method also includes monitoring manual actuation of one or more devices onboard the vehicle in order to track manual changes to simulated operational settings of the vehicle by the operator during the simulated travel of the vehicle and communicating one or more differences between the simulated operational settings that are manually provided by the operator and designated operational settings of a trip plan so that the operator can practice manual control of the vehicle along the route according to the trip plan. The trip plan includes designated operational settings of the vehicle expressed as a function of at least one of distance or time along the route for a trip.

In one aspect, the method also includes selecting a first trip segment of interest of the route from plural trip segments of the route to practice. The first trip segment of interest is used to present the simulated travel of the vehicle.

In one aspect, the first trip segment of interest is manually selected by the operator onboard the vehicle.

In one aspect, the first trip segment of interest is autonomously selected from the plural trip segments based on relative levels of difficulty of manual control of the vehicle over the respective trip segments.

In one aspect, the relative levels of difficulty of manual control are determined from differences between manually controlled operational settings of the vehicle during a previous trip along the route and the designated operational settings of the trip plan during the previous trip.

In one aspect, the method also includes providing feedback to the operator based on the manual actuation of the one or more devices during the simulated travel. The feedback includes differences between the manual changes to the simulated operational settings and the designated operational settings of the trip plan.

In one aspect, one or more of presenting the simulated travel, monitoring the manual actuation of the one or more devices, or communicating the one or more differences is performed by one or more processors disposed onboard the vehicle.

In an embodiment, a system (e.g., a trip optimizer system) includes a vehicle controller configured to be disposed onboard a vehicle and to at least one of obtain or create a trip plan having designated operational settings of the vehicle as a function of at least one of time or distance along a route for a trip of the vehicle. The vehicle controller also is configured to at least one of (a) autonomously control actual operational settings of the vehicle as the vehicle actually travels along the route during the trip such that the vehicle travels according to the designated operational settings of the trip plan and to communicate at least one of the actual operational settings of the vehicle or changes to the actual operational settings of the vehicle to an operator as the vehicle to instruct the operator how to manually control the vehicle according to the trip plan, or (b) present simulated travel of the vehicle along the route while the vehicle is stationary, monitor manual actuation of one or more devices onboard the vehicle in order to track manual changes to simulated operational settings of the vehicle by the operator during the simulated travel of the vehicle, and communicate one or more differences between the simulated operational settings that are manually provided by the operator and designated operational settings of the trip plan so that the operator can practice manual control of the vehicle along the route according to the trip plan.

In one aspect, actual travel of the vehicle according to the designated operational settings of the trip plan results in the vehicle at least one of consuming less fuel or producing fewer emissions while traveling along the route to a destination location within a designated time period relative to the same vehicle traveling along the same route to the same destination location within the same designated time period using one or more of the operational settings that differ from the designated operational settings.

In one aspect, the vehicle controller is configured to communicate the at least one of the actual operational settings of the vehicle or the changes to the actual operational settings of the vehicle to the operator as the actual operational settings are autonomously changed.

In one aspect, the vehicle controller is configured to provide feedback to the operator based on the manual actuation of the one or more devices during the simulated travel. The feedback includes differences between the manual changes to the simulated operational settings and the designated operational settings of the trip plan.

While the inventive subject matter has been described with reference to various embodiments, various changes, omissions and/or additions may be made and equivalents may be substituted for elements thereof without departing from the spirit and scope of the inventive subject matter. In addition, many modifications may be made to adapt a particular situation or material to the teachings of the inventive subject matter without departing from the scope thereof. Therefore, it is intended that the inventive subject matter not be limited to the particular embodiments disclosed for carrying out this inventive subject matter, but that the inventive subject matter will include all embodiments falling within the scope of the appended claims. Moreover, unless specifically stated any use of the terms first, second, etc. do not denote any order or importance, but rather the terms first, second, etc. are used to distinguish one element from another.

What is claimed:

1. A method comprising:

selecting a first trip segment of interest of a route from plural trip segments of the route to practice, the first trip segment of interest used to present simulated travel of a vehicle, wherein the first trip segment of interest is autonomously selected from the plural trip segments based on relative levels of difficulty of manual control of the vehicle over the respective trip segments;

presenting the simulated travel of the vehicle along the route to an operator disposed onboard the vehicle while the vehicle is stationary, the simulated travel representing movements of the vehicle along the route;

monitoring manual actuation of one or more devices onboard the vehicle in order to track manual changes to simulated operational settings of the vehicle by the operator during the simulated travel of the vehicle; and communicating one or more differences between the simulated operational settings that are manually provided by the operator and designated operational settings of a trip plan so that the operator can practice manual control of the vehicle along the route according to the trip plan, the trip plan including designated operational settings of the vehicle expressed as a function of at least one of distance or time along the route for a trip.

2. The method of claim 1, wherein the relative levels of difficulty of manual control are determined from differences between manually controlled operational settings of the vehicle during a previous trip along the route and the designated operational settings of the trip plan during the previous trip.

3. The method of claim 1, wherein the selected first trip segment of interest comprises an upcoming trip segment of the mission along the route to practice, wherein presenting the simulated travel of the vehicle comprises presenting the simulated travel of the vehicle along the upcoming trip segment.

4. The method of claim 3, further comprising removing the vehicle from the stationary condition, and resuming performance of the mission, wherein resuming performance of the mission includes operating the vehicle over the upcoming trip segment.

5. A system comprising:

a vehicle controller configured to be disposed onboard a vehicle and to at least one of obtain or create a trip plan having designated operational settings of the vehicle as a function of at least one of time or distance along a route for a trip of the vehicle;

wherein the vehicle controller is configured to:

select a first trip segment of interest of a route from plural trip segments of the route to practice, the first trip segment of interest used to present simulated travel of a vehicle, wherein the first trip segment of interest is autonomously selected from the plural trip segments based on relative levels of difficulty of manual control of the vehicle over the respective trip segments;

present the simulated travel of the vehicle along the route to an operator disposed onboard the vehicle while the vehicle is stationary, the simulated travel representing movements of the vehicle along the route;

monitor manual actuation of one or more devices onboard the vehicle in order to track manual changes to simulated operational settings of the vehicle by the operator during the simulated travel of the vehicle; and communicate one or more differences between the simulated operational settings that are manually provided by the operator and designated operational settings of a trip plan so that the operator can practice manual control of the vehicle along the route according to the trip plan, the trip plan including designated operational settings of the vehicle expressed as a function of at least one of distance or time along the route for a trip.

6. The system of claim 5, wherein the relative levels of difficulty of manual control are determined from differences between manually controlled operational settings of the vehicle during a previous trip along the route and the designated operational settings of the trip plan during the previous trip.

7. The system of claim 5, wherein the selected first trip segment of interest comprises an upcoming trip segment of the mission along the route to practice, wherein presenting the simulated travel of the vehicle comprises presenting the simulated travel of the vehicle along the upcoming trip segment.

8. The system of claim 7, wherein the controller is further configured to remove the vehicle from the stationary condition, and to resume performance of the mission, wherein resuming performance of the mission includes operating the vehicle over the upcoming trip segment.

* * * * *

UNITED STATES PATENT AND TRADEMARK OFFICE

CERTIFICATE OF CORRECTION

PATENT NO. : 8,998,617 B2
APPLICATION NO. : 13/778428
DATED : April 7, 2015
INVENTOR(S) : Kumar It is certified that error appears in the above-identified patent and that said Letters Patent is hereby corrected as shown below:

On the Title Page, in the Figure, delete “Driver amd” and insert -- Driver and --, therefor.

IN THE DRAWINGS

In Fig. 1, Sheet 1 of 41, delete “Driver amd” and insert -- Driver and --, therefor.

In Fig. 10, Sheet 9 of 41, delete “ 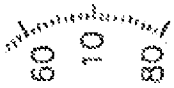 ” and insert -- 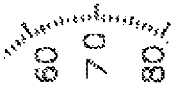 --, therefor.

In Fig. 10, Sheet 9 of 41, delete “ 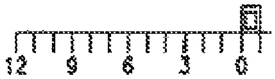 ” and insert -- 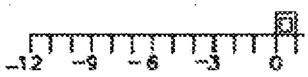 --, therefor.

In Fig. 11, Sheet 10 of 41, delete “ 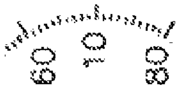 ” and insert -- 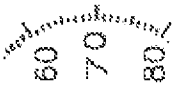 --, therefor.

In Fig. 12, Sheet 11 of 41, delete “ 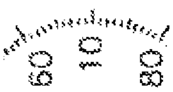 ” and insert -- 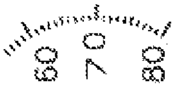 --, therefor.

In Fig. 16, Sheet 14 of 41, delete “ 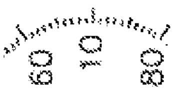 ” and insert -- 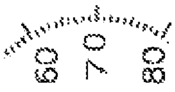 --, therefor.

In Fig, 17, Sheet 15 of 41, delete “ 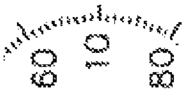 ” and insert -- 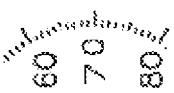 --, therefor.

Signed and Sealed this
Fifth Day of January, 2016

Michelle K. Lee

Michelle K. Lee
*Director of the United States Patent and Trademark Office*

IN THE DRAWINGS

In Fig. 19A, Sheet 16 of 41, delete " 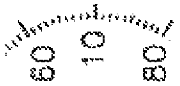

" and insert -- 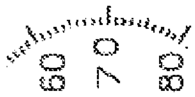

--, therefor.

In Fig. 19B, Sheet 17 of 41, delete " 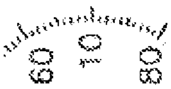

" and insert -- 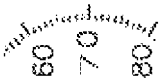

--, therefor.

In Fig. 21A, Sheet 19 of 41, delete " 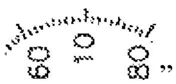

" and insert -- 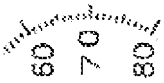

--, therefor.

In Fig. 21B, Sheet 20 of 41, delete " 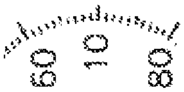

" and insert -- 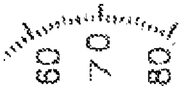

--, therefor.

In Fig. 22A, Sheet 21 of 41, delete " 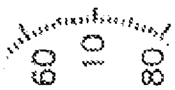

" and insert -- 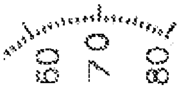

--, therefor.

In Fig. 22B, Sheet 22 of 41, delete " 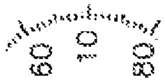

" and insert -- 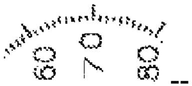

--, therefor.

Figure 25:
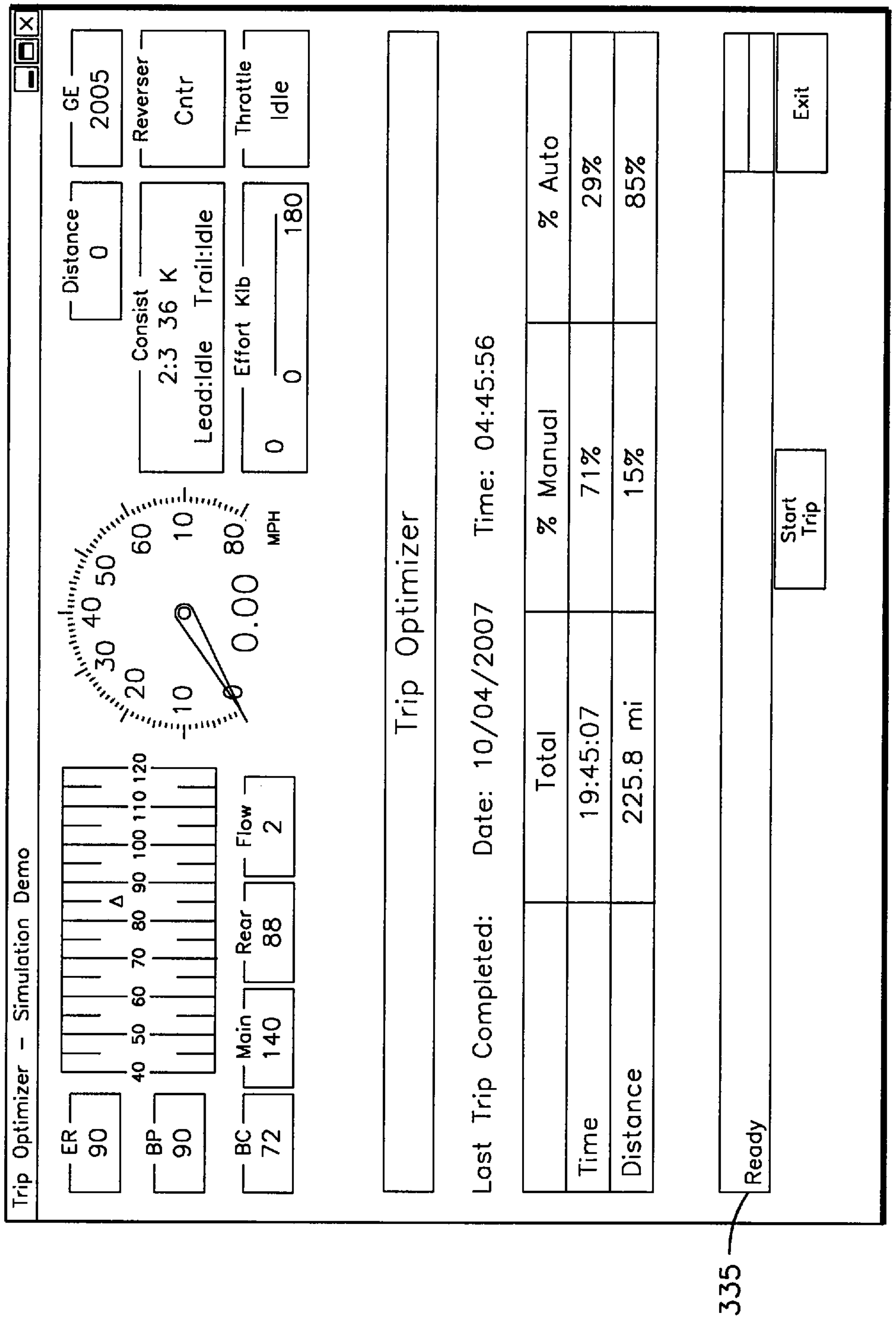
FIG. 25 depicts a display and user input to initiate the process of collecting information.

In Fig. 25, Sheet 24 of 41, delete " 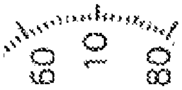

" and insert -- 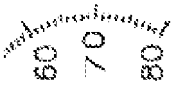

--, therefor.

In Fig. 26, Sheet 25 of 41, delete " 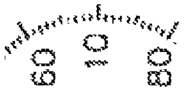

" and insert -- 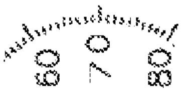

--, therefor.

In Fig. 27, Sheet 26 of 41, delete " 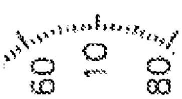

" and insert -- 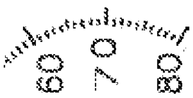

--, therefor.

In Fig. 28, Sheet 27 of 41, delete " 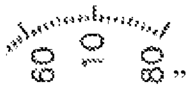

" and insert -- 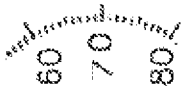

--, therefor.

In Fig. 30, Sheet 29 of 41, for Tag "432", in Line 2, delete "systsm" and insert -- system --, therefor.

IN THE DRAWINGS

In Fig. 35, Sheet 32 of 41, delete "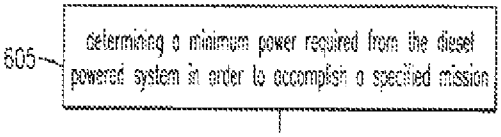

" and insert -- 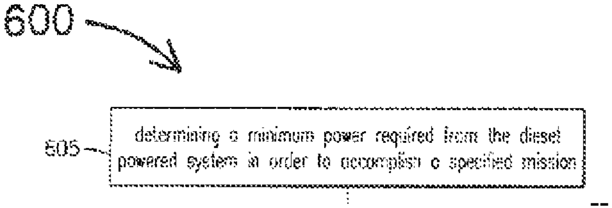

--, therefor.

In Fig. 54, Sheet 41 of 41, delete Tag "651" and insert Tag -- 955 --, therefor.

IN THE SPECIFICATION

In Column 1, Line 12, delete "2008 (the '249 Application")," and insert -- 2008, now Pat. No. 8,398,405 (the "'249 Application"), --, therefor.

In Column 1, Line 24, delete "2008" and insert -- 2008, now Pat. No. 8,249,763 --, therefor.

In Column 1, Line 33, delete "(the '364 Application")," and insert -- (the "'364 Application"), --, therefor.

In Column 1, Line 35, delete "(the '100 Application")," and insert -- (the "'100 Application"), --, therefor.

In Column 19, Line 54, delete "element, 51" and insert -- element 51 --, therefor.

In Column 24, Line 2, delete "$\tau_{min}$," and insert -- $\tau_{mn}$, --, therefor.

In Column 29, Line 25, delete "indicator, 74," and insert -- indicator 74, --, therefor.

In Column 29, Line 26, delete "fraction" and insert -- traction --, therefor.

In Column 31, Lines 19-20, delete "train 42 is illustrated where part of the train 42" and insert -- train 31 is illustrated where part of the train 31 --, therefor.

In Column 40, Line 15, delete "load, estimator 560," and insert -- load estimator 560, --, therefor.

In Column 42, Line 43, delete "processor 240" and insert -- processor 245 --, therefor.

In Column 42, Line 47, delete "processor 240" and insert -- processor 245 --, therefor.

In Column 48, Line 2, delete "processor 727" and insert -- processor 725 --, therefor.